United States Patent
Wang et al.

(10) Patent No.: US 12,463,746 B2
(45) Date of Patent: Nov. 4, 2025

(54) ENCODING AND DECODING METHOD AND APPARATUS

(71) Applicant: Huawei Technologies Co., Ltd., Shenzhen (CN)

(72) Inventors: Xianbin Wang, Hangzhou (CN); Jiajie Tong, Hangzhou (CN); Huazi Zhang, Hangzhou (CN); Shengchen Dai, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 18/170,980

(22) Filed: Feb. 17, 2023

(65) Prior Publication Data
US 2023/0208554 A1 Jun. 29, 2023

Related U.S. Application Data

(63) Continuation of application No. PCT/CN2021/111891, filed on Aug. 10, 2021.

(30) Foreign Application Priority Data

Aug. 19, 2020 (CN) .......................... 202010839244.4

(51) Int. Cl.
*H04L 1/00* (2006.01)
(52) U.S. Cl.
CPC .................. *H04L 1/0052* (2013.01)
(58) Field of Classification Search
None
See application file for complete search history.

(56) References Cited

U.S. PATENT DOCUMENTS

2014/0208183 A1* 7/2014 Mahdavifar .......... H03M 13/27
714/755
2014/0331083 A1* 11/2014 Aliev .................... G06F 11/108
714/6.23

(Continued)

OTHER PUBLICATIONS

Trifonov, Peter et al, "Polar Subcodes", IEEE Journal On Selected Areas in Communications, IEEE Service Center, Piscataway, US, vol. 34, No. 2, Feb. 1, 2016 (Feb. 1,2016), XP011593857, pp. 254-266.

Saber, Hamid et al, "Design of Generalized Concatenated Codes Based on Polar Codes With Very Short Outer Codes", IEEE Transactions On Vehicular Technology, IEEE, USA, vol. 66, No. 4, Apr. 1, 2017 (Apr. 1, 2014), XP011645880, pp. 3103-3115.

(Continued)

*Primary Examiner* — Gregory B Sefcheck
(74) *Attorney, Agent, or Firm* — Slater Matsil, LLP

(57) ABSTRACT

Encoding methods and apparatuses are provided. The method includes: obtaining to-be-encoded information including K information bits and a mother code length N; determining, based on K and N, a set I corresponding to subchannels of the information bits, where information bits corresponding to subchannel sequence numbers in I are distributed in X outer-code subcodes including X1 first-type outer-code subcodes, quantities of information bits in the X1 first-type outer-code subcodes are $P_1, P_2, \ldots,$ and $P_{X1}$, $P_i$ ($i=1, 2, \ldots, X1$) is one of $K_1, K_2, \ldots,$ and $K_m$, which are greater than a first threshold LB and less than a second threshold HB, $1 \leq m < (HB-LB-1)$, $LB+1 < HB$, $HB \leq a$ length B of an outer-code subcode, X, HB, and B are positive integers, and LB is an integer $\geq 0$; and performing encoding based on I.

20 Claims, 12 Drawing Sheets

(56) References Cited

U.S. PATENT DOCUMENTS

| | | | |
|---|---|---|---|
| 2018/0054800 A1* | 2/2018 | Yeo | H04W 76/15 |
| 2018/0076923 A1 | 3/2018 | Wu et al. | |
| 2018/0248564 A1* | 8/2018 | Kim | H03M 13/13 |
| 2019/0044656 A1* | 2/2019 | Huang | H03M 13/13 |
| 2019/0108093 A1* | 4/2019 | Presman | H03M 13/2906 |
| 2020/0028615 A1* | 1/2020 | Jang | H03M 13/155 |
| 2020/0127686 A1* | 4/2020 | Heo | H03M 13/458 |
| 2020/0266840 A1* | 8/2020 | Sunwoo | H03M 13/13 |
| 2020/0366317 A1* | 11/2020 | Myung | H03M 13/618 |
| 2021/0211231 A1* | 7/2021 | Qiao | H04L 1/0041 |
| 2023/0208442 A1* | 6/2023 | Tong | H04L 1/0041 |
| 2024/0348368 A1* | 10/2024 | Ivanov | H03M 13/2906 |

OTHER PUBLICATIONS

H. Zhang et al., "A Flip-Syndrome-List Polar Decoder Architecture for Ultra-Low-Latency Communications", in IEEE Access, vol. 7, doi: 10.1109/ACCESS.2018.2886464, Jan. 7, 2019, pp. 1149-1159.
Huawei et al, "Details of the Polar code design", 3GPP TSG RAN WG1 Meeting #87, R1-1611254, Details of the Polar Code Design, 3rd Generation Partnership Project (3GPP), Mobile Competence Centre; 650, Route Des Lucioles; F-06921 Sophia-Antipolis Cedex; France vol. RAN WG1, Reno, USA; Nov. 10-14, 2016, XP051189033, 15 pages.
Ivanov, Kirill et al, "Hybrid decoding of interlinked generalized concatenated codes", 2016 9th International Symposium On Turbo Codes and Iterative Information Processing (ISTC), IEEE, Sep. 5, 2016 (Sep. 5, 2016), XP032981261, pp. 41-45.

\* cited by examiner

ENCODING AND DECODING METHOD AND APPARATUS

CROSS-REFERENCE TO RELATED APPLICATIONS

This application is a continuation of International Patent Application No. PCT/CN2021/111891, filed on Aug. 10, 2021, which claims priority to Chinese Patent Application No. 202010839244.4, filed on Aug. 19, 2020. The disclosures of the aforementioned applications are hereby incorporated by reference in their entireties.

TECHNICAL FIELD

This application relates to the field of communications technologies, and in particular, to encoding and decoding methods and apparatuses.

BACKGROUND

Channel encoding is usually used in a communications system, to improve data transmission reliability and ensure communication quality. A polar code is the first channel encoding method that can be strictly proved to "achieve" a channel capacity. The polar code is a linear block code. A generator matrix of the polar code is $G_N$, and an encoding process of the polar code is $x_1^N = u_1^N G_N$, where $u_1^N = (u_1, u_2, \ldots)$, is a binary row vector of a length N (code length), $G_N = B_N F_2^{\otimes(\log_2(N))}$, $$F_2 = \begin{bmatrix} 1 & 0 \\ 1 & 1 \end{bmatrix},$$

$B_N$ is an N×N transposed matrix such as a transposed matrix in a bit reversal order, $F_2^{\otimes(\log_2(N))}$ is defined as a Kronecker product of $\log_2 N$ matrices $F_2$, and $x_1^N$ is an encoded bit (also referred to as a code word). The encoded bit is obtained by multiplying $u_1^N$ by the generator matrix $G_N$, and a process of the multiplication is the encoding process. During polar code encoding, some bits in $u_1^N$ are used to carry information and are referred to as information bits, and a set of indexes of the information bits is denoted as A; and other bits in $u_1^N$ are set as fixed values pre-agreed upon between a transmitting end and a receiving end and are referred to as frozen bits (or constant bits), and a set of indexes of these bits is marked as a complementary set $A^c$ of A. A frozen bit is usually set to 0, and a frozen bit sequence can be arbitrarily set provided that the frozen bit sequence is agreed upon in advance by the transmitting end and the receiving end. A construction process of the polar code is a selection process of the set A. This determines performance of the polar code.

An existing polar code decoding algorithm mainly includes a successive cancellation (SC) decoding algorithm and a successive cancellation list (SCL) decoding algorithm. The SC decoding algorithm and the SCL decoding algorithm have good decoding performance in a case of a short code. However, in an actual application, a quantity of decoded bits is very large. The SC decoding algorithm and the SCL decoding algorithm can provide only serial decoding, and a decoding delay is long. To reduce the decoding delay, in an existing simplified SC/SCL decoding algorithm, a decoding tree (full binary tree) is pruned, and some outer-code subcodes are decoded in parallel to reduce the decoding delay.

However, when a code rate of the outer-code subcode approximates 1 or 0, parallelization is easy. When the code rate of the outer-code subcode approximates ½ decoding complexity is high, and the parallelization is difficult.

SUMMARY

This application provides encoding and decoding methods and apparatuses to reduce a decoding delay and improve a throughput rate.

According to a first aspect, this application provides an encoding method, including: obtaining to-be-encoded information and a mother code length N, where the to-be-encoded information includes K information bits, and K and N are positive integers; determining, based on K and N, a set I corresponding to subchannels of the information bits, where information bits corresponding to subchannel sequence numbers in I are distributed in X outer-code subcodes, the X outer-code subcodes include X1 first-type outer-code subcodes, quantities of information bits in the X1 first-type outer-code subcodes are $P_1, P_2, \ldots,$ and $P_{X1}$, $P_i$ (i=1, 2, . . . , X1) is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0; and performing encoding based on I.

According to the encoding method provided in the first aspect, when the set I corresponding to the subchannels of the information bits is determined based on K and N, the information bits corresponding to the subchannel sequence numbers in the determined I are distributed in the X outer-code subcodes, the X outer-code subcodes include the X1 first-type outer-code subcodes, the quantities of information bits in the X1 first-type outer-code subcodes are $P_1, P_2, \ldots,$ and $P_{X1}$, $P_i$(i=1, 2, . . . , X1) is one of $K_1, K_2, \ldots,$ and $K_m$, $K_1, K_2, \ldots,$ and $K_m$ are greater than the first threshold LB and less than the second threshold HB, LB+1<HB, and m is less than (HB−LB−1). Therefore, $P_1, P_2, \ldots,$ and $P_{X1}$ are not all values between LB and HB. In other words, the X outer-code subcodes include an outer-code subcode with a preset intermediate code rate (that is, $P_i$/B), but do not include all outer-code subcodes with intermediate code rates. Therefore, during decoding at a decoder side, the outer-code subcode with the intermediate code rate may be decoded according to a classic decoding algorithm of an algebraic code. Compared with decoding the outer-code subcode with the intermediate code rate according to a polar decoding algorithm, a decoding delay of the outer-code subcode with the intermediate code rate can be reduced. In this way, the decoding delay can be reduced, and a throughput rate can be improved.

In a possible design, I is determined based on a set L corresponding to subchannels of an initial information bit, a set $F_1$ corresponding to subchannels of an initial frozen bit, LB, HB, B, $K_1, K_2, \ldots,$ and $K_m$; and $I_1$ and $F_1$ are obtained based on K and N according to a reliability criterion.

An existing reliability determining manner may be used for $I_1$ and $F_1$. For example, a reliability sequence Q of each subchannel may be obtained by using Gaussian approximation, density evolution, polar weight, or another method. K subchannels with highest reliability in Q are the subchannels of the information bits, remaining N−K subchannels are the subchannels of the frozen bit, and $I_1$ and $F_1$ are correspondingly determined.

In a possible design, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB.

According to the encoding method provided in this implementation, the X outer-code subcodes include the X1 first-type outer-code subcodes, the second-type outer-code subcode, and/or the third-type outer-code subcode. The first-type outer-code subcodes are outer-code subcodes with the preset intermediate code rate (that is, $P_i/B$), but are not all outer-code subcodes, between $_B/^{LB}$ and $_B/^H$, with the intermediate code rate. Therefore, during decoding at the decoder side, the outer-code subcode with the intermediate code rate that is $P_i/B$ may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced, and parallel polarization decoding may be performed on an outer-code subcode with a high code rate and/or an outer-code subcode with a low code rate. In this way, the overall decoding delay can be reduced, and the throughput rate can be improved.

In a possible design, when the X outer-code subcodes include the X1 first-type outer-code subcodes, and I is determined based on $I_1, F_1$, LB, HB, B, $K_1, K_2, \ldots$, and $K_m$, a first outer-code subcode set and a second outer-code subcode set are determined based on $_B/^N$ outer-code subcodes, where the first outer-code subcode set includes the first-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$; a fourth-type outer-code subcode in the second outer-code subcode set is adjusted to the first-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to one of $K_1, K_2, \ldots$, and $K_m$; and I is determined based on the first outer-code subcode set and the adjusted second outer-code subcode set.

In a possible design, the adjusting a fourth-type outer-code subcode in the second outer-code subcode set to the first-type outer-code subcode may be: adjusting a quantity of information bits in the fourth-type outer-code subcode to enable the quantity of information bits in the fourth-type outer-code subcode to be one of $K_1, K_2, \ldots$, and $K_m$.

According to the encoding method provided in this implementation, the quantity of information bits in the fourth-type outer-code subcode is adjusted to enable the quantity of information bits in the fourth-type outer-code subcode to be one of $K_1, K_2, \ldots$, and $K_m$. In other words, the fourth-type outer-code subcode is adjusted to the first-type outer-code subcode. Therefore, during decoding at the decoder side, the outer-code subcode with the intermediate code rate that is $P_i/B$ may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced.

In a possible design, when the X outer-code subcodes include the X1 first-type outer-code subcodes, the adjusting a quantity of information bits in the fourth-type outer-code subcode may be specifically: when the quantity of information bits is adjusted for the $i^{th}$ fourth-type outer-code subcode, performing the following operation: determining t and y, where t is a subchannel sequence number of an information bit with lowest reliability in the $i^{th}$ fourth-type outer-code subcode, y is a subchannel sequence number of a frozen bit with highest reliability in a first set, and the first set is a set including subchannel sequence numbers of frozen bits in all fourth-type outer-code subcodes other than the $i^{th}$ fourth-type outer-code subcode; determining whether a first condition is met, where the first condition is: a quantity n of information bits in an outer-code subcode in which a $y^{th}$ subchannel is located is greater than or equal to HB-1, or n is less than LB, or the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB-2); if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is one of $K_1, K_2, \ldots$, and $K_m$.

In a possible design, when the X outer-code subcodes further include the second-type outer-code subcode and/or the third-type outer-code subcode, and I is determined based on $I_1, F_1$, LB, HB, B, $K_1, K_2, \ldots$, and $K_m$, a first outer-code subcode set and a second outer-code subcode set are determined based on $_B/^N$ outer-code subcodes, where the first outer-code subcode set includes the first-type outer-code subcode, the second-type outer-code subcode, and/or the third-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$; a fourth-type outer-code subcode in the second outer-code subcode set is adjusted to any one of the first-type outer-code subcode, the second-type outer-code subcode, and the third-type outer-code subcode, where a quantity of information bits in an $i^{th}$ fourth-type outer-code subcode is $Y_i$ is greater than or equal to 1, $Y_i$ is greater than LB and less than HB, and $Y_i$ is not equal to one of $K_1, K_2, \ldots$, and $K_m$; and I is determined based on the first outer-code subcode set and the adjusted second outer-code subcode set.

In a possible design, the adjusting a fourth-type outer-code subcode in the second outer-code subcode set to any one of the first-type outer-code subcode, the second-type outer-code subcode, and the third-type outer-code subcode includes: adjusting a quantity of information bits in the fourth-type outer-code subcode to enable the quantity of information bits in the fourth-type outer-code subcode to be any one of the following: $K_1, K_2, \ldots$, and $K_m$, less than or equal to LB, or greater than or equal to HB.

The quantity of information bits in the fourth-type outer-code subcode is adjusted to enable the quantity of information bits in the fourth-type outer-code subcode to be one of $K_1, K_2, \ldots$, and $K_m$, less than or equal to LB, or greater than or equal to HB. In other words, the fourth-type outer-code subcode is adjusted to any one of the first-type outer-code subcode, the second-type outer-code subcode, and the third-type outer-code subcode. The first-type outer-code subcode is the outer-code subcode with the intermediate code rate that is $P_i/B$, the second-type outer-code subcode is the outer-code subcode with the low code rate, and the third-type outer-code subcode is the outer-code subcode with the high code rate. Therefore, during decoding at the decoder side, the outer-code subcode with the intermediate code rate that is $P_i/B$ may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced, and parallel polarization decoding may be performed on the outer-code subcode with the high code rate and/or the outer-code subcode with the low code rate. In this way, the overall decoding delay can be reduced, and the throughput rate can be improved.

In a possible design, the adjusting a quantity of information bits in the fourth-type outer-code subcode includes: when the quantity of information bits is adjusted for the $i^{th}$ fourth-type outer-code subcode, performing the following operation: determining t and y, where t is a subchannel sequence number of an information bit with lowest reliability in the $i^{th}$ fourth-type outer-code subcode, y is a subchannel sequence number of a frozen bit with highest reliability in a second set, and the second set is a set including subchannel sequence numbers of frozen bits in all fourth-type outer-code subcodes other than the $i^{th}$ fourth-type outer-code subcode; determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2); if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following: $K_1, K_2, \ldots,$ and $K_m$, less than or equal to LB, or greater than or equal to HB.

In a possible design, the first-type outer-code subcode is an algebraic code, $K_1, K_2, \ldots,$ and $K_m$ are determined based on an error correction capability of the algebraic code, and m is determined based on construction of the algebraic code.

The algebraic code may be a BCH code, an RS code, or the like. Values of $K_1, K_2, \ldots,$ and $K_m$ are determined based on the error correction capability of the algebraic code, and m is determined based on the construction of the algebraic code.

In a possible design, a code length of the algebraic code is equal to the length B of the outer-code subcode. Because the outer-code subcode whose code length is B is replaced with the algebraic code, the code length of the algebraic code needs to be equal to the length B of the outer-code subcode.

In a possible design, the algebraic code is obtained by using any one of the following methods based on an original algebraic code whose length is B−1: copying any bit in the original algebraic code whose length is B−1, and adding the copied bit to the original algebraic code to obtain the algebraic code; and performing parity check on any Z bits or all bits in the original algebraic code whose length is B−1 and adding a parity check value to the original algebraic code to obtain the algebraic code, where 1<Z<B−1.

In a possible design, when the first-type outer-code subcode is the algebraic code, the performing encoding based on I may be: determining subchannels other than the subchannels in I as a set F corresponding to the subchannels of the frozen bits; and determining a value of a bit on each subchannel, performing algebraic code encoding on a bit corresponding to the first-type outer-code subcode, and performing polar encoding on a bit corresponding to an outer-code subcode other than the first-type outer-code subcode.

In a possible design, when the first-type outer-code subcode is polar code, the performing encoding based on I may be: determining, based on I, a set A corresponding to subchannels of a local check bit, where local check bits corresponding to subchannel sequence numbers in A are distributed in the first-type outer-code subcodes, a location of a local check bit corresponding to a subchannel sequence number in A in the first-type outer-code subcode and a check relationship between the information bit and/or the frozen bit and the local check bit are indicated by using third indication information in a preset indication vector whose length is B, the quantities $P_1, P_2, \ldots,$ and $P_{X1}$ of the information bits in the X1 first-type outer-code subcodes correspond to the preset indication vector, the check relationship is used to determine a value of the local check bit, the preset indication vector includes first indication information, second indication information, and the third indication information, the first indication information indicates that a corresponding location is the frozen bit, and the second indication information indicates that a corresponding location is the information bit; determining that subchannel sequence numbers other than the subchannel sequence numbers included in I and A are subchannel sequence numbers in the set F corresponding to the subchannels of the frozen bits; and determining a value of a bit on each subchannel, and performing polar encoding on all determined bits.

In a possible design, the determining, based on I, a set A corresponding to subchannels of a local check bit includes: determining, for each first-type outer-code subcode, the location of the local check bit in the first-type outer-code subcode based on the preset indication vector corresponding to the quantities $P_1, P_2, \ldots,$ and $P_{X1}$ of the information bits in the first-type outer-code subcode; and determining A based on the determined location of the local check bit in each first-type outer-code subcode.

In a possible design, the determining, based on I, a set A corresponding to subchannels of a local check bit includes: inserting the frozen bit based on I to obtain a first indication vector whose length is N, where the first indication vector includes the first indication information and the second indication information; grouping first indication vectors based on the length B of the outer-code subcode to obtain $_B/^N$ second indication vectors; and performing the following processing on the $_B/^N$ second indication vectors to obtain $_B/^N$ third indication vectors: replacing a second indication vector whose quantity of information bits is $P_1, P_2, \ldots,$ and $P_{X1}$ with the preset indication vector corresponding to $P_1, P_2, \ldots,$ and $P_{X1}$; forming, by using the $_B/^N$ third indication vectors, a fourth indication vector whose length is N; and determining A based on the fourth indication vector.

According to the encoding method provided in this implementation, after the to-be-encoded information including the K information bits and the mother code length N are obtained, $I_1$ and $F_1$ are determined based on K and N according to the reliability criterion. I is determined based on $I_1, F_1,$ LB, HB, B, $K_1, K_2, \ldots,$ and $K_m$. The information bits corresponding to the subchannel sequence numbers in I are distributed in the X outer-code subcodes. The X outer-code subcodes include the X1 first-type outer-code subcodes, or the X outer-code subcodes include the X1 first-type outer-code subcodes, the second-type outer-code subcode, and/or the third-type outer-code subcode. When LB and HB are determined, the second-type outer-code subcode is the outer-code subcode with the low code rate, the third-type outer-code subcode is the outer-code subcode with the high code rate, and the first-type outer-code subcodes are the outer-code subcodes with the preset intermediate code rate. Then, the set A corresponding to the subchannels of the local check bit is determined based on I, the local check bits corresponding to the subchannel sequence numbers in A are distributed in the first-type outer-code subcodes, the location of the local check bit corresponding to the subchannel sequence number in A in the first-type outer-code subcode and the check relationship between the information bit and/or the frozen bit and the local check bit are indicated by using the third indication information in the preset indication vector whose length is B. Finally, polar encoding is performed based on I and A. Therefore, during decoding at the decoder side, the outer-code subcode with the intermediate code rate may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced, and parallel polarization decoding may be performed on an outer-code subcode with a high code rate and/or an outer-code subcode with a low code rate. In this way, the decoding delay can be reduced, and the throughput rate can be improved.

In a possible design, the determining a value of a bit on each subchannel includes: determining a value of a bit on a subchannel of each local check bit based on the check relationship; and separately determining a value of a bit on the subchannel of the information bit and a value of a bit on the subchannel of the frozen bit based on I and F.

According to a second aspect, this application provides an encoding apparatus, including: an obtaining module, configured to obtain to-be-encoded information and a mother code length N, where the to-be-encoded information includes K information bits, and K and N are positive integers; a determining module, configured to determine, based on K and N, a set I corresponding to subchannels of the information bits, where information bits corresponding to subchannel sequence numbers in I are distributed in X outer-code subcodes, the X outer-code subcodes include X1 first-type outer-code subcodes, quantities of information bits in the X1 first-type outer-code subcodes are $P_1, P_2, \ldots,$ and $P_{X1}$, $P_i (i=1, 2, \ldots, X1)$ is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0; and an encoding module, configured to perform encoding based on I.

In a possible design, I is determined based on a set L corresponding to subchannels of an initial information bit, a set $F_1$ corresponding to subchannels of an initial frozen bit, LB, HB, B, $K_1, K_2, \ldots,$ and $K_m$; and $I_1$ and $F_1$ are obtained based on K and N according to a reliability criterion.

In a possible design, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB.

In a possible design, the determining module includes: a first determining unit, configured to: when I is determined based on $I_1, F_1,$ LB, HB, B, $K_1, K_2, \ldots,$ and $K_m$, determine a first outer-code subcode set and a second outer-code subcode set based on $_B/^N$ outer-code subcodes, where the first outer-code subcode set includes the first-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$; an adjustment unit, configured to adjust a fourth-type outer-code subcode in the second outer-code subcode set to the first-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to $K_1, K_2, \ldots,$ and $K_m$; and a second determining unit, configured to determine I based on the first outer-code subcode set and the adjusted second outer-code subcode set.

In a possible design, the adjustment unit is configured to adjust a quantity of information bits in the fourth-type outer-code subcode to enable the quantity of information bits in the fourth-type outer-code subcode to be $K_1, K_2, \ldots,$ and $K_m$.

In a possible design, the adjustment unit is configured to: when the quantity of information bits is adjusted for the $i^{th}$ fourth-type outer-code subcode, perform the following operation: determining t and y, where t is a subchannel sequence number of an information bit with lowest reliability in the $i^{th}$ fourth-type outer-code subcode, y is a subchannel sequence number of a frozen bit with highest reliability in a first set, and the first set is a set including subchannel sequence numbers of frozen bits in all fourth-type outer-code subcodes other than the $i^{th}$ fourth-type outer-code subcode; determining whether a first condition is met, where the first condition is: a quantity n of information bits in an outer-code subcode in which a $y^{th}$ subchannel is located is greater than or equal to HB−1, or n is less than LB, or the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2); if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is $K_1, K_2, \ldots,$ and $K_m$.

In a possible design, the determining module includes: a first determining unit, configured to: when I is determined based on $I_1, F_1,$ LB, HB, B, $K_1, K_2, \ldots,$ and $K_m$, determine a first outer-code subcode set and a second outer-code subcode set are determined based on $_B/^N$ outer-code subcodes, where the first outer-code subcode set includes the first-type outer-code subcode, the second-type outer-code subcode, and/or the third-type outer-code subcode, the second outer-code subcode set is a complementary set of the first outer-code subcode, a bit sequence of the $_B/^N$ outer-code subcodes determined based on N, B, and a first bit sequence, and the first bit sequence is determined based on $I_1$ and $F_1$; an adjustment unit, configured to adjust a fourth-type outer-code subcode in the second outer-code subcode set to any one of the first-type outer-code subcode, the second-type outer-code subcode, and the third-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to $K_1, K_2, \ldots,$ and $K_m$; and a second determining unit, configured to determine I based on the first outer-code subcode set and the adjusted second outer-code subcode set.

In a possible design, the adjustment unit is configured to adjust a quantity of information bits in the fourth-type outer-code subcode to enable the quantity of information bits in the fourth-type outer-code subcode to be any one of the following: $K_1, K_2, \ldots,$ and $K_m$, less than or equal to LB, or greater than or equal to HB.

In a possible design, the adjustment unit is configured to: when the quantity of information bits is adjusted for the $i^{th}$ fourth-type outer-code subcode, perform the following operation: determining t and y, where t is a subchannel sequence number of an information bit with lowest reliability in the $i^{th}$ fourth-type outer-code subcode, y is a subchannel sequence number of a frozen bit with highest reliability in a second set, and the second set is a set including subchannel sequence numbers of frozen bits in all fourth-type outer-code subcodes other than the $i^{th}$ fourth-type outer-code subcode; determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2); if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following: $K_1, K_2, \ldots,$ and $K_m$, less than or equal to LB, or greater than or equal to HB.

In a possible design, the first-type outer-code subcode is an algebraic code, $K_1, K_2, \ldots,$ and $K_m$ are determined based on an error correction capability of the algebraic code, and m is determined based on construction of the algebraic code.

In a possible design, a code length of the algebraic code is equal to the length B of the outer-code subcode.

In a possible design, the algebraic code is obtained by using any one of the following methods based on an original algebraic code whose length is B−1: copying any bit in the original algebraic code whose length is B−1, and adding the copied bit to the original algebraic code to obtain the algebraic code; and performing parity check on any Z bits or all bits in the original algebraic code whose length is B−1, and adding a parity check value to the original algebraic code to obtain the algebraic code, where 1<Z<B−1.

In a possible design, the encoding module is configured to: determine subchannels other than the subchannels in I as a set F corresponding to the subchannels of the frozen bits; and determine a value of a bit on each subchannel, perform algebraic code encoding on a bit corresponding to the first-type outer-code subcode, and perform polar encoding on a bit corresponding to an outer-code subcode other than the first-type outer-code subcode.

In a possible design, the encoding module includes: a first determining unit, configured to determine, based on I, a set A corresponding to subchannels of a local check bit, where local check bits corresponding to subchannel sequence numbers in A are distributed in the first-type outer-code subcodes, a location of a local check bit corresponding to a subchannel sequence number in A in the first-type outer-code subcode and a check relationship between the information bit and/or the frozen bit and the local check bit are indicated by using third indication information in a preset indication vector whose length is B, the quantities $P_1, P_2, \ldots,$ and $P_{X1}$ of the information bits in the X1 first-type outer-code subcodes correspond to the preset indication vector, the check relationship is used to determine a value of the local check bit, the preset indication vector includes first indication information, second indication information, and the third indication information, the first indication information indicates that a corresponding location is the frozen bit, and the second indication information indicates that a corresponding location is the information bit; a second determining unit, configured to determine that subchannel sequence numbers other than the subchannel sequence numbers included in I and A are subchannel sequence numbers in the set F corresponding to the subchannels of the frozen bits; and an encoding unit, configured to: determine a value of a bit on each subchannel, and perform polar encoding on all determined bits.

In a possible design, the first determining unit is configured to: determine, for each first-type outer-code subcode, the location of the local check bit in the first-type outer-code subcode based on the preset indication vector corresponding to the quantities $P_1, P_2, \ldots,$ and $P_{X1}$ of the information bits in the first-type outer-code subcode; and determine A based on the determined location of the local check bit in each first-type outer-code subcode.

In a possible design, the first determining unit is configured to: insert the frozen bit based on I to obtain a first indication vector whose length is N, where the first indication vector includes the first indication information and the second indication information; group first indication vectors based on the length B of the outer-code subcode to obtain $_B{}^{/N}$ second indication vectors; and perform the following processing on the $_B{}^{/N}$ second indication vectors to obtain $_B{}^{/N}$ third indication vectors: replacing a second indication vector whose quantity of information bits is $P_1, P_2, \ldots,$ and $P_{X1}$ with the preset indication vector corresponding to $P_1, P_2, \ldots,$ and $P_{X1}$; forming, by using the $_B{}^{/N}$ third indication vectors, a fourth indication vector whose length is N; and determining A based on the fourth indication vector.

In a possible design, the encoding unit is configured to: determine a value of a bit on a subchannel of each local check bit based on the check relationship; and separately determine a value of a bit on the subchannel of the information bit and a value of a bit on the subchannel of the frozen bit based on I and F.

For beneficial effects in the second aspect and the possible designs of the second aspect, refer to the beneficial effects in the first aspect and the possible designs of the first aspect. Details are not described herein again.

According to a third aspect, this application provides a decoding method, including: obtaining to-be-decoded information, a length M of the to-be-decoded information, a mother code length N, and a quantity K of information bits; determining, based on K and N, a set I corresponding to subchannels of the information bits, where information bits corresponding to subchannel sequence numbers in I are distributed in X outer-code subcodes, the X outer-code subcodes include X1 first-type outer-code subcodes, quantities of information bits in the X1 first-type outer-code subcodes are $P_1, P_2, \ldots,$ and $P_{X1}$, $P_i$ (i=1, 2, . . . , X1) is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0; and decoding the to-be-decoded information, where algebraic code decoding is performed on the first-type outer-code subcode.

According to the decoding method provided in the third aspect, after the to-be-decoded information, the length M of the to-be-decoded information, the mother code length N, and the quantity K of information bits are obtained, the set I corresponding to the subchannels of the information bits is determined based on K and N. The information bits corresponding to the subchannel sequence numbers in the determined I are distributed in the X outer-code subcodes, the X outer-code subcodes include the X1 first-type outer-code subcodes, the quantities of information bits in the X1 first-type outer-code subcodes are $P_1, P_2, \ldots,$ and $P_{X1}$, $P_i$ (i=1, 2, . . . , X1) is one of $K_1, K_2, \ldots,$ and $K_m$, $K_1, K_2, \ldots,$ and $K_m$ are greater than the first threshold LB and less than the second threshold HB, LB+1<HB, and m is less than (HB−LB−1). P is not all values between LB and HB. In other words, the X outer-code subcodes include an outer-code subcode with a preset intermediate code rate (that is, $P_i/B$), but do not include all outer-code subcodes with intermediate code rates. Therefore, during decoding at a decoder side, the outer-code subcode with the intermediate code rate may be decoded according to a classic decoding algorithm of an algebraic code. Compared with decoding the outer-code subcode with the intermediate code rate according to a polar decoding algorithm, a decoding delay of the outer-code subcode with the intermediate code rate can be reduced. In this way, the decoding delay can be reduced, and a throughput rate can be improved.

In a possible design, I is determined based on a set L corresponding to subchannels of an initial information bit, a set F, corresponding to subchannels of an initial frozen bit, LB, HB, B, $K_1, K_2, \ldots,$ and $K_m$; and $I_1$ and $F_1$ are obtained based on K and N according to a reliability criterion.

An existing reliability determining manner may be used for $I_1$ and $F_1$. For example, a reliability sequence Q of each subchannel may be obtained by using Gaussian approximation, density evolution, polar weight, or another method. K subchannels with highest reliability in Q are the subchannels of the information bits, remaining N−K subchannels are the subchannels of the frozen bit, and L and F, are correspondingly determined.

In a possible design, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB.

According to the decoding method provided in this implementation, the X outer-code subcodes include the X1 first-type outer-code subcodes, the second-type outer-code subcode, and/or the third-type outer-code subcode. The first-type outer-code subcodes are outer-code subcodes with the preset intermediate code rate (that is, $P_i/B$), but are not all outer-code subcodes, between $_B/^{LB}$ and $_B/^H$, with the intermediate code rate. Therefore, during decoding, the outer-code subcode with the intermediate code rate that is $P_i/B$ may be decoded according to the classic decoding algorithm of the algebraic code. Compared with decoding the outer-code subcode with the intermediate code rate according to the polar decoding algorithm, the decoding delay of the outer-code subcode with intermediate code rate can be reduced, and parallel polarization decoding may be performed on an outer-code subcode with a high code rate and/or an outer-code subcode with a low code rate. In this way, the overall decoding delay can be reduced, and the throughput rate can be improved.

In a possible design, when I is determined based on $I_1$, $F_1$, LB, HB, B, $K_1, K_2, \ldots,$ and $K_m$, a first outer-code subcode set and a second outer-code subcode set are determined based on $_B/^N$ outer-code subcodes, where the first outer-code subcode set includes the first-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$; a fourth-type outer-code subcode in the second outer-code subcode set is adjusted to the first-type outer-code subcode, where a quantity of information bits in an $i^{th}$ fourth-type outer-code subcode is $Y_i$ is greater than or equal to 1, $Y_i$ is greater than LB and less than HB, $Y_i$ is not equal to $K_1, K_2, \ldots,$ and $K_m$; and I is determined based on the first outer-code subcode set and the adjusted second outer-code subcode set.

In a possible design, the adjusting a fourth-type outer-code subcode in the second outer-code subcode set to the first-type outer-code subcode includes: adjusting a quantity of information bits in the fourth-type outer-code subcode to enable the quantity of information bits in the fourth-type outer-code subcode to be $K_1, K_2, \ldots,$ and $K_m$.

According to the decoding method provided in this implementation, the quantity of information bits in the fourth-type outer-code subcode is adjusted to enable the quantity of information bits in the fourth-type outer-code subcode to be $K_1, K_2, \ldots,$ and $K_m$. In other words, the fourth-type outer-code subcode is adjusted to the first-type outer-code subcode. Therefore, during decoding, the outer-code subcode with the intermediate code rate that is $P_i/B$ may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced.

In a possible design, when the X outer-code subcodes include the X1 first-type outer-code subcodes, the adjusting a quantity of information bits in the fourth-type outer-code subcode includes: when the quantity of information bits is adjusted for the $i^{th}$ fourth-type outer-code subcode, performing the following operation: determining t and y, where t is a subchannel sequence number of an information bit with lowest reliability in the $i^{th}$ fourth-type outer-code subcode, y is a subchannel sequence number of a frozen bit with highest reliability in a first set, and the first set is a set including subchannel sequence numbers of frozen bits in all fourth-type outer-code subcodes other than the $i^{th}$ fourth-type outer-code subcode; determining whether a first condition is met, where the first condition is: a quantity n of information bits in an outer-code subcode in which a $y^{th}$ subchannel is located is greater than or equal to HB−1, or n is less than LB, or the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2); if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is $K_1, K_2, \ldots,$ and $K_m$.

In a possible design, when the X outer-code subcodes further include the second-type outer-code subcode and/or the third-type outer-code subcode, and I is determined based on $I_1, F_1,$ LB, HB, B, $K_1, K_2, \ldots,$ and $K_m$, a first outer-code subcode set and a second outer-code subcode set are determined based on $_B/^N$ outer-code subcodes, where the first outer-code subcode set includes the first-type outer-code subcode, the second-type outer-code subcode, and/or the third-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$; a fourth-type outer-code subcode in the second outer-code subcode set is adjusted to any one of the first-type outer-code subcode, the second-type outer-code subcode, and the third-type outer-code subcode, where a quantity of information bits in an $i^{th}$ fourth-type outer-code subcode is $Y_i$ is greater than or equal to 1, $Y_i$ is greater than LB and less than HB, and $Y_i$ is not equal to one of $K_1, K_2, \ldots,$ and $K_m$; and I is determined based on the first outer-code subcode set and the adjusted second outer-code subcode set.

In a possible design, the adjusting a fourth-type outer-code subcode in the second outer-code subcode set to any one of the first-type outer-code subcode, the second-type outer-code subcode, and the third-type outer-code subcode includes: adjusting a quantity of information bits in the fourth-type outer-code subcode to enable the quantity of information bits in the fourth-type outer-code subcode to be any one of the following: one of $K_1, K_2, \ldots,$ and $K_m$, less than or equal to LB, or greater than or equal to HB.

The quantity of information bits in the fourth-type outer-code subcode is adjusted to enable the quantity of information bits in the fourth-type outer-code subcode to be one of $K_1, K_2, \ldots,$ and $K_m$, less than or equal to LB, or greater than or equal to HB. In other words, the fourth-type outer-code subcode is adjusted to any one of the first-type outer-code subcode, the second-type outer-code subcode, and the third-type outer-code subcode. The first-type outer-code subcode is the outer-code subcode with the intermediate code rate that is $P_i/B$, the second-type outer-code subcode is the outer-code subcode with the low code rate, and the third-type outer-code subcode is the outer-code subcode with the high code rate. Therefore, during decoding, the outer-code subcode with the intermediate code rate that is $P_i/B$ may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced, and parallel polarization decoding may be performed on the outer-code subcode with the high code rate and/or the outer-code subcode with the low code rate. In this way, the overall decoding delay can be reduced, and the throughput rate can be improved.

In a possible design, the adjusting a quantity of information bits in the fourth-type outer-code subcode includes: when the quantity of information bits is adjusted for the $i^{th}$ fourth-type outer-code subcode, performing the following operation: determining t and y, where t is a subchannel sequence number of an information bit with lowest reliability in the $i^{th}$ fourth-type outer-code subcode, y is a subchannel sequence number of a frozen bit with highest reliability in a second set, and the second set is a set including subchannel sequence numbers of frozen bits in all fourth-type outer-code subcodes other than the $i^{th}$ fourth-type outer-code subcode; determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2); if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following: $K_1, K_2, \ldots,$ and $K_m$, less than or equal to LB, or greater than or equal to HB.

In a possible design, the first-type outer-code subcode is an algebraic code, $K_1, K_2, \ldots,$ and $K_m$ are determined based on an error correction capability of the algebraic code, and m is determined based on construction of the algebraic code.

The algebraic code may be a BCH code, an RS code, or the like. Values of $K_1, K_2, \ldots,$ and $K_m$ are determined based on the error correction capability of the algebraic code, and m is determined based on the construction of the algebraic code.

In a possible design, a code length of the algebraic code is equal to the length B of the outer-code subcode. Because the outer-code subcode whose code length is B is replaced with the algebraic code, the code length of the algebraic code needs to be equal to the length B of the outer-code subcode.

In a possible design, the algebraic code is obtained by using any one of the following methods based on an original algebraic code whose length is B−1: copying any bit in the original algebraic code whose length is B−1, and adding the copied bit to the original algebraic code to obtain the algebraic code; and performing parity check on any Z bits or all bits in the original algebraic code whose length is B−1, and adding a parity check value to the original algebraic code to obtain the algebraic code, where 1<Z<B−1.

In a possible design, when the X outer-code subcodes further include the second-type outer-code subcode and/or the third-type outer-code subcode, parallel polar decoding is performed on the second-type outer-code subcode or the third-type outer-code subcode.

According to a fourth aspect, this application provides a decoding apparatus, including: an obtaining module, configured to obtain to-be-decoded information, a length M of the to-be-decoded information, a mother code length N, and a quantity K of information bits; a determining module, configured to determine, based on K and N, a set I corresponding to subchannels of the information bits, where information bits corresponding to subchannel sequence numbers in I are distributed in X outer-code subcodes, the X outer-code subcodes include X1 first-type outer-code subcodes, quantities of information bits in the X1 first-type outer-code subcodes are $P_1, P_2, \ldots,$ and $P_{X1}$, $P_i$ (i= 1, 2, . . . , X1) is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0; and a decoding module, configured to decode the to-be-decoded information, where algebraic code decoding is performed on the first-type outer-code subcode.

In a possible design, I is determined based on a set L corresponding to subchannels of an initial information bit, a set $F_1$ corresponding to subchannels of an initial frozen bit, LB, HB, B, $K_1, K_2, \ldots,$ and $K_m$; and $I_1$ and $F_1$ are obtained based on K and N according to a reliability criterion.

In a possible design, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB.

In a possible design, the determining module includes: a first determining unit, configured to: when I is determined based on $I_1, F_1,$ LB, HB, B, $K_1, K_2, \ldots,$ and $K_m$, determine a first outer-code subcode set and a second outer-code subcode set based on $_B\!/^N$ outer-code subcodes, where the first outer-code subcode set includes the first-type outer-code subcode, the second outer-code subcode set is a complementary set of the first outer-code subcode, a bit sequence of the $_B\!/^N$ outer-code subcodes is determined based on N, B, and a first bit sequence, and the first bit sequence is determined based on $I_1$ and $F_1$; an adjustment unit, configured to adjust a fourth-type outer-code subcode in the second outer-code subcode set to the first-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to $K_1, K_2, \ldots,$ and $K_m$; and a second determining unit, configured to determine I based on the first outer-code subcode set and the adjusted second outer-code subcode set.

In a possible design, the adjustment unit is configured to adjust a quantity of information bits in the fourth-type outer-code subcode to enable the quantity of information bits in the fourth-type outer-code subcode to be $K_1, K_2, \ldots,$ and $K_m$.

In a possible design, the adjustment unit is configured to: when the quantity of information bits is adjusted for the $i^{th}$ fourth-type outer-code subcode, perform the following operation: determining t and y, where t is a subchannel sequence number of an information bit with lowest reliability in the $i^{th}$ fourth-type outer-code subcode, y is a subchannel sequence number of a frozen bit with highest reliability in a first set, and the first set is a set including subchannel sequence numbers of frozen bits in all fourth-type outer-code subcodes other than the $i^{th}$ fourth-type outer-code subcode; determining whether a first condition is met, where the first condition is: a quantity n of information bits in an outer-code subcode in which a $y^{th}$ subchannel is located is greater than or equal to HB−1, or n is less than LB, or the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2); if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is $K_1, K_2, \ldots,$ and $K_m$.

In a possible design, the determining module includes: a first determining unit, configured to: when I is determined based on $I_1, F_1,$ LB, HB, B, $K_1, K_2, \ldots,$ and $K_m$, determine a first outer-code subcode set and a second outer-code subcode set are determined based on $_B\!/^N$ outer-code subcodes, where the first outer-code subcode set includes the first-type outer-code subcode, the second-type outer-code subcode, and/or the third-type outer-code subcode, the second outer-code subcode set is a complementary set of the first outer-code subcode, a bit sequence of the $_B\!/^N$ outer-code subcodes is determined based on N, B, and a first bit sequence, and the first bit sequence is determined based on $I_1$ and $F_1$; an adjustment unit, configured to adjust a fourth-type outer-code subcode in the second outer-code subcode set to any one of the first-type outer-code subcode, the second-type outer-code subcode, and the third-type outer-code subcode, where a quantity of information bits in an $i^{th}$ fourth-type outer-code subcode is $Y_i$ is greater than LB and less than HB, i is greater than or equal to 1, and $Y_i$ is not equal to $K_1, K_2, \ldots,$ and $K_m$; and a second determining unit, configured to determine I based on the first outer-code subcode set and the adjusted second outer-code subcode set.

In a possible design, the adjustment unit is configured to adjust a quantity of information bits in the fourth-type outer-code subcode to enable the quantity of information bits in the fourth-type outer-code subcode to be any one of the following: $K_1, K_2, \ldots,$ and $K_m$, less than or equal to LB, or greater than or equal to HB.

In a possible design, the adjustment unit is configured to: when the quantity of information bits is adjusted for the $i^{th}$ fourth-type outer-code subcode, perform the following operation: determining t and y, where t is a subchannel sequence number of an information bit with lowest reliability in the $i^{th}$ fourth-type outer-code subcode, y is a subchannel sequence number of a frozen bit with highest reliability in a second set, and the second set is a set including subchannel sequence numbers of frozen bits in all fourth-type outer-code subcodes other than the $i^{th}$ fourth-type outer-code subcode; determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB 2); if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following: $K_1, K_2, \ldots,$ and $K_m$, less than or equal to LB, or greater than or equal to HB.

In a possible design, the first-type outer-code subcode is an algebraic code, $K_1, K_2, \ldots,$ and $K_m$ are determined based on an error correction capability of the algebraic code, and m is determined based on construction of the algebraic code.

In a possible design, a code length of the algebraic code is equal to the length B of the outer-code subcode.

In a possible design, the algebraic code is obtained by using any one of the following methods based on an original algebraic code whose length is B−1: copying any bit in the original algebraic code whose length is B−1, and adding the copied bit to the original algebraic code to obtain the algebraic code; and performing parity check on any Z bits or all bits in the original algebraic code whose length is B−1, and adding a parity check value to the original algebraic code to obtain the algebraic code, where $1<Z<B-1$.

In a possible design, the decoding module is further configured to: perform parallel polar decoding on the second-type outer-code subcode or the third-type outer-code subcode.

For beneficial effects in the fourth aspect and the possible designs of the fourth aspect, refer to the beneficial effects in the third aspect and the possible designs of the third aspect. Details are not described herein again.

According to a fifth aspect, this application provides an encoding apparatus, including a processor, configured to execute a program stored in a memory. When the program is executed, the encoding apparatus is enabled to perform the encoding method according to any one of the first aspect or the possible designs of the first aspect.

According to a sixth aspect, this application provides a decoding apparatus, including a processor, configured to execute a program stored in a memory. When the program is executed, the decoding apparatus is enabled to perform the decoding method according to any one of the third aspect or the possible designs of the third aspect.

According to a seventh aspect, this application provides a computer-readable storage medium. The computer-readable storage medium stores executable instructions. When the executable instructions are run on a computer, the encoding method according to any one of the first aspect or the possible designs of the first aspect is enabled to be performed.

According to an eighth aspect, this application provides a computer-readable storage medium. The computer-readable storage medium stores executable instructions. When the executable instructions are run on a computer, the decoding method according to any one of the third aspect or the possible designs of the third aspect is enabled to be performed.

According to a ninth aspect, this application provides a program product. The program product includes executable instructions, and the executable instructions are stored in a computer-readable storage medium. At least one processor of an encoding apparatus may read the executable instructions from the computer-readable storage medium, and the at least one processor executes the executable instructions to enable the encoding apparatus to implement the method according to any one of the first aspect or the possible designs of the first aspect.

According to a tenth aspect, this application provides a program product. The program product includes executable instructions, and the executable instructions are stored in a computer-readable storage medium. At least one processor of a decoding apparatus may read the executable instructions from the computer-readable storage medium, and the at least one processor executes the executable instructions to enable the decoding apparatus to implement the decoding method according to any one of the third aspect or the possible designs of the third aspect.

According to an eleventh aspect, this application provides a communications apparatus, including an input/output interface and a logic circuit. The input/output interface is configured to obtain to-be-encoded information, and the logic circuit is configured to perform the method according to any one of the first aspect or the possible designs of the first aspect to perform encoding based on the to-be-encoded information.

According to a twelfth aspect, this application provides a communications apparatus, including an input/output interface and a logic circuit. The input/output interface is configured to obtain to-be-decoded information, and the logic circuit is configured to perform the method according to any one of the third aspect or the possible designs of the third aspect to perform decoding based on the to-be-decoded information.

DETAILED DESCRIPTION OF ILLUSTRATIVE EMBODIMENTS

[ono] In embodiments of this application, words such as "example" or "for example" are used to represent examples, instances, or description. Any embodiment or solution described as "example" or "for example" in embodiments of this application is not to be construed as being more preferred or advantageous than other embodiments or solutions. Exactly, use of the word such as "example" or "for example" is intended to present a related concept in a specific manner.

In embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Figure 1:
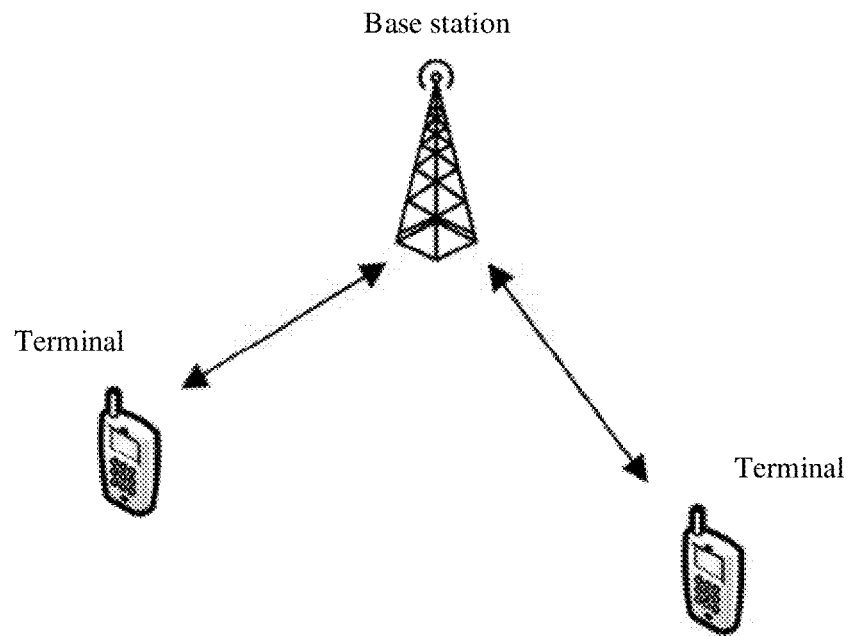
FIG. 1 is a schematic flowchart of a communications system.

Embodiments of this application may be applied to a wireless communications system such as a 5G mobile communications system or a satellite communications system. FIG. 1 is a schematic diagram of a communications system according to this application. As shown in FIG. 1, the wireless communications system usually includes cells, each cell includes one network device, and a base station provides communications services for a plurality of terminals.

It should be noted that the wireless communications system mentioned in embodiments of this application includes but is not limited to a narrowband Internet of things (NB-IoT) system, a long term evolution (LTE) system, and three application scenarios of a 5G mobile communications system: enhanced mobile broadband (eMBB), ultra-reliable low-latency communication (URLLC), and massive machine-type communications (mMTC).

In embodiments of this application, the base station is an apparatus that is deployed in a radio access network and that provides a wireless communications function for the terminal. The base station may include an evolved NodeB (eNB or eNodeB) in LTE in various forms, a base station in a 5G network or a future evolved public land mobile network (PLMN), a broadband network gateway (BNG), or an aggregation switch or a non-3rd generation partnership project (3GPP) access device. Optionally, the network device in embodiments of this application may include base stations in various forms, for example, a macro base station, a micro base station (also referred to as a small cell), a relay station, an access point, a 5G base station or a future base station, a transmission reception point (TRP), a transmitting point (TP), a mobile switching center, a device that undertakes a base station function in device-to-device (D2D), vehicle-to-everything (V2X), and machine-to-machine (M2M) communication, and the like. For ease of description, in all embodiments of this application, all the foregoing apparatuses that provide a wireless communications function for the terminal are referred to as a network device, a base station, or a BS.

Terminals included in embodiments of this application may include various handheld devices, vehicle-mounted devices, wearable devices, or computing devices that have a wireless communications function, or other processing devices connected to a wireless modem. The terminal may be a mobile phone, a tablet computer (Pad), a computer with a wireless transceiver function, user equipment (UE), an access terminal, a subscriber unit, a subscriber station, a mobile station, a handheld device having a wireless communications function, a computing device or another processing device connected to a wireless modem, a vehicle-mounted device or a wearable device, a virtual reality (VR) terminal device, an augmented reality (AR) terminal device, a wireless device in industrial control, a wireless device in self driving, a wireless device in remote medical, a wireless device in a smart grid, a wireless device in transportation safety, a wireless device in a smart city, a wireless device in a smart home, and the like. This is not limited herein.

In the wireless communications system shown in FIG. 1, a base station and a terminal may be transmit devices or receive devices. The transmit device is an encoder side, and may be configured to encode and output encoded information. The encoded information is transmitted to a decoder side on a channel. The receive device is the decoder side, and may be configured to: receive the encoded information sent by the transmit device, and decode the encoded information.

Figure 2:
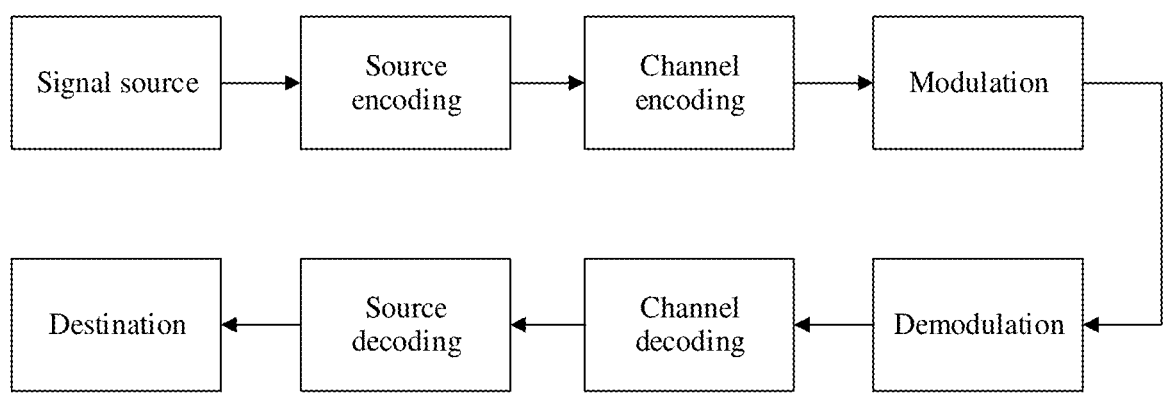
FIG. 2 is a flowchart of encoding a polar code according to this application.

FIG. 2 is a schematic flowchart of a communications system. As shown in FIG. 2, on a transmit device side, a signal source is sent after source encoding, channel encoding, and digital modulation are sequentially performed. On a receive device side, digital demodulation is performed on received to-be-decoded information to obtain a log likelihood ratio (LLR) sequence, and then channel decoding and source decoding are performed on the LLR sequence to obtain decoded information. Channel encoding plays is crucial to reliability of information transmission in the entire communications system. A polar code may be used for channel encoding, and specifically, the encoding method provided in this application may be used.

In a related technology, to reduce a decoding delay, a simplified SC/SCL decoding algorithm is used. A decoding tree (full binary tree) is pruned. To be specific, outer codes are combined to obtain a plurality of outer-code subcodes, and the plurality of outer-code subcodes are decoded in parallel to reduce the decoding delay. However, when a code rate of the outer-code subcode is close to ½, decoding complexity is high, and parallelization is difficult. To resolve this problem, this application provides an encoding method and apparatus. When a set I corresponding to subchannels of information bits is determined, information bits corresponding to subchannel sequence numbers in the determined I are distributed in X outer-code subcodes, the X outer-code subcodes include X1 first-type outer-code subcodes, quantities of information bits in the X1 first-type outer-code subcodes are $P_1, P_2, \ldots,$ and $P_{X1}$, $P_i$ ($i=1, 2, \ldots, X1$) is one of $K_1, K_2, \ldots,$ and $K_m$, $K_1, K_2,$ and $K_m$ are greater than the first threshold LB and less than the second threshold HB, $LB+1<HB$, and m is less than $(HB-LB-1)$. $K_1, K_2, \ldots,$ and $K_m$ are not all values between LB and HB. In other words, the X outer-code subcodes include X1 outer-code subcodes with a preset intermediate code rate (that is, $P_i/B$), and $i=1, 2, \ldots, X1$), include all outer-code subcodes with intermediate code rates. Therefore, during decoding at a decoder side, the outer-code subcode with the intermediate code rate may be decoded according to a classic decoding algorithm of an algebraic code. Compared with decoding the outer-code subcode with the intermediate code rate according to a polar decoding algorithm, a decoding delay of the outer-code subcode with the intermediate code rate can be reduced. In this way, the decoding delay can be reduced, and a throughput rate can be improved. The encoding method and apparatus provided in this application are described in detail in the following with reference to the accompanying drawings.

It should be noted that the quantities $P_i$ of information bits in the X1 first-type outer-code subcodes included in the X outer-code subcodes may be the same or different. For example, values of $P_1$ and $P_2$ may be the same and are both $K_1$. For another example, $P_1$ may be $K_1$, and a value of $P_2$ may be $K_3$. This is not limited in this application.

For ease of understanding, definitions of parameters that may be used in this application are first provided as follows:
K: a quantity of information bits;
N: a mother code length;
M: a length of an encoded bit sequence;
R: a target code rate (R=K/M);

$N_{max}$: a maximum mother code length supported by a system, and referred to as a maximum mother code length in the following;

I: a set corresponding to subchannels of an information bit;

Q: a subchannel sequence sorted based on reliability;

F: a set corresponding to subchannels of a frozen bit; and

A: a set corresponding to subchannels of a local check bit.

It should be noted that, on the premise that no context ambiguity is caused, in this specification, P represents the quantities $P_i$ of the first-type outer-code subcodes, that is, $P_1$, $P_2$, ..., and $P_{X1}$.

Figure 3:
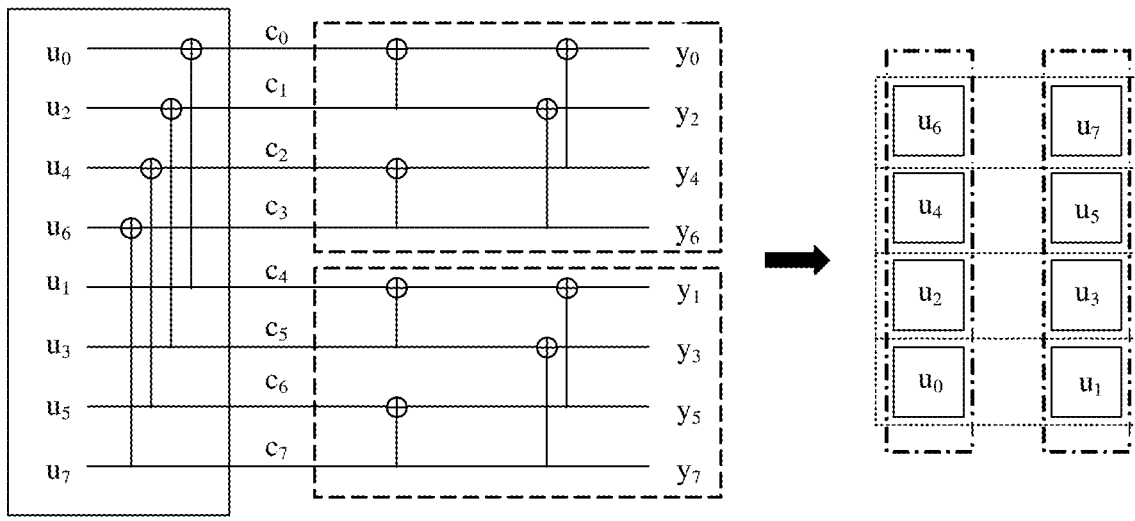
FIG. 3 is a schematic composition diagram of an outer code and an inner code.

A polar code may be considered as a generalized concatenated code (GCC), and includes an outer code and an inner code. Concepts of the outer code and the inner code of the polar code are explained below with reference to FIG. 3. FIG. 3 is a schematic composition diagram of the outer code and the inner code. In FIG. 3, an example in which a mother code length N is 8 and a quantity of inner codes is 2 is used. An inner-code length is 4, a quantity of outer codes is 4, and an outer-code length is 2. In the right block shown in FIG. 3, $[u_0\ u_1]$ is a to-be-encoded bit of an outer code, $[u_2\ u_3]$ is a to-be-encoded bit of an outer code, $[u_4\ u_5]$ is a to-be-encoded bit of an outer code, and $[u_6\ u_7]$ is a to-be-encoded bit of an outer code. As shown in FIG. 3, to-be-encoded bits of an inner code are $[c_0\ c_1\ c_2\ c_3]$, and to-be-encoded bits of another inner code are $[c_4\ c_5\ c_6\ c_7]$. An encoding process is as follows. First, outer-code encoding is performed on a to-be-encoded bit sequence. To be specific, outer-code encoding with a code length of 2 is performed on $u_0$ and $u_1$ to obtain outer-code encoded codewords $c_0$ and $c_4$, outer-code encoding with the code length of 2 is performed on $u_2$ and $u_3$ to obtain outer-code encoded codewords $c_1$ and $c_5$, outer-code encoding with the code length of 2 is performed on $u_4$ and $u_5$ to obtain outer-code encoded codewords $c_2$ and $c_6$, and outer-code encoding with the code length of 2 is performed on $u_6$ and $u_7$ to obtain outer-code encoded codewords $c_3$ and $c_7$. Then, encoded bits at a same location of each outer code are extracted to perform inner-code encoding. To be specific, a first encoded bit of each outer code is extracted to obtain to-be-encoded bits $[c_0\ c_1\ c_2\ c_3]$ of a first inner code, and inner-code encoding is performed to obtain an encoded bit sequence $[y_0\ y_2\ y_4\ y_6]$; and a second encoded bit of each outer code is extracted to obtain to-be-encoded bits $[c_4\ c_5\ c_6\ c_7]$ of a second inner code, and inner-code encoding is performed to obtain an encoded bit sequence $[y_1\ y_3\ y_5\ y_7]$. Finally, the bit sequences obtained after inner-code encoding are sequentially concatenated to obtain a final encoded bit sequence.

It should be noted that, in this embodiment of this application, the outer code may be referred to as an outer-code subcode or an outer-code subblock. In this embodiment of this application, the outer-code subcode is used as an example for description. To be specific, an example in which a code length of the outer-code subcode is 2 is used. In the right block shown in FIG. 3, $[u_0\ u_1]$ is the to-be-encoded bit of the outer-code subcode, $[u_2\ u_3]$ is the to-be-encoded bit of the outer-code subcode, $[u_4\ u_5]$ is the to-be-encoded bit of the outer-code subcode, and $[u_6\ u_7]$ is the to-be-encoded bit of the outer-code subcode.

Figure 4:
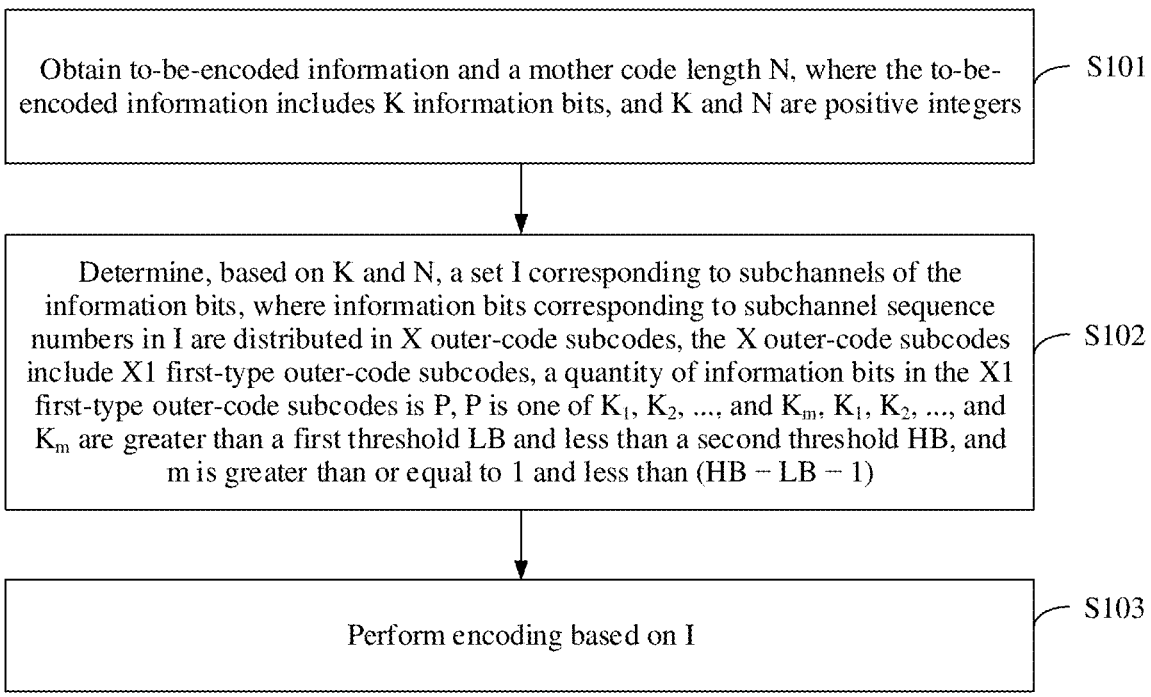
FIG. 4 is a flowchart of an embodiment of an encoding method according to this application.

FIG. 4 is a flowchart of an embodiment of an encoding method according to this application. This embodiment may be executed by a transmit device such as a base station or a terminal. As shown in FIG. 4, the method in this embodiment may include the following steps.

S101: Obtain to-be-encoded information and a mother code length N, where the to-be-encoded information includes K information bits, and K and N are positive integers.

Specifically, the mother code length (that is, a length of the to-be-encoded information) $N=2^{\lceil \log_2(m) \rceil}$, and $\lceil\ \rceil$ is a roundup function. A value of K may be determined based on a target code rate R and a length M of an encoded bit sequence, K=M*R, and K and M may be input values.

S102: Determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1, K_2, \ldots,$ and $K_m$, $K_1, K_2, \ldots,$ and $K_m$ are greater than a first threshold LB and less than a second threshold HB, and m is greater than or equal to 1 and less than (HB−LB−1).

LB+1<HB, HB is less than or equal to a length B of an outer-code subcode, X, HB, and B are positive integers, and LB is an integer greater than or equal to 0.

Optionally, lengths of the X outer-code subcodes may be equal or unequal.

Specifically, the quantity of information bits in the X1 first-type outer-code subcodes is P, and P is one of $K_1, K_2, \ldots,$ and $K_m$, that is, there may be one or more Ps. $K_1, K_2, \ldots,$ and $K_m$ are greater than LB and less than HB, a quantity of information bits between LB and HB is (HB−LB−1), and m is less than (HB−LB−1), that is, the one or more Ps are not all values between LB and HB. B, LB, and HB may be preset values, or values exchanged between a transmit device and a receive device. For example, the transmit device performs encoding after determining B, LB, and HB, and sends B, LB, and HB to the receive device before or after encoding. Alternatively, the transmit device receives, before encoding, B, LB, and HB sent by the receive device, where B, LB, and HB may be carried by using signaling.

A code rate of an outer-code subcode is a ratio of a quantity of information bits in the outer-code subcode to a code length of the outer-code subcode. For example, a quantity of information bits in an outer-code subcode whose code length is B is $m \in [0, B]$, and a code rate of the outer-code subcode is any value in $[0, {}_B/^1, {}_B/^2, \ldots, 1]$. It may be determined, based on the quantity P of information bits in the outer-code subcode, that the code rate of the outer-code subcode is ${}_B/^P$, where ${}_B/^{LB} <{}_B/^P<{}_B/^H$, which is 1 to 0 relative to the code rates. ${}_B/^P$ is an intermediate code rate. It may be understood that the intermediate code rate of the outer-code subcode is a relative concept. When LB and HB are set, the intermediate code rate refers to a code rate whose size is between ${}_B/^{LB}$ and ${}_B/^H$, a high code rate refers to a code rate greater than or equal to ${}_B/^H$, and a low code rate refers to a code rate less than or equal to a code rate of ${}_B/^{LB}$. For example, if the intermediate code rate ${}_B/^P$, may be ${}_B/^{LB}<{}_B/^P<{}_B/^H$, the high code rate is a code rate greater than or equal to ${}_B/^H$, and the low code rate is less man or equal to the code rate of ${}_B/^{LB}$. For another example, if the intermediate code rate ${}_B/^P$ may be ${}_B/^{LB} \leq {}_B/^P \leq {}_B/^H$, the high code rate is a code rate greater than ${}_B/^H$, and the low code rate is less man the code rate of ${}_B/^{LB}$.

In this embodiment, LB and HB are thresholds for classifying the low code rate, the intermediate code rate, and the high code rate. For example, when B is equal to 16, LB may be 3, 4, or 5, and HB may be 13, 12, 11, or the like. When B is equal to 32, LB may be 3, 4, 5, or 6, and HB may be 29, 28, 27, or the like.

To reduce a decoding delay, in this embodiment, the X outer-code subcodes include the X1 first-type outer-code subcodes. The first-type outer-code subcodes are outer-code subcodes with the preset intermediate code rate (that is, $_B{}^{/P}$), but are not all outer-code subcodes between $_B{}^{/LB}$ and $_B{}^{/H}$, with the intermediate code rate. Therefore, during decoding at a decoder side, the outer-code subcode with the intermediate code rate that is $_B{}^{/P}$ may be decoded according to a classic decoding algorithm of an algebraic code. For example, the outer-code subcode with the intermediate code rate that is $_B{}^{/P}$ is decoded according to a (Berlekamp-Massey, BM) algorithm. Compared with decoding the outer-code subcode with the intermediate code rate according to a polar decoding algorithm, a decoding delay of the outer-code subcode with the intermediate code rate can be reduced. In this way, the decoding delay can be reduced, and a throughput rate can be improved.

In a possible implementation, I is determined based on a set $I_1$ corresponding to subchannels of an initial information bit, a set $F_1$ corresponding to subchannels of an initial frozen bit, LB, HB, B, $K_1$, $K_2$, . . . , and $K_m$; and $I_1$ and $F_1$ are obtained based on K and N according to a reliability criterion.

Specifically, when the to-be-encoded information and the mother code length N are obtained, and the to-be-encoded information includes the K information bits, $I_1$ and $F_1$ may be determined based on K and N according to the reliability criterion, and an existing reliability determining manner may be used. For example, a reliability sequence Q of each subchannel may be obtained by using Gaussian approximation (GA), density evolution (DE), polar weight (PW), or another method. K subchannels with highest reliability in Q are the subchannels of the information bits, remaining N–K subchannels are the subchannels of the frozen bit, and $I_1$ and $F_1$ are correspondingly determined. Alternatively, another manner may be used. This is not limited in this embodiment.

After $I_1$ and $F_1$ are determined, in an implementation, when I is determined based on $I_1$, $F_1$, LB, HB, B, $K_1$, $K_2$, . . . , and $K_m$, the method may specifically include the following steps.

S1: Determine a first outer-code subcode set and a second outer-code subcode set based on $_B{}^{/N}$ outer-code subcodes, wherein the first outer-code subcode set includes the first-type outer-code subcode, the second outer-code subcode set is a complementary set of the first outer-code subcode, a bit sequence of the $_B{}^{/N}$ outer-code subcodes is determined based on N, B, and a first bit sequence, and the first bit sequence is determined based on $I_1$ and $F_1$.

Generally, the $_B{}^{/N}$ outer-code subcodes are $_B{}^{/N}$ outer-code subcodes included in a $\log_2(B)$-order butterfly operation before a polar code, and bit sequences of the $_B{}^{/N}$ outer-code subcodes may be determined based on N, B, and the first bit sequence. Specifically, the first bit sequence may be divided based on N and B, and a bit sequence of each outer-code subcode is consecutive in the first bit sequence. When the first bit sequence is determined based on $I_1$ and $F_1$, the information bit may be placed based on $I_1$, and the frozen bit may be placed based on $F_1$, to obtain the first bit sequence.

Specifically, the K subchannels with the highest reliability in the reliability sequence Q are the subchannels of the information bits. To be specific, sequence numbers of the K subchannels with the highest reliability in the reliability sequence Q form $I_1$, the remaining N–K subchannels are the subchannels of the frozen bit, sequence numbers of the remaining N–K subchannels form $F_1$, and $I_1$ and $F_1$ are correspondingly determined. After $I_1$ and $F_1$ are determined, the information bit is placed based on $I_1$, and the frozen bit is placed based on $F_1$, to obtain the first bit sequence. For example, N=16, K=8, and the length B of the outer-code subcode is 4. The reliability sequence Q sorted in descending order=[0 1 2 4 8 3 5 6 9 10 12 7 11 13 14 15], and K=8. In this case, $I_1$=[0 12 4 8 3 5 6], $F_1$=[9 10 12 7 11 13 14 15], the information bit is placed based on $I_1$, and the frozen bit is placed based on $F_1$. The first bit sequence corresponding to $I_1$ and $F_1$ is [1,1,1,1,1,1,1,1,0,0,0,0,0,0,0,0], $_B{}^{/N}$=4, and the first bit sequence is divided based on N and B. The bit sequence of each outer-code subcode is consecutive in the first bit sequence, and bit sequences of four outer-code subcodes may be obtained: [1,1,1,1], [1,1,1,0,], [0,0,0,0], and [0,0,0,0]. The bit sequence of the outer-code subcode is construction of the outer-code subcode.

The first outer-code subcode set and the second outer-code subcode set are determined based on the $_B{}^{/N}$ outer-code subcodes, and the first-type outer-code subcode is determined as an element in the first outer-code subcode set. To be specific, an outer-code subcode whose quantity of information bits is P is determined as an element in the first outer-code subcode set, and outer-code subcodes other than the first-type outer-code subcode form the second outer-code subcode set.

S2: Adjust a fourth-type outer-code subcode in the second outer-code subcode set to the first-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to any one of $K_1$, $K_2$, . . . , and $K_m$.

Specifically, the adjusting a fourth-type outer-code subcode in the second outer-code subcode set to the first-type outer-code subcode is adjusting an outer-code subcode with another intermediate code rate that is not $_B{}^{/P}$ to an outer-code subcode whose code rate is $_B{}^{/P}$. Optionally, a quantity of information bits in the fourth-type outer-code subcode is adjusted to enable the quantity of information bits in the fourth-type outer-code subcode to be one of $K_1$, $K_2$, and $K_m$.

In an implementation, the adjusting a quantity of information bits in the fourth-type outer-code subcode may be:

when the quantity of information bits is adjusted for the $i^{th}$ fourth-type outer-code subcode, perform the following operation:

determining t and y, where t is a subchannel sequence number of an information bit with lowest reliability in the $i^{th}$ fourth-type outer-code subcode, y is a subchannel sequence number of a frozen bit with highest reliability in a first set, the first set is a set including subchannel sequence numbers of frozen bits in all fourth-type outer-code subcodes other than the $i^{th}$ fourth-type outer-code subcode, and it should be noted that frozen bits in all fourth-type outer-code subcodes other than the $i^{th}$ fourth-type outer-code subcode do not include a bit prefrozen during rate matching;

determining whether a first condition is met, where the first condition is: a quantity n of information bits in an outer-code subcode in which a $y^{th}$ subchannel is located is greater than or equal to HB−1, or n is less than LB, or the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2);

if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is one of $K_1, K_2, \ldots,$ and $K_m$.

Specifically, after the adjustment in the foregoing manner, a quantity of information bits of each fourth-type outer-code subcode is reduced, and the quantity of information bits of each fourth-type outer-code subcode is sequentially adjusted. For example, when a quantity of information bits of a $1^{st}$ fourth-type outer-code subcode is adjusted, t and y are first determined, where t is a subchannel sequence number of an information bit with lowest reliability in the $1^{st}$ fourth-type outer-code subcode, y is a subchannel sequence number of a frozen bit with highest reliability in a first set, the first set is a set including subchannel sequence numbers of frozen bits in all fourth-type outer-code subcodes other than the $1^{st}$ fourth-type outer-code subcode. Then, it is determined whether a quantity n of information bits in an outer-code subcode in which the $y^{th}$ subchannel is located meets the first condition. If the first condition is met, the $y^{th}$ subchannel is changed to the subchannel of the information bit, and the $t^{th}$ subchannel is changed to the subchannel of the frozen bit. This is first adjustment of the quantity of information bits performed on the first fourth-type outer-code subcode. If the quantity of information bits of the $1^{st}$ fourth-type outer-code subcode after the first adjustment is not one of $K_1, K_2, \ldots,$ and $K_m$, the quantity of information bits of the $1^{st}$ fourth-type outer-code subcode continues to be adjusted for a second time according to the foregoing method, until the quantity of information bits in the $1^{st}$ fourth-type outer-code subcode is one of $K_1, K_2, \ldots,$ and $K_m$.

The first condition is that n is greater than or equal to HB−1 (that is, the outer-code subcode on which the $y^{th}$ subchannel is located is an outer-code subcode with a high code rate, or is the outer-code subcode with the high code rate by adding one information bit), or n is less than LB (that is, the outer-code subcode on which the $y^{th}$ subchannel is located is an outer-code subcode with a low code rate, or is still the outer-code subcode with the low code rate by adding one information bit). The first condition may alternatively be: n is less than LB (that is, the outer-code subcode on which the $y^{th}$ subchannel is located is an outer-code subcode with a low code rate, or is still the outer-code subcode with the low code rate by adding one information bit), or y is greater than t and n is greater than (HB−2) (that is, the outer-code subcode on which the $y^{th}$ subchannel is located is an outer-code subcode with a high code rate, or is the outer-code subcode with the high code rate by adding two information bits). In other words, an information bit may be added to each outer-code subcode whose n meets the first condition, and after the information bit is added, the outer-code subcode may be an outer-code subcode with a high code rate, an outer-code subcode with a low code rate, or an outer-code subcode with an intermediate code rate. All adjusted fourth-type outer-code subcodes meet a requirement (that is, the quantity of information bits is one of $K_1, K_2, \ldots,$ and $K_m$), and all fourth-type outer-code subcodes are adjusted to first-type outer-code subcodes.

S3: Determine I based on the first outer-code subcode set and an adjusted second outer-code subcode set.

Specifically, the first outer-code subcode set includes the first-type outer-code subcode, the adjusted second outer-code subcode set also includes the first-type outer-code subcode, and I may be determined based on an information bit and a frozen bit included in each outer-code subcode. Therefore, the information bits corresponding to the subchannel sequence numbers in I are distributed in the X outer-code subcodes including the first-type outer-code subcode.

Further, in an implementation, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB. To be specific, when LB and HB are determined, the second-type outer-code subcode is an outer-code subcode with a low code rate, and the third-type outer-code subcode is an outer-code subcode with a high code rate.

To reduce the decoding delay, in this embodiment, the X outer-code subcodes include the X1 first-type outer-code subcodes, the second-type outer-code subcode, and/or the third-type outer-code subcode. The first-type outer-code subcodes are outer-code subcodes with the preset intermediate code rate (that is, $_B{}^{/P}$), but are not all outer-code subcodes, between $_B{}^{/LB}$ and $_B{}^{/H}$, with the intermediate code rate. Therefore, during decoding at the decoder side, the outer-code subcode with the intermediate code rate that is $_B{}^{/P}$ may be decoded according to me classic decoding algorithm of the algebraic code. For example, the outer-code subcode with the intermediate code rate that is $_B{}^{/P}$ is decoded according to the BM algorithm. Compared with decoding the outer-code subcode with the intermediate code rate according to the polar decoding algorithm, the decoding delay of the outer-code subcode with the intermediate code rate can be reduced, and parallel polarization decoding may be performed on an outer-code subcode with a high code rate and/or an outer-code subcode with a low code rate. In this way, the overall decoding delay can be reduced, and the throughput rate can be improved.

When the X outer-code subcodes further include the second-type outer-code subcode and/or the third-type outer-code subcode, in an implementation, when I is determined based on $I_1, F_1,$ LB, HB, B, $K_1, K_2, \ldots,$ and $K_m$, the method may specifically include the following steps.

S1': Determine a first outer-code subcode set and a second outer-code subcode set based on $_B{}^{/N}$ outer-code subcodes, where the first outer-code subcode set includes the first-type outer-code subcode, the second-type outer-code subcode, and/or the third-type outer-code subcode, the second outer-code subcode set is a complementary set of the first outer-code subcode, a bit sequence of the $_B{}^{/N}$ outer-code subcodes is determined based on N, B, and a first bit sequence, and the first bit sequence is determined based on $I_1$ and $F_1$.

Generally, the $_B{}^{/N}$ outer-code subcodes are $_B{}^{/N}$ outer-code subcodes inducted in a $\log_2(B)$-order butterfly operation before a polar code, and bit sequences of the $_B{}^{/N}$ outer-code subcodes may be determined based on N, B, and the first bit sequence. Specifically, the first bit sequence may be divided based on N and B, and a bit sequence of each outer-code subcode is consecutive in the first bit sequence. When the first bit sequence is determined based on $I_1$ and $F_1$, the information bit may be placed based on $I_1$, and the frozen bit may be placed based on $F_1$, to obtain the first bit sequence.

The first outer-code subcode set and the second outer-code subcode set are determined based on the $_B{}^{/N}$ outer-code subcodes, and the first-type outer-code subcode, the second-type outer-code subcode, and/or the third-type outer-code subcode are/is determined as elements/an element in the first outer-code subcode set. To be specific, an outer-code subcode whose quantity of information bits is P, an outer-code subcode whose quantity of information bits is less than or equal to LB, and an outer-code subcode whose quantity of information bits is greater than or equal to HB are determined as the elements in the first outer-code subcode set, and outer-code subcodes other than the first-type outer-code subcode, the second-type outer-code subcode, and/or the third-type outer-code subcode form the second outer-code subcode set.

S2': Adjust a fourth-type outer-code subcode in the second outer-code subcode set to any one of the first-type outer-code subcode, the second-type outer-code subcode, and the third-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to any one of $K_1, K_2, \ldots,$ and $K_m$.

Specifically, the adjusting a fourth-type outer-code subcode in the second outer-code subcode set to any one of the first-type outer-code subcode, the second-type outer-code subcode, and the third-type outer-code subcode is adjusting an outer-code subcode with another intermediate code rate that is not $_B{}^{/P}$ to any one of and outer-code subcode whose code rate is $_B{}^{/P}$, an outer-code subcode whose code rate is less than or equal to $_B{}^{/LB}$, or an outer-code subcode whose code rate is greater than or equal to $_B{}^{/H}$. Optionally, a quantity of information bits in the fourth-type outer-code subcode is adjusted to enable the quantity of information bits in the fourth-type outer-code subcode to be any one of the following:

one of $K_1, K_2, \ldots,$ and $K_m$, less than or equal to LB, or greater than or equal to HB.

In an implementation, the adjusting a quantity of information bits in the fourth-type outer-code subcode may be:

when the quantity of information bits is adjusted for the $i^{th}$ fourth-type outer-code subcode, perform the following operation:

determining t and y, where t is a subchannel sequence number of an information bit with lowest reliability in the $i^{th}$ fourth-type outer-code subcode, y is a subchannel sequence number of a frozen bit with highest reliability in a second set, the second set is a set including subchannel sequence numbers of frozen bits in all fourth-type outer-code subcodes other than the $i^{th}$ fourth-type outer-code subcode, and determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2);

if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following:

one of $K_1, K_2, \ldots,$ and $K_m$, less than or equal to LB, or greater than or equal to HB.

Specifically, after the adjustment in the foregoing manner, a quantity of information bits of each fourth-type outer-code subcode is reduced, and the quantity of information bits of each fourth-type outer-code subcode is sequentially adjusted. For example, when a quantity of information bits of a $1^{st}$ fourth-type outer-code subcode is adjusted, t and y are first determined, where t is a subchannel sequence number of an information bit with lowest reliability in the $1^{st}$ fourth-type outer-code subcode, y is a subchannel sequence number of a frozen bit with highest reliability in a first set, the first set is a set including subchannel sequence numbers of frozen bits in all fourth-type outer-code subcodes other than the $1^{st}$ fourth-type outer-code subcode. Then, it is determined whether a quantity n of information bits in an outer-code subcode in which the $y^{th}$ subchannel is located meets the first condition. If the first condition is met, the $y^{th}$ subchannel is changed to the subchannel of the information bit, and the $t^{th}$ subchannel is changed to the subchannel of the frozen bit. This is first adjustment of the quantity of information bits performed on the first fourth-type outer-code subcode. If the quantity of information bits of the $1^{st}$ fourth-type outer-code subcode after the first adjustment is not any one of $K_1, K_2, \ldots,$ and $K_m$, less than or equal to LB, and greater than or equal to HB, the quantity of information bits of the $1^{st}$ fourth-type outer-code subcode continues to be adjusted for a second time according to the foregoing method, until the quantity of information bits in the first fourth-type outer-code subcode is any one of one of $K_1, K_2, \ldots,$ and $K_m$, less than or equal to LB, and greater than or equal to HB.

The first condition is that n is greater than or equal to HB−1 (that is, the outer-code subcode on which the $y^{th}$ subchannel is located is an outer-code subcode with a high code rate, or is the outer-code subcode with the high code rate by adding one information bit), or n is less than LB (that is, the outer-code subcode on which the $y^{th}$ subchannel is located is an outer-code subcode with a low code rate, or is still the outer-code subcode with the low code rate by adding one information bit). The first condition may alternatively be: n is less than LB (that is, the outer-code subcode on which the $y^{th}$ subchannel is located is an outer-code subcode with a low code rate, or is still the outer-code subcode with the low code rate by adding one information bit), or y is greater than t and n is greater than (HB−2) (that is, the outer-code subcode on which the $y^{th}$ subchannel is located is an outer-code subcode with a high code rate, or is the outer-code subcode with the high code rate by adding two information bits). In other words, an information bit may be added to each outer-code subcode whose n meets the first condition, and after the information bit is added, the outer-code subcode may be an outer-code subcode with a high code rate, an outer-code subcode with a low code rate, or an outer-code subcode with an intermediate code rate. All adjusted fourth-type outer-code subcodes meet a requirement (that is, the quantity of information bits is any one of one of $K_1, K_2, \ldots,$ and $K_m$, less than or equal to LB, and greater than or equal to HB), and all fourth-type outer-code subcodes are adjusted to any one of first-type outer-code subcodes, second-type outer-code subcodes, and third-type outer-code subcodes.

S3': Determine I based on the first outer-code subcode set and an adjusted second outer-code subcode set.

Specifically, the first outer-code subcode set includes the first-type outer-code subcode, the second-type outer-code subcode, and/or the third-type outer-code subcode, the adjusted second outer-code subcode set also includes the first-type outer-code subcode, the second-type outer-code subcode, and/or the third-type outer-code subcode, and I may be determined based on an information bit and a frozen bit included in each outer-code subcode. Therefore, the information bits corresponding to the subchannel sequence numbers in I are distributed in the X outer-code subcodes including the first-type outer-code subcode, the second-type outer-code subcode, and/or the third-type outer-code subcode.

S103: Perform encoding based on I.

In a possible implementation, the first-type outer-code subcode is an algebraic code, and the algebraic code may be a BCH code, an RS code, or the like. The BCH code is an abbreviation for Bose, Ray-Chaudhuri, and Hocquenghem, and is a multi-level, cyclic, and error correction variable-length digital code used to correct a plurality of random error patterns. The RS code, also referred to as a Reed-solomon code (Reed-solomon code), is channel encoding for forward error correction. $K_1, K_2, \ldots,$ and $K_m$ are determined based on an error correction capability of the algebraic code, and m is determined based on construction of the algebraic code. To be specific, values of $K_1, K_2, \ldots,$ and $K_m$ are determined based on the error correction capability of the algebraic code, different error correction capabilities correspond to different and m is determined based on the construction of the algebraic code. For example, B=16, P is $K_1$ and $K_2$, $K_{1=7}$, and $K_{2=11}$. In this case, there are two types of quantities of information bits in the first-type outer-code subcode: 7 or 11. A quantity of information bits of an outer-code subcode with another intermediate code rate is adjusted to be 7 or 11, or a quantity of information bits of an outer-code subcode with another intermediate code rate is adjusted to be 7 or 11, a low code rate, or a high code rate.

Optionally, in this embodiment, in an encoding process, after I is determined, the first-type outer-code subcode may be replaced with the algebraic code, and then encoding is performed; or after I is determined, algebraic code encoding may be performed on the first-type outer-code subcode. When algebraic code encoding is performed on the first-type outer-code subcode, the first-type outer-code subcode needs to be first replaced with the algebraic code. A code length of the algebraic code is equal to the length B of the outer-code subcode, that is, each first-type outer-code subcode is replaced with the algebraic code whose code length is B. Because the outer-code subcode whose code length is B is replaced with the algebraic code, the code length of the algebraic code needs to be equal to the length B of the outer-code subcode.

Generally, a code length B of an outer-code subcode of a polar code is $2^m$, for example, 16, 32, 64, or the like. However, the code length of the algebraic code is usually a length of $2^{m-1}$, for example, 15, 31, 63, or the like. Therefore, before each first-type outer-code subcode is replaced with the algebraic code whose code length is B, the algebraic code needs to be extended. In an implementation, the algebraic code may be obtained based on an original algebraic code whose length is B−1 by using any one of the following methods:

copying any bit in the original algebraic code whose length is B−1, and adding the copied bit to the original algebraic code to obtain the algebraic code whose length is B, where when the copied bit is added to the original algebraic code, the copied bit may be added to the beginning, any location in the middle, or end of the original algebraic code; and performing parity check on any Z bits or all bits in the original algebraic code whose length is B−1, adding a parity check value to the original algebraic code to obtain the algebraic code whose length is B, where 1<Z<B−1, and adding the parity check value to the original algebraic code, where the parity check value may be added to the beginning, any location in the middle, or end of the original algebraic code.

In this embodiment, when the first-type outer-code subcode is the algebraic code, the performing encoding based on I in S103 may be as follows:

S1031: Determine subchannels other than the subchannels in I as a set F corresponding to the subchannels of the frozen bit.

S1032: Determine a value of a bit on each subchannel, perform algebraic code encoding on a bit corresponding to the first-type outer-code subcode, and perform polar encoding on a bit corresponding to an outer-code subcode other than the first-type outer-code subcode.

Specifically, a value of a bit on each subchannel is determined, for example, the information bit is placed based on I, and the frozen bit is placed based on F. Algebraic code encoding is performed on a bit corresponding to the first-type outer-code subcode, and polar encoding is performed on a bit corresponding to an outer-code subcode other than the first-type outer-code subcode to obtain the encoded bit sequence. After algebraic code encoding is performed on the bit corresponding to the first-type outer-code subcode, an algebraic code encoding result is used as a value of a bit at a $\log_2(B)^{th}$ level, and polar encoding is performed after the $\log_2(B)^{th}$ level.

After I is determined in S102, in another implementation, the first-type outer-code subcode is a polar code. Correspondingly, the performing encoding based on I in S103 may be as follows:

S1031': Determine, based on I, a set A corresponding to subchannels of a local check bit, where local check bits corresponding to subchannel sequence numbers in A are distributed in the first-type outer-code subcodes, a location of a local check bit corresponding to a subchannel sequence number in A in the first-type outer-code subcode and a check relationship between the information bit and/or the frozen bit and the local check bit are indicated by using third indication information in a preset indication vector whose length is B, P corresponds to the preset indication vector, the check relationship is used to determine a value of the local check bit, the preset indication vector includes first indication information, second indication information, and the third indication information, the first indication information indicates that a corresponding location is the frozen bit, and the second indication information indicates that a corresponding location is the information bit.

Specifically, the local check bits corresponding to the subchannel sequence numbers in the set A corresponding to the subchannels of the local check (local-check) bit are distributed in the first-type outer-code subcodes, and the third indication information in the preset indication vector whose length is B indicates a location, in the first-type outer-code subcode, of the local check bit corresponding to the subchannel sequence number in A and the check relationship between the information bit and/or the frozen bit and the local check bit. That P corresponds to the preset indication vector means that different Ps correspond to different preset indication vectors, and the third indication information indicates that the corresponding location is the local check bit, and the value of the local check bit may be determined based on the check relationship between the information bit and/or the frozen bit and the local check bit.

Specifically, in an implementation, the determining, based on I, a set A corresponding to subchannels of a local check bit may be:

determining, for each first-type outer-code subcode, the location of the local check bit in the first-type outer-code subcode based on the preset indication vector corresponding to P of the information bits in the first-type outer-code subcode; and determining A based on the determined location of the local check bit in each first-type outer-code subcode.

For example, B=16, P is $K_1$ and $K_2$, $K_1$=7, and $K_2$=11. In this case, there are two types of quantities of information bits in the first-type outer-code subcode: 7 or 11. A quantity of information bits of an outer-code subcode with another intermediate code rate is adjusted to be 7 or 11, or a quantity of information bits of an outer-code subcode with another intermediate code rate is adjusted to be 7 or 11, a low code rate, or a high code rate. For example, when P=7, the preset indication vector is [1,1,1,1,1,1,1,1,1,1,2012,3354,4696,6038,0,1], the first indication information is "0", and the second indication information is "1". In other words, "0" indicates that the corresponding location is the frozen bit, "1" indicates that the corresponding location is the information bit, and the third indication information is a value greater than 1. "2012, 3354, 4696, and 6038" are all third indication information, and locations corresponding to 2012, 3354, 4696, and 6038 are locations of the local check bits. Optionally, the first indication information and the second indication information may alternatively be of other values. After the locations of the local check bits in each first-type outer-code subcode are determined by using the third indication information, the set A corresponding to the subchannels of the local check bits in all the first-type outer-code subcodes is determined.

The third indication information indicates that the corresponding location is the local check bit, a value of the third indication information is the check relationship between the information bit and/or the frozen bit and the local check bit, and each of 2012, 3354, 4696, and 6038 is a check relationship, values of four local check bits may be determined based on the four check relationships. For example, when P=11, the preset indication vector is [0,1,1,1,1,1,1,50,1876,1622,17727,25,158,291,424,1], all values greater than 1 such as 50,1876, 1622, 17727, 25, 158, 291, and 424 are the third indication information, the location corresponding to the third indication information is the location of the local check bit, and the value of the third indication information includes the local check relationship corresponding to the local check bit. A manner of obtaining values of eight local check bits based on the eight pieces of third indication information: 50, 1876, 1622, 17727, 25, 158, 291, and 424 is described below by using an example. Optionally, the determining the value of the local check bit based on the check relationship may be: performing an exclusive OR operation on the check relationship and values of bits on the subchannels corresponding to the information bit and/or values of bits on the subchannels corresponding to the frozen bit that are indicated by results obtained after a cyclic modulo operation is performed in 11 to obtain the values of the bits on the subchannels corresponding to the local check bits.

The following describes, by using an example in which to-be-encoded information bits are [0,1,1,0,0,0,1], a process of obtaining the value of the bit on the subchannel corresponding to the local check bit based on the third indication information. For example, the third indication information is 158, that is, at a $12^{th}$ location of the outer-code subcode, a sequence number is obtained by performing a cyclic modulo operation in 11 on 158, and is used to locate an information bit checked by using the check bit. A process of performing the cyclic modulo operation in 11 on 158 is as follows: 158 is divided by 11 to obtain 14, and a remainder is 4; 14 is divided by 11 to obtain 1, and a remainder is 3; and 1 is divided by 11 to obtain 0, and a remainder is 1. In this case, the exclusive OR operation is performed on "0", "0", and "1" respectively corresponding to locations 4, 3, and 1 in a to-be-encoded vector, and a value of the exclusive OR operation is 1. In this case, a value of a local check bit in the $12^{th}$ location of the subcode is 1.

In another implementation, the determining, based on I, a set A corresponding to subchannels of a local check bit may be:

inserting the frozen bit based on I to obtain a first indication vector whose length is N, where the first indication vector includes the first indication information and the second indication information;

grouping first indication vectors based on the length B of the outer-code subcode to obtain $_B/^N$ second indication vectors, where specifically, first indication vectors whose lengths are N are sequentially grouped, a length of the second indication vector is B, and the $_B/^N$ second indication vectors are obtained;

performing the following processing on the $_B/^N$ second indication vectors to obtain $_B/^N$ third indication vectors:

replacing a second indication vector whose quantity of information bits is P with the preset indication vector corresponding to P, where specifically, the second indication vector whose quantity of information bits is P is replaced, and a second indication vector whose quantity of information bits is not P is not processed; and for example, B=16, P is $K_1$ and $K_2$, $K_1$=7, and $K_2$=11, where when P=7, the preset indication vector is [1,1,1,1,1,1,1,1,1,1,2012,3354,4696,6038,0,1], when P=11, the preset indication vector is [0, 1,1, 1,1, 1,1,50,1876,1622, 17727,25,158,291,424, 1], all second indication vectors whose quantities of information bits are 7 are replaced with [1,1,1,1,1,1,1,1,1,1,2012,3354,4696,6038,0,1], and all second indication vectors whose quantities of information bits are 11 are replaced with [0,1,1,1,1,1,1,50,1876,1622,17727,25,158,291,424,1];

forming, by using the $_B/^N$ third indication vectors, a fourth indication vector whose length is N, where specifically, the $_B/^N$ third indication vectors include the second indication vector whose quantity of information bits is not P and the replaced preset indication vector corresponding to P; and determining A based on the fourth indication vector, where specifically, a sequence number of a subchannel in A may be determined based on the third indication information (that is, a value greater than 1) in the fourth indication vector.

Optionally, the preset indication vector in this embodiment may be obtained according to reference [1] (P. Trifonov and V. Miloslayskaya, "Polar Subcodes," in IEEE Journal on Selected Areas in Communications, vol. 34, no. 2, pp. 254-266, February 2016, doi: 10.1109/JSAC.2015.2504269).

S1032': Determine that subchannel sequence numbers other than the subchannel sequence numbers included in I and A are subchannel sequence numbers in the set F corresponding to the subchannels of the frozen bit.

S1033': Determine a value of a bit on each subchannel, and perform polar encoding on all determined bits.

Specifically, the determining a value of a bit on each subchannel may be:

determining a value of a bit on a subchannel of each local check bit based on the check relationship; and separately determining a value of a bit on the sub channel of the information bit and a value of a bit on the subchannel of the frozen bit based on I and F.

The third indication information indicates that the corresponding location is the local check bit, a value of the third indication information is the check relationship between the information bit and/or the frozen bit and the local check bit, and each of 2012, 3354, 4696, and 6038 is a check relationship, values of four local check bits may be determined based on the four check relationships. For example, when P=11, the preset indication vector is [0,1,1,1,1,1,1,50,1876, 1622,17727,25,158,291,424,1]. All of 50, 1876, 1622, 17727, 25, 158, 291, and 424 are the third indication information, locations corresponding to 50, 1876, 1622, 17727, 25, 158, 291, 42450, 1876, 1622, 17727, 25, 158, 291, and 424 are locations of local check bits, and values of eight local check bits may be determined based on the eight check relationships.

Specifically, the determining a value of a bit on a subchannel of each local check bit based on the check relationship may be: for each local check bit, performing an exclusive OR operation on the check relationship and values of bits on the subchannels corresponding to the information bit and/or values of bits on the subchannels corresponding to the frozen bit that are indicated by results obtained after a cyclic modulo operation is performed in 11 to obtain the values of the bits on the subchannels corresponding to the local check bits.

Specifically, a value of a bit on the subchannel of the information bit and a value of a bit on the subchannel of the frozen bit are separately determined based on I and F. For example, the information bit is placed based on I, and the frozen bit is placed based on F.

According to the encoding method provided in this embodiment, after the to-be-decoded information including the K information bits and the mother code length N are obtained, the set I corresponding to the subchannels of the information bits is determined based on K and N. The information bits corresponding to the subchannel sequence numbers in the determined I are distributed in the X outer-code subcodes, the X outer-code subcodes include the X1 first-type outer-code subcodes, the quantities of information bits in the X1 first-type outer-code subcodes are P, P is one of $K_1, K_2, \ldots,$ and $K_m$, $K_1, K_2, \ldots,$ and $K_m$ are greater than the first threshold LB and less than the second threshold HB, LB+1<HB, and m is less than (HB−LB−1). P is not all values between LB and HB. In other words, the X outer-code subcodes include the outer-code subcode with the preset intermediate code rate (that is, $_B I^P$), but do not include all outer-code subcodes with intermediate code rates. Therefore, during decoding at the decoder side, the outer-code subcode with the intermediate code rate may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced. In this way, the decoding delay can be reduced, and the throughput rate can be improved.

Several specific embodiments are used below to describe in detail the technical solution of the embodiment shown in FIG. 4.

Figure 5:
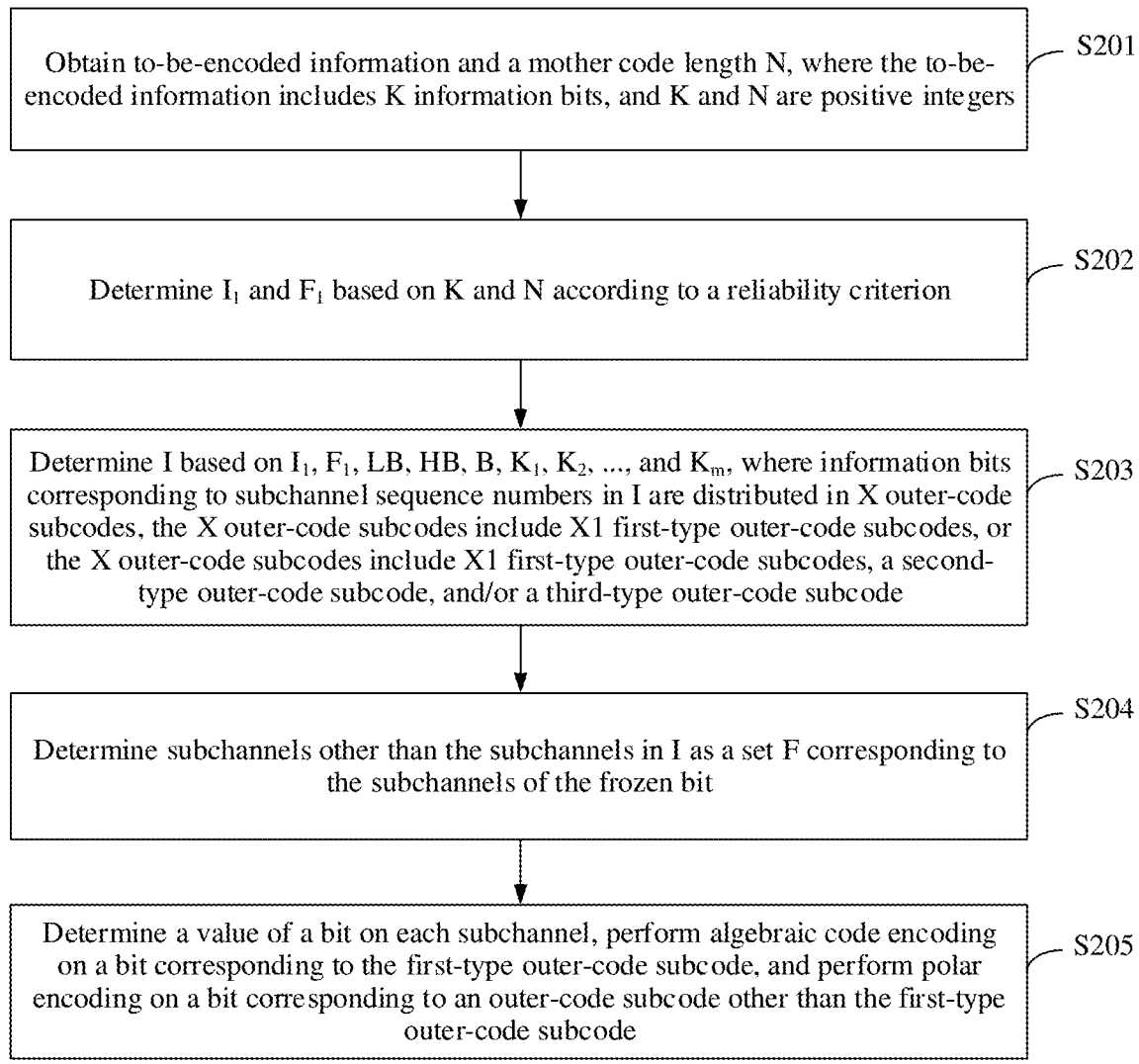
FIG. 5 is a flowchart of an embodiment of an encoding method according to this application.

FIG. 5 is a flowchart of an embodiment of an encoding method according to this application. This embodiment may be executed by a transmit device such as a base station or a terminal, and an example in which a first-type outer-code subcode is replaced with an algebraic code is used for description. As shown in FIG. 5, the method in this embodiment may include the following steps.

S201: Obtain to-be-encoded information and a mother code length N, where the to-be-encoded information includes K information bits, and K and N are positive integers.

S202: Determine $I_1$ and $F_1$ based on K and N according to a reliability criterion.

For a manner of determining $I_1$ and $F_1$, refer to the description in the embodiment shown in FIG. 4. Details are not described herein again.

S203: Determine I based on $I_1$, $F_1$, LB, HB, B, $K_1, K_2, \ldots,$ and $K_m$, where information bits corresponding to subchannel sequence numbers in I are distributed in X outer-code subcodes, the X outer-code subcodes include X1 first-type outer-code subcodes, or the X outer-code subcodes include X1 first-type outer-code subcodes, a second-type outer-code subcode, and/or a third-type outer-code subcode.

Specifically, B, LB, and HB may be preset values, or values exchanged between a transmit device and a receive device. For example, the transmit device performs encoding after determining B, LB, and HB, and sends B, LB, and HB to the receive device before or after encoding. Alternatively, the transmit device receives, before encoding, B, LB, and HB sent by the receive device, where B, LB, and HB may be carried by using signaling.

LB+1<HB, and HB is less than or equal to B.

Specifically, the information bits corresponding to the subchannel sequence numbers in the determined I are distributed in the X outer-code subcodes, the X outer-code subcodes have two possible forms of composition. One form is that the X outer-code subcodes include the X1 first-type outer-code subcodes. The other form is that the X outer-code subcodes include the X1 first-type outer-code subcodes, the second-type outer-code subcode, and/or the third-type outer-code subcode, a quantity of information bits in the X1 first-type outer-code subcodes is P, P is one of $K_1, K_2, \ldots,$ and $K_m$, $K_1, K_2, \ldots,$ and $K_m$ are greater than the first threshold LB and less than the second threshold HB, and m is greater than or equal to 1 and less than (HB−LB−1). A quantity of information bits in the second-type outer-code subcode is less than or equal to LB, and a quantity of information bits in the third-type outer-code subcode is greater than or equal to HB. To be specific, when LB and HB are determined, the second-type outer-code subcode is an outer-code subcode with a low code rate, the third-type outer-code subcode is an outer-code subcode with a high code rate, and the first-type outer-code subcode is an outer-code subcode with a preset intermediate code rate.

For composition of different X outer-code subcodes, manners of determining I based on $I_1$, $F_1$, LB, HB, B, $K_1$, $K_2, \ldots,$ and $K_m$ are different. When the X outer-code subcodes include the X1 first-type outer-code subcodes, for a detailed manner of determining I, refer to S1 to S3 in the embodiment shown in FIG. 4. When the X outer-code subcodes include the X1 first-type outer-code subcodes, the second-type outer-code subcode, and/or the third-type outer-code subcode, for a detailed manner of determining I, refer to S1' to S3' in the embodiment shown in FIG. 4. Details are not described herein again.

The following provides a specific implementation corresponding to S1' to S3'. For example, I may be determined based on $I_1$, $F_1$, LB, HB, B, $K_1, K_2, \ldots,$ and $K_m$ in the following manner, and $I_1$, $F_1$, LB, HB, B, $K_1, K_2, \ldots,$ and $K_m$ are output as the X outer-code subcodes in which the information bits corresponding to the subchannel sequence numbers in I are distributed, which is specifically as follows.

In an implementation, the following are provided:

```
input: initial polar construction (that is, a first bit sequence determined based on I₁ and
F₁), LB, HB, B, and K₁, K₂, ..., Kₘ)
  initialization: Set all frozen bits in the first bit sequence to open
  For i = 1: a quantity of outer-code subcodes
    K = a quantity of information bits of an iᵗʰ outer-code subcode
    while K > LB and K < HB
      if K == K₁, K == K₂, ..., or K == Kₘ -- a value of K
        break
      else
        t = a location of an information bit with lowest reliability in the iᵗʰ outer-
code subcode
        y = a location with highest reliability in remaining open subchannels
        n = a quantity of information bits in an outer-code subcode in which a yᵗʰ
subchannel is located
            if n >= HB - 1 or n < LB
              change the location y to an information bit, and change the
location t to a frozen bit
              K = K - 1
            else
              set the location y to close
            end
      end
    end
  end.
```

In this manner, $I_1$, $F_1$, LB, HB, B, $K_1$, $K_2$, . . . , and $K_m$ are input. During initialization, all frozen bits in the first bit sequence are first set to an open (open) state, and then all outer-code subcodes are traversed. When the quantity K of information bits of the $i^{th}$ outer-code subcode satisfies: When K is greater than LB, K is less than HB, and K==$K_1$, K==$K_2$, . . . , or K==$K_m$, no processing is performed. The quantity K of information bits of each outer-code subcode is adjusted when K is a value other than greater than LB, less than HB, and =$K_1$, $K_2$, . . . , $K_m$. The following adjustment is performed:

first determining t and y, where t is the location (that is, a subchannel sequence number) of the information bit with the lowest reliability in the $i^{th}$ outer-code subcode, and y is the location (that is, a subchannel sequence number) with the highest reliability in the remaining open subchannels;

determining whether the quantity n of information bits in the outer-code subcode in which the $y^{th}$ subchannel is located is greater than or equal to HB−1, or n is less than LB, where if yes, the location y is changed to the information bit, and the location t is changed to the frozen bit, and if no, set the location y to close; and continuing to perform the foregoing adjustment until the quantity of information bits in the $i^{th}$ outer-code subcode is any one of the following:

one of $K_1$, $K_2$, . . . , and $K_m$, less than or equal to LB, or greater than or equal to HB.

A final output is the X outer-code subcodes in which the information bits corresponding to the subchannel sequence numbers in I are distributed.

In another implementation, the following are provided:

```
input: initial polar construction (a first bit sequence determined based on I₁ and F₁),
LB, HB, B, and K₁, K₂, ..., Kₘ
  initialization: Set all frozen bits in the first bit sequence to open
  For i = 1: a quantity of outer-code subcodes (all outer-code subcodes are traversed)
    K = a quantity of information bits of an iᵗʰ outer-code subcode
    while K > LB and K < HB
      if K == K₁, K == K₂, ..., or K == Kₘ
        break
      else
        t = a location of an information bit with lowest reliability in the iᵗʰ outer-
code subcode
        y = a location with highest reliability in remaining open subchannels
        n = a quantity of information bits in an outer-code subcode in which a yᵗʰ
subchannel is located
            if n < LB or (n > HB - 2 and y > t)
              change the location y to an information bit, and change the location
t to a frozen bit
              K = K - 1
            else
              set the location y to close
            end
      end
    end
  end.
```

In this manner, $I_1$, $F_1$, LB, HB, B, $K_1$, $K_2$, ..., and $K_m$ are input. During initialization, all frozen bits in the first bit sequence are first set to an open state, and then all outer-code subcodes are traversed. When the quantity K of information bits of the $i^{th}$ outer-code subcode satisfies: When K is greater than LB, K is less than HB, and $K==K_1$, $K==K_2$, ..., or $K==K_m$, no processing is performed. The quantity K of information bits of each outer-code subcode is adjusted when K is a value other than greater than LB, less than HB, and $=K_1$, $K_2$, ..., $K_m$. The following adjustment is performed:

first determining t and y, where t is the location (that is, a subchannel sequence number) of the information bit with the lowest reliability in the $i^{th}$ outer-code subcode, and y is the location (that is, a subchannel sequence number) with the highest reliability in the remaining open sub channel s;

determining whether the quantity n of information bits in the outer-code subcode in which the $y^{th}$ subchannel is located is greater than or equal to HB−2 and y>t, or n is less than LB, where if yes, the location y is changed to the information bit, and the location t is changed to the frozen bit, and if no, set the location y to close; and continuing to perform the foregoing adjustment until the quantity of information bits in the i outer-code subcode is any one of the following:

one of $K_1$, $K_2$, ..., and $K_m$, less than or equal to LB, or greater than or equal to HB.

A final output is the X outer-code subcodes in which the information bits corresponding to the subchannel sequence numbers in I are distributed.

Figure 6:
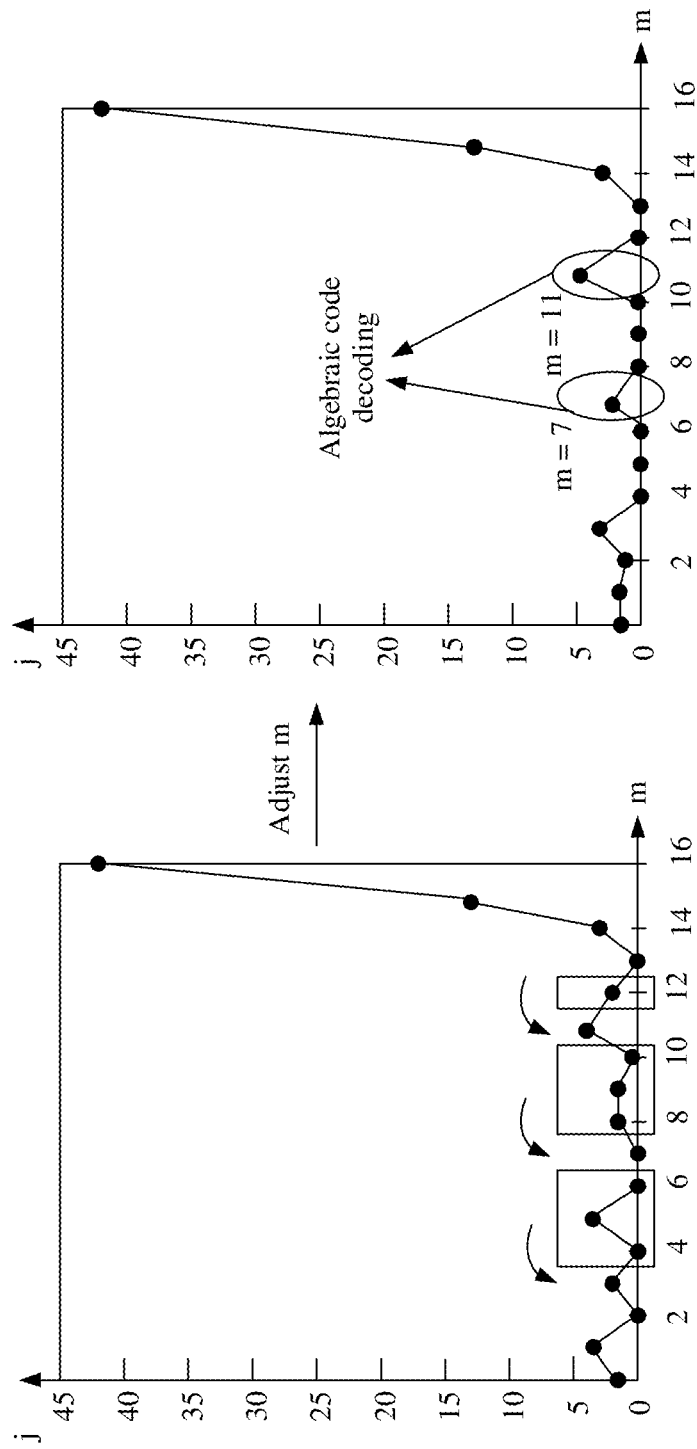
FIG. 6 is a schematic diagram before and after a quantity m of information bits of an outer-code subcode is adjusted.

The following uses an example in which the X outer-code subcodes include the X1 first-type outer-code subcodes, the second-type outer-code subcode, and the third-type outer-code subcode to describe, with reference to FIG. 6, a process of determining I based on $I_1$, $F_1$, LB, HB, B, and $K_1, K_2, \ldots, K_m$ when the X outer-code subcodes include the X1 first-type outer-code subcodes, the second-type outer-code subcode, and the third-type outer-code subcode. FIG. 6 is a schematic diagram before and after a quantity m of information bits of an outer-code subcode is adjusted. As shown in FIG. 6, in this embodiment, an example in which B=16, P is $K_1$ and $K_2$, $K_{1=7}$, and $K_{2=11}$ is used. LB=3, and HB=13, the left pail in FIG. 6 is a schematic diagram before the quantity m of information bits of the outer-code subcode is adjusted, and the right part in FIG. 6 is a schematic diagram after the quantity m of information bits of the outer-code subcode is adjusted. In FIG. 6, a horizontal coordinate m is a quantity of information bits of the outer-code subcode, m may be a value between 0 and 16 (including 0 and 16), and a vertical coordinate j is a quantity of outer-code subcodes corresponding to each m. In this embodiment, an outer-code subcode whose quantity of information bits is 4 to 6 is adjusted to an outer-code subcode whose quantity of information bits is 3 (that is, an outer-code subcode that is adjusted to a low code rate), an outer-code subcode whose quantity of information bits is 8 to 10 is adjusted to an outer-code subcode whose quantity of information bits is 7, and an outer-code subcode whose quantity of information bits is 12 is adjusted to an outer-code subcode whose quantity of information bits is 11. Therefore, the adjusted outer-code subcode includes an outer-code subcode with a high code rate, an outer-code subcode with a low code rate, and outer-code subcodes whose intermediate code rates are 7/16 and 11/16. In this way, algebraic code decoding can be performed on the outer-code subcodes whose intermediate code rates are 7/16 and 11/16, for example, a BM algorithm is used to decode the outer-code subcodes whose code rates are 7/16 and 11/16 and are the intermediate code rates. Compared with decoding the outer-code subcodes with the intermediate code rates according to a polar decoding algorithm, a decoding delay of the outer-code subcode with the intermediate code rate can be reduced, and the outer-code subcode with the high code rate and the outer-code subcode with the low code rate may be decoded in parallel. In this way, the decoding delay can be reduced, and a throughput rate can be improved.

S204: Determine subchannels other than the subchannels in I as a set F corresponding to the subchannels of the frozen bit.

S205: Determine a value of a bit on each subchannel, perform algebraic code encoding on a bit corresponding to the first-type outer-code subcode, and perform polar encoding on a bit corresponding to an outer-code subcode other than the first-type outer-code subcode.

Specifically, a value of a bit on each subchannel is determined, for example, the information bit is placed based on I, and the frozen bit is placed based on F. Algebraic code encoding is performed on a bit corresponding to the first-type outer-code subcode, and polar encoding is performed on a bit corresponding to an outer-code subcode other than the first-type outer-code subcode to obtain the encoded bit sequence. After algebraic code encoding is performed on the bit corresponding to the first-type outer-code subcode, an algebraic code encoding result before a $\log_2(B)^{th}$ level is used as a value of a bit at the $\log_2(B)^{th}$ level, and polar encoding is performed after the $\log_2(B)^{th}$ level.

Optionally, in this embodiment, in an encoding process, after I is determined, the first-type outer-code subcode may be replaced with the algebraic code, and then encoding is performed; or after I is determined, algebraic code encoding may be performed on the first-type outer-code subcode. When algebraic code encoding is performed on the first-type outer-code subcode, the first-type outer-code subcode needs to be first replaced with the algebraic code. A code length of the algebraic code is equal to the length B of the outer-code subcode, that is, each first-type outer-code subcode is replaced with the algebraic code whose code length is B.

In this embodiment, because the first-type outer-code subcode is replaced with the corresponding algebraic code, the first-type outer-code subcode may be decoded according to a classic decoding algorithm of the algebraic code during decoding. For example, when the first-type outer-code subcode is replaced with a BCH code, the first-type outer-code subcode may be decoded according to the BM algorithm during decoding. In this way, the decoding delay can be reduced, and the decoding throughput can be improved.

A code length B of an outer-code subcode of a polar code is $2^m$, but a code length of an algebraic code is usually $2^{m-1}$. Before each first-type outer-code subcode is replaced with the algebraic code whose code length is B, the algebraic code needs to be extended. For a specific extension manner, refer to the description in the embodiment shown in FIG. 4. Details are not described herein again.

According to the encoding method in this implementation, after the to-be-encoded information including the K information bits and the mother code length N are obtained, $I_1$ and $F_1$ are determined based on K and N according to the reliability criterion. I is determined based on $I_1$, $F_1$, LB, HB, B, and $K_1, K_2, \ldots, K_m$. The information bits corresponding to the subchannel sequence numbers in I are distributed in the X outer-code subcodes. The X outer-code subcodes include the X1 first-type outer-code subcodes, or the X outer-code subcodes include the X1 first-type outer-code subcodes, the second-type outer-code subcode, and/or the third-type outer-code subcode. When LB and HB are determined, the second-type outer-code subcode is the outer-code subcode with the low code rate, the third-type outer-code subcode is the outer-code subcode with the high code rate, and the first-type outer-code subcodes are the outer-code subcodes with the preset intermediate code rate. Then, when encoding is performed based on I, algebraic code encoding is performed on the bit corresponding to the first-type outer-code subcode, and polar encoding is performed on the bit corresponding to the outer-code subcode other than the first-type outer-code subcode. Therefore, during decoding at a decoder side, the outer-code subcode with the intermediate code rate may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced, and parallel polarization decoding may be performed on the outer-code subcode with the high code rate and/or the outer-code subcode with the low code rate. In this way, the decoding delay can be reduced, and the throughput rate can be improved.

Figure 7:
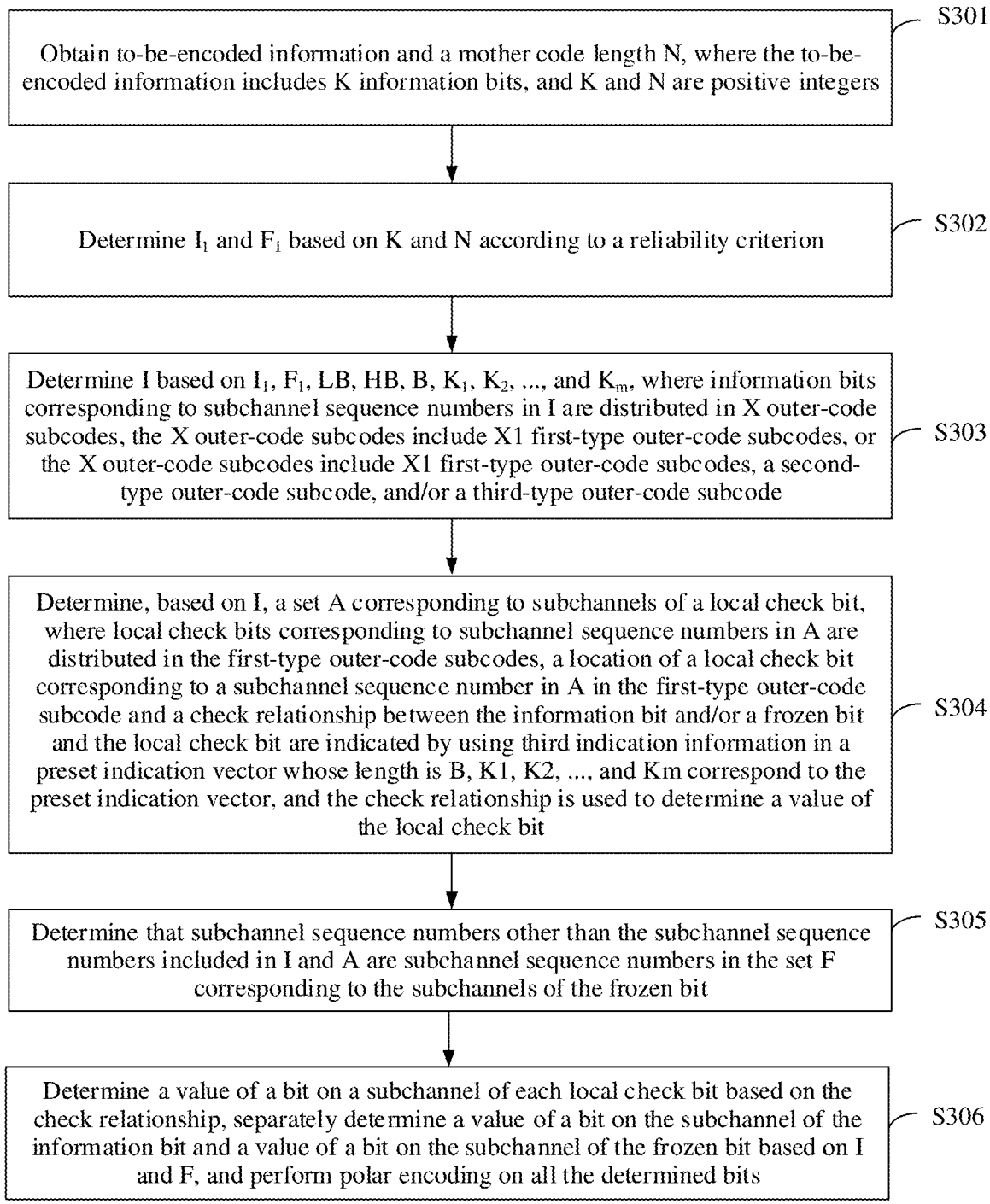
FIG. 7 is a flowchart of an embodiment of an encoding method according to this application.

FIG. 7 is a flowchart of an embodiment of an encoding method according to this application. This embodiment may be executed by a transmit device such as a base station or a terminal. A process of determining I in this embodiment is similar to that in the embodiment shown in FIG. 5. A difference is that, in this embodiment, polar encoding is also performed on a first-type outer-code subcode, local check (local-check) is used, and a Gn matrix of a polar code is multiplied, so that an encoding result the same as that in the embodiment shown in FIG. 5 can be implemented. The local check means that there is a check relationship between to-be-encoded bits distributed in a same outer-code subcode, and there is no check relationship between to-be-encoded bits distributed in different outer-code subcodes. As shown in FIG. 7, the method in this embodiment may include the following steps.

S301: Obtain to-be-encoded information and a mother code length N, where the to-be-encoded information includes K information bits, and K and N are positive integers.

S302: Determine $I_1$ and $F_1$ based on K and N according to a reliability criterion.

For a manner of determining $I_1$ and $F_1$, refer to the description in the embodiment shown in FIG. 4. Details are not described herein again.

S303: Determine I based on $I_1$, $F_1$, LB, HB, B, $K_1$, $K_2$, ..., and $K_m$, where information bits corresponding to subchannel sequence numbers in I are distributed in X outer-code subcodes, the X outer-code subcodes include X1 first-type outer-code subcodes, or the X outer-code subcodes include X1 first-type outer-code subcodes, a second-type outer-code subcode, and/or a third-type outer-code subcode.

In this embodiment, a specific process of S303 is the same as a process of S203 in the embodiment shown in FIG. 5. For details, refer to the specific description of S203. Details are not described herein again.

S3104: Determine, based on I, a set A corresponding to subchannels of a local check bit, where local check bits corresponding to subchannel sequence numbers in A are distributed in the first-type outer-code subcodes, a location of a local check bit corresponding to a subchannel sequence number in A in the first-type outer-code subcode and a check relationship between the information bit and/or a frozen bit and the local check bit are indicated by using third indication information in a preset indication vector whose length is B, $K_1$, $K_2$, ..., and $K_m$ correspond to the preset indication vector, and the check relationship is used to determine a value of the local check bit.

The preset indication vector includes first indication information, second indication information, and third indication information. The first indication information indicates that a corresponding location is the frozen bit, and the second indication information indicates that a corresponding location is the information bit.

Specifically, the local check bits corresponding to the subchannel sequence numbers in the set A corresponding to the subchannels of the local check (local-check) bit are distributed in the first-type outer-code subcodes, and the third indication information in the preset indication vector whose length is B indicates a location, in the first-type outer-code subcode, of the local check bit corresponding to the subchannel sequence number in A and the check relationship between the information bit and/or the frozen bit and the local check bit. That $K_1$, $K_2$, ..., and $K_m$ correspond to the preset indication vector means that different $K_i$s correspond to different preset indication vectors, and the third indication information indicates that the corresponding location is the local check bit, and the value of the local check bit may be determined based on the check relationship between the information bit and/or the frozen bit and the local check bit.

Specifically, the determining, based on I, a set A corresponding to subchannels of a local check bit may be: determining, for each first-type outer-code subcode, the location of the local check bit in the first-type outer-code subcode based on the preset indication vector corresponding to P of the information bits in the first-type outer-code subcode; and determining A based on the determined location of the local check bit in each first-type outer-code subcode.

For example, B=16, P is $K_1$ and $K_2$, $K_1$=7, and $K_2$=11. In this case, there are two types of quantities of information bits in the first-type outer-code subcode: 7 or 11. A quantity of information bits of an outer-code subcode with another intermediate code rate is adjusted to be 7 or 11, or a quantity of information bits of an outer-code subcode with another intermediate code rate is adjusted to be 7 or 11, a low code rate, or a high code rate. For example, when P=7, the preset indication vector is [1,1,1,1,1,1,1,1,1,1,2012,3354,4696,6038,0,1], the first indication information is "0", and the second indication information is "1". In other words, "0" indicates that the corresponding location is the frozen bit, "1" indicates that the corresponding location is the information bit, and the third indication information is a value greater than 1. "2012, 3354, 4696, and 6038" are all third indication information, locations corresponding to 2012, 3354, 4696, and 6038 are locations of the local check bits, and specific values of the locations may be used to determine a local check relationship. Optionally, the first indication information and the second indication information may alternatively be of other values. After the locations of the local check bits in each first-type outer-code subcode are determined by using the third indication information, the set A corresponding to the subchannels of the local check bits in all the first-type outer-code subcodes is determined.

Optionally, the preset indication vector in this embodiment may be obtained according to reference [1], and the preset indication vector may be prestored.

S305: Determine that subchannel sequence numbers other than the subchannel sequence numbers included in I and A are subchannel sequence numbers in the set F corresponding to the subchannels of the frozen bit.

S306: Determine a value of a bit on a subchannel of each local check bit based on the check relationship, separately determine a value of a bit on the subchannel of the information bit and a value of a bit on the subchannel of the frozen bit based on I and F, and perform polar encoding on all the determined bits.

Specifically, the third indication information indicates that the corresponding location is the local check bit, a value of the third indication information is the check relationship between the information bit and/or the frozen bit and the local check bit, and each of 2012, 3354, 4696, and 6038 is a check relationship, values of four local check bits may be determined based on the four check relationships. For example, when P=11, the preset indication vector is [0,1,1, 1,1,1,1,50,1876,1622,17727,25,158,291,424,1]. All of 50, 1876, 1622, 17727, 25, 158, 291, and 424 are the third indication information, locations corresponding to 50, 1876, 1622, 17727, 25, 158, 291, 42450, 1876, 1622, 17727, 25, 158, 291, and 424 are locations of local check bits, and values of eight local check bits may be determined based on the eight check relationships.

Specifically, the determining a value of a bit on a subchannel of each local check bit based on the check relationship may be: for each local check bit, performing an exclusive OR operation on the check relationship and values of bits on the subchannels corresponding to the information bit and/or values of bits on the subchannels corresponding to the frozen bit that are indicated by results obtained after a cyclic modulo operation is performed in 11 to obtain the values of the bits on the subchannels corresponding to the local check bits.

Specifically, a value of a bit on the subchannel of the information bit and a value of a bit on the subchannel of the frozen bit are separately determined based on I and F. For example, the information bit is placed based on I, and the frozen bit is placed based on F.

According to the encoding method provided in this embodiment, after the to-be-encoded information including the K information bits and the mother code length N are obtained, $I_1$ and $F_1$ are determined based on K and N according to the reliability criterion. I is determined based on $I_1$, $F_1$, LB, HB, B, $K_1$, $K_2$, ..., and $K_m$. The information bits corresponding to the subchannel sequence numbers in I are distributed in the X outer-code subcodes. The X outer-code subcodes include the X1 first-type outer-code subcodes, or the X outer-code subcodes include the X1 first-type outer-code subcodes, the second-type outer-code subcode, and/or the third-type outer-code subcode. When LB and HB are determined, the second-type outer-code subcode is an outer-code subcode with the low code rate, the third-type outer-code subcode is an outer-code subcode with the high code rate, and the first-type outer-code subcodes are outer-code subcodes with a preset intermediate code rate. Then, the set A corresponding to the subchannels of the local check bit is determined based on I, the local check bits corresponding to the subchannel sequence numbers in A are distributed in the first-type outer-code subcodes, the location of the local check bit corresponding to the subchannel sequence number in A in the first-type outer-code subcode and the check relationship between the information bit and/or the frozen bit and the local check bit are indicated by using the third indication information in the preset indication vector whose length is B. Finally, polar encoding is performed based on I and A. Therefore, during decoding at a decoder side, the outer-code subcode with the intermediate code rate may be decoded according to a classic decoding algorithm of the algebraic code. Compared with decoding the outer-code subcode with the intermediate code rate according to the polar decoding algorithm, a decoding delay of the outer-code subcode with the intermediate code rate can be reduced, and parallel polarization decoding may be performed on the outer-code subcode with the high code rate and/or the outer-code subcode with the low code rate. In this way, the decoding delay can be reduced, and a throughput rate can be improved.

Figure 8:
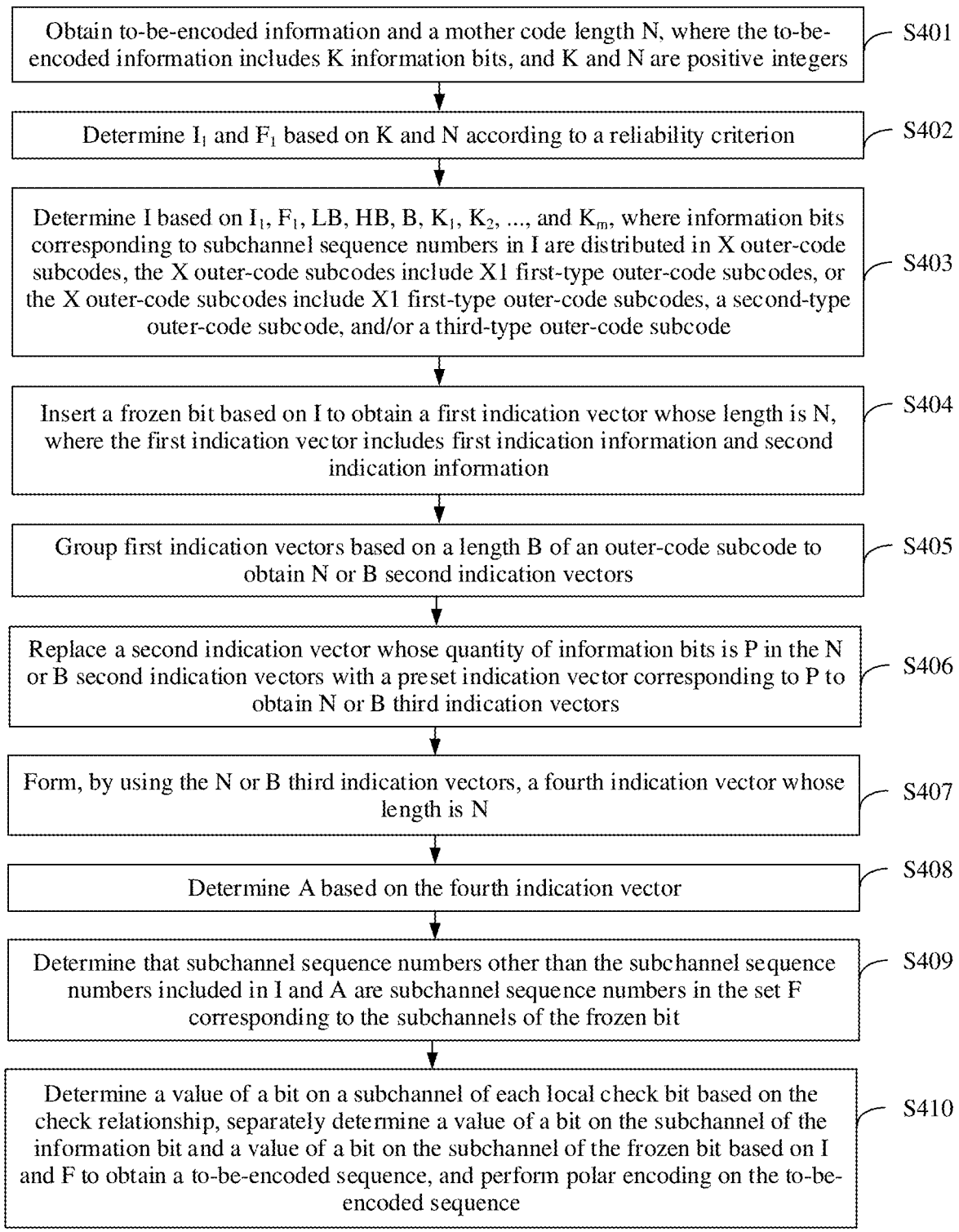
FIG. 8 is a flowchart of an embodiment of an encoding method according to this application.
Figure 9:
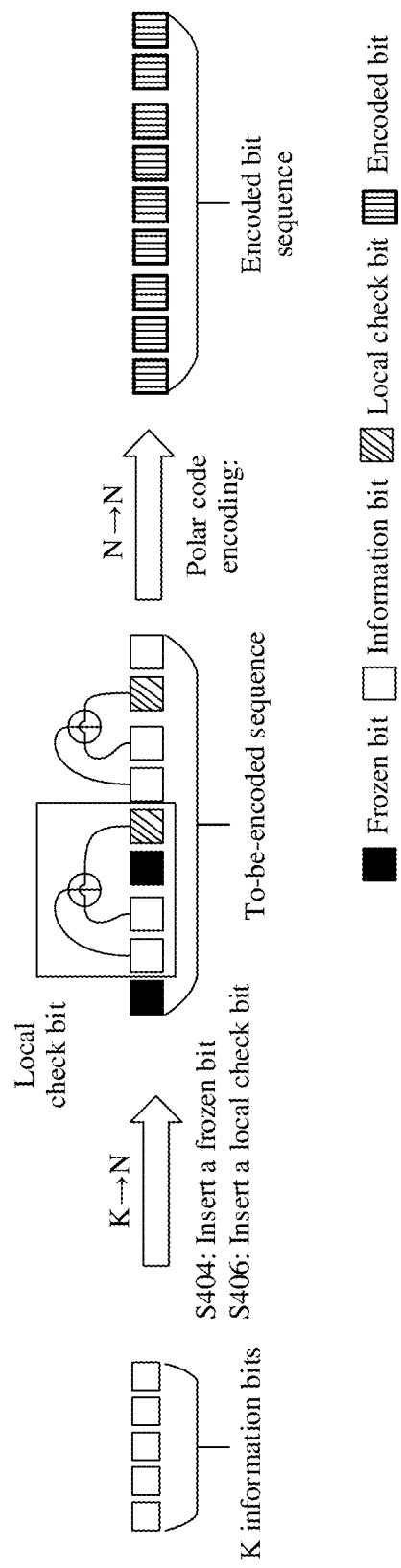
FIG. 9 is a schematic diagram of an encoding process after I is determined corresponding to the embodiment shown in FIG. 8.

FIG. 8 is a flowchart of an embodiment of an encoding method according to this application. This embodiment may be executed by a transmit device such as a base station or a terminal. A process of determining I in this embodiment is similar to that in the embodiment shown in FIG. 5. A difference is that, in this embodiment, polar encoding is also performed on a first-type outer-code subcode, local check (local-check) is used, and a Gn matrix of a polar code is multiplied, so that an encoding result the same as that in the embodiment shown in FIG. 5 can be implemented. FIG. 9 is a schematic diagram of an encoding process after I is determined corresponding to the embodiment shown in FIG. 8, that is, a schematic diagram of a process of S404 to S410. With reference to FIG. 8 and FIG. 9, the method in this embodiment may include the following steps.

S401: Obtain to-be-encoded information and a mother code length N, where the to-be-encoded information includes K information bits, and K and N are positive integers.

S402: Determine $I_1$ and $F_1$ based on K and N according to a reliability criterion.

For a manner of determining $I_1$ and $F_1$, refer to the description in the embodiment shown in FIG. 4. Details are not described herein again.

S403: Determine I based on $I_1$, $F_1$, LB, HB, B, $K_1$, $K_2$, ..., and $K_m$, where information bits corresponding to subchannel sequence numbers in I are distributed in X outer-code subcodes, the X outer-code subcodes include X1 first-type outer-code subcodes, or the X outer-code subcodes include X1 first-type outer-code subcodes, a second-type outer-code subcode, and/or a third-type outer-code subcode.

In this embodiment, a specific process of S403 is the same as a process of S203 in the embodiment shown in FIG. 5. For details, refer to the specific description of S203. Details are not described herein again.

S404: Insert a frozen bit based on I to obtain a first indication vector whose length is N, where the first indication vector includes first indication information and second indication information.

Specifically, the first indication information indicates that a corresponding location is the frozen bit, and the second indication information indicates that a corresponding location is the information bit.

S405: Group first indication vectors based on a length B of an outer-code subcode to obtain $_B/^N$ second indication vectors.

Specifically, first indication vectors whose lengths are N are sequentially grouped, a length of the second indication vector is B, and the $_B/^N$ second indication vectors are obtained.

For example, a first indication vector whose length N=32 is [1,1,1,1,1,1,1,1,1,0,0,0,0,0,1,1,0,1,1,0,1,0,1,0,0,0,1,1,0, 0,0,0,0,1]. If B is 4, eight second indication vectors are obtained through sequential grouping: [1,1,1,1], [1,1,1,1], [1,1,0,0], [0,0,0,1], [1,0,1,0], [1,0, 0,0], [1,1,0,0], and [0,0, 0,1].

For another example, a first indication vector whose length N=32 is [1,0,1,0,1,0,0,0,1,1,0,0,0,0,0,1]. If B is 16, two second indication vectors are obtained through sequential grouping: [1,1,1,1,1,1,1,1,1,1,0,0,0,0,0,1] and [1,0,1,0, 1,0,0,0,1,1,0,0,0,0,0,1].

S406: Replace a second indication vector whose quantity of information bits is P in the $_B/^N$ second indication vector with a preset indication vector corresponding to P to obtain $_B/^N$ third indication vectors.

The preset indication vector includes first indication information, second indication information, and third indication information. The first indication information indicates that a corresponding location is the frozen bit, the second indication information indicates that a corresponding location is the information bit, and the third indication information indicates that a corresponding location is a local check bit and a check relationship between the information bit and/or the frozen bit and the local check bit.

Specifically, the second indication vector whose quantity of information bits is P is replaced, and a second indication vector whose quantity of information bits is not P is not processed; and for example, B=16, P is $K_1$ and $K_2$, $K_{1=7}$, and $K_2$=11, where when P=7, the preset indication vector is [1,1,1,1,1,1,1,1,1,1,2012,3354,4696,6038,0,1], when P=11, the preset indication vector is [0,1,1,1,1,1,1,50,1876,1622, 17727,25,158,291,424,1], all second indication vectors whose quantities of information bits are 7 are replaced with [1,1,1,1,1,1,1,1,1,1,2012,3354,4696,6038,0,1], and all second indication vectors whose quantities of information bits are 11 are replaced with [0,1,1,1,1,1,1,50,1876,1622,17727, 25,158,291,424,1].

The replacement process in S406 is equivalent to a process of inserting the local check bit.

S407: Form, by using the $_B/^N$ third indication vectors, a fourth indication vector whose length is N.

The $_B/^N$ third indication vectors include the second indication vector whose quantity of information bits is not P and the replaced preset indication vector corresponding to P.

When the $_B/^N$ third indication vectors form me fourth indication vector whose length is N, the third indication vectors need to be sequentially concatenated in an order before grouping to form the fourth indication vector whose length is N.

S408: Determine A based on the fourth indication vector.

For example, N=32 and B=16. The first indication vector is [1,0,1,0,1,0,0,0,1,1,0,0,0,0,0,1]. If the first indication vectors are sequentially grouped to obtain two second indication vectors, a first indication vector is [1,1,1,1,1,1,1,1,1,1,0,0, 0,0,0,1], and a second indication vector is [1,0,1,0,1,0,0,0, 1,1,0,0,0,0,0,1]. If the first indication vector is replaced with [1,1,1,1,1,1,1,1,1,1,2012,3354,4696,6038,0,1], the fourth indication vector is [1,1,1,1,1,1,1,1,1,1,2012,3354,4696, 6038,0,1, 1,0,1,0,1,0,0,0,1,1,0,0,0,0,0,1].

In the fourth indication vector, 1 indicates that a corresponding location is the information bit, 0 indicates that a corresponding location is the frozen bit, a value greater than 1 indicates that a corresponding location is the local check bit, and locations indicated by values corresponding to 2012, 3354, 4696, and 6038 are local check bits. In this case, it may be determined, based on the value greater than 1, that A is [11, 12, 13, 14].

S409: Determine that subchannel sequence numbers other than the subchannel sequence numbers included in I and A are subchannel sequence numbers in the set F corresponding to the subchannels of the frozen bit.

S410: Determine a value of a bit on a subchannel of each local check bit based on the check relationship, separately determine a value of a bit on the subchannel of the information bit and a value of a bit on the subchannel of the frozen bit based on I and F to obtain a to-be-encoded sequence, and perform polar encoding on the to-be-encoded sequence.

Specifically, an example in which the corresponding preset indication vector is [1,1,1,1,1,1,1,1,1,1,2012,3354,4696, 6038,0,1] when P=7 is used. The third indication information indicates that the corresponding location is the local check bit, a value of the third indication information is the check relationship between the information bit and/or the frozen bit and the local check bit, and each of 2012, 3354, 4696, and 6038 is a check relationship, values of four local check bits may be determined based on the four check relationships.

The determining a value of a bit on a subchannel of each local check bit based on the check relationship may be: for each local check bit, performing an exclusive OR operation on the check relationship and values of bits on the subchannels corresponding to the information bit and/or values of bits on the subchannels corresponding to the frozen bit that are indicated by results obtained after a cyclic modulo operation is performed in 11 to obtain the values of the bits on the subchannels corresponding to the local check bits.

The performing polar encoding on the to-be-encoded sequence may be multiplying the to-be-encoded sequence z by $G_N$, and performing polar code encoding to obtain an encoded bit sequence x, where $x=zG_N$.

The following provides a specific implementation of determining the value of the bit on the subchannel of each local check bit based on the check relationship. For example, the following manner may be used, where L2($i$) is an indication vector of the length B:

```
z = zeros(1,B); t = 1, q = (K == 7)
For i = 1:B
    j = L2 (i)
    If j == 1
        z(i) = u (t++)
    Else
        while j! = 0
            z(i) = z(i) ⊕ z(q + j%11)
            j = ⌊j/11⌋
        end
    end
end.
```

In this manner, a process of obtaining the bit sequence of the corresponding outer-code subcode based on the indication vector L2($i$) is shown.

First, a z sequence whose length is B is initialized [0,0,0,0,0, . . . ,0,0]. When a bit index t of the initialized bit sequence is equal to 1, and K is equal to 7, q is equal to 1. When K is not equal to 7, q is equal to 0.

Then, i=1 to B are traversed.

j=L2($i$), and j is traversed starting from a first bit of indication information in L2($i$).

If j=1, z(i)=u (t), t is increased by 1.

If j is not equal to 1, the following process is performed.

If j is not equal to 0 (that is, j is a value greater than 1), z(i)=z(i)⊗z(q+j % 11), j=⌊j/11⌋, and an operation performed is: z(i) is equal to a value obtained after an exclusive OR operation is performed on a value of a bit on a subchannel corresponding to an information bit and/or a value of a bit on a subchannel corresponding to a frozen bit indicated by each result obtained after a cyclic modulo operation is performed in 11 on the check relationship j, where the value is 0 or 1.

Finally, a bit sequence that is of an outer-code subcode and that is corresponds to the indication vector L2($i$) is obtained. For example, L2($i$) is [1,1,1,1,1,1,1,1,1,1,2012, 3354,4696,6038,0,1], and each bit of indication information in L2($i$) is traversed to obtain a bit sequence that is of the outer-code subcode and whose length is B.

Figure 10:
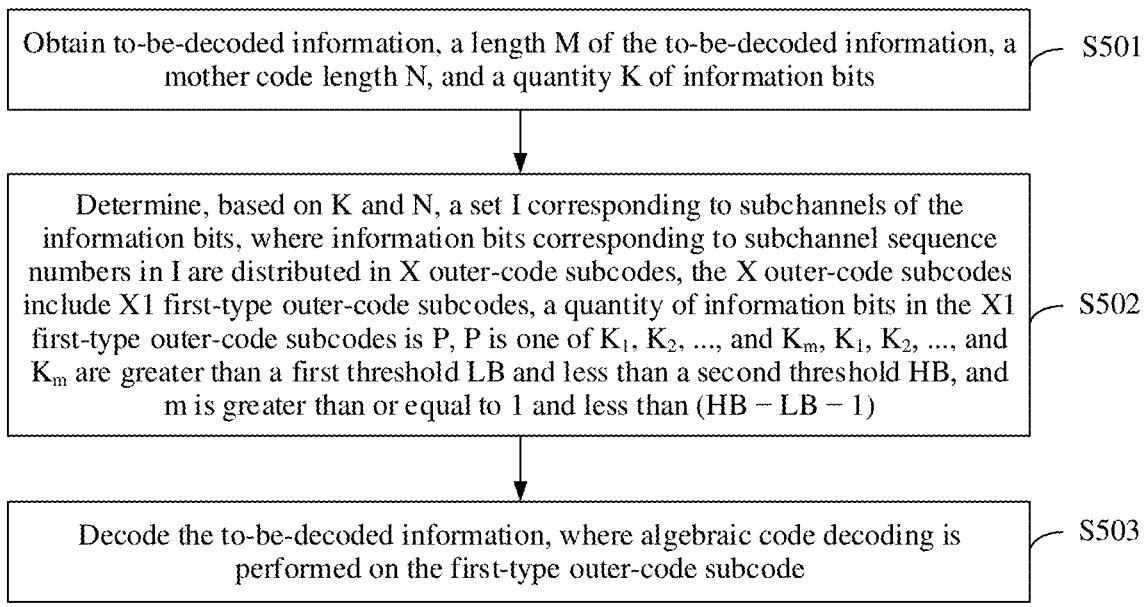
FIG. 10 is a flowchart of an embodiment of a decoding method according to this application.

FIG. 10 is a flowchart of an embodiment of a decoding method according to this application. This embodiment may be executed by a transmit device such as a base station or a terminal. As shown in FIG. 10, the method in this embodiment may include the following steps.

S501: Obtain to-be-decoded information, a length M of the to-be-decoded information, a mother code length N, and a quantity K of information bits.

The to-be-decoded information is information, after polar encoding, of the transmit device, that is, an encoded bit sequence. After the to-be-decoded information is obtained, the length M of the to-be-decoded information may be obtained. The mother code length (that is, the length of the to-be-decoded information) $N=2^{\lceil \log_2(M) \rceil}$, and ⌈ ⌉ is a round-up function. A value of K may be determined based on a target code rate R and M, K=M*R, and K and M may be input values.

S502: Determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1, K_2, \ldots,$ and $K_m$, $K_1, K_2, \ldots,$ and $K_m$ are greater than a first threshold LB and less than a second threshold HB, and m is greater than or equal to 1 and less than (HB−LB−1).

LB+1<HB, HB is less than or equal to a length B of an outer-code subcode, X, HB, and B are positive integers, and LB is an integer greater than or equal to 0.

The set I corresponding to the subchannels of the information bits is determined based on K and N. A specific determining manner is similar to a process of an encoder side. For details, refer to the specific implementation process of S102. Details are not described herein again.

S503: Decode the to-be-decoded information, where algebraic code decoding is performed on the first-type outer-code subcode.

In this embodiment, LB and HB are thresholds for classifying a low code rate, an intermediate code rate, and a high code rate. In this embodiment, the X outer-code subcodes include the X1 first-type outer-code subcodes. The first-type outer-code subcodes are outer-code subcodes with the preset intermediate code rate (that is, $_B/^P$), but are not all outer-code subcodes, between $_B/^{LB}$ and $_B/^{HB}$, with the immediate code rate. Therefore, during decoding at a decoder side, the outer-code subcode with the intermediate code rate that is $_B/^P$ may be decoded according to a classic decoding algorithm of an algebraic code. For example, the outer-code subcode with the intermediate code rate that is $_B/^P$ is decoded according to a (Berlekamp-Massey, BM) algorithm. Compared with decoding the outer-code subcode with the intermediate code rate according to a polar decoding algorithm, a decoding delay of the outer-code subcode with the intermediate code rate can be reduced. In this way, the decoding delay can be reduced, and a throughput rate can be improved.

Further, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB. To be specific, when LB and HB are determined, the second-type outer-code subcode is an outer-code subcode with a low code rate, and the third-type outer-code subcode is an outer-code subcode with a high code rate.

In this case, when the to-be-decoded information is decoded, algebraic code decoding may be performed on the first-type outer-code subcode, and parallel polarization decoding may be performed on the second-type outer-code subcode or the third-type outer-code subcode. In this way, the overall decoding delay can be reduced, and the throughput rate can be improved.

According to the decoding method provided in this embodiment, after the to-be-decoded information, the length M of the to-be-decoded information, the mother code length N, and the quantity K of information bits are obtained, the set I corresponding to the subchannels of the information bits is determined based on K and N. The information bits corresponding to the subchannel sequence numbers in the determined I are distributed in the X outer-code subcodes, the X outer-code subcodes include the X1 first-type outer-code subcodes, the quantities of information bits in the X1 first-type outer-code subcodes are P, P is one of $K_1, K_2, \ldots,$ and $K_m$, $K_1, K_2, \ldots,$ and $K_m$ are greater than the first threshold LB and less than the second threshold HB, LB+1<HB, and m is less than (HB−LB−1). P is not all values between LB and HB. In other words, the X outer-code subcodes include the outer-code subcode with the preset intermediate code rate (that is, $_B/^P$), but do not include all outer-code subcodes with intermediate code rates. Therefore, during decoding at the decoder side, the outer-code subcode with the intermediate code rate may be decoded according to the classic decoding algorithm of the algebraic code. Compared with decoding the outer-code subcode with the intermediate code rate according to the polar decoding algorithm, the decoding delay of the outer-code subcode with the intermediate code rate can be reduced. In this way, the decoding delay can be reduced, and the throughput rate can be improved.

To implement functions in the foregoing methods provided in embodiments of this application, the receive device and/or the transmit device may include a hardware structure and/or a software module, to implement the foregoing functions in a form of the hardware structure, the software module, or a combination of the hardware structure and the software module. The receive device may be a terminal device or a network device. Similarly, the transmit device may be a terminal device or a network device. Whether a function in the foregoing functions is performed by using the hardware structure, the software module, or the combination of the hardware structure and the software module depends on particular applications and design constraints of the technical solutions.

Based on a same technical concept, an embodiment of this application further provides the following communications apparatuses (including an encoding apparatus, a decoding apparatus, and the like), which may include modules or units in a one-to-one correspondence for performing the methods/operations/steps/actions of a transmitting end or a receiving end in the foregoing method embodiments. The units may be hardware circuits, or may be implemented by software, or may be implemented by a hardware circuit in combination with software.

Figure 11:
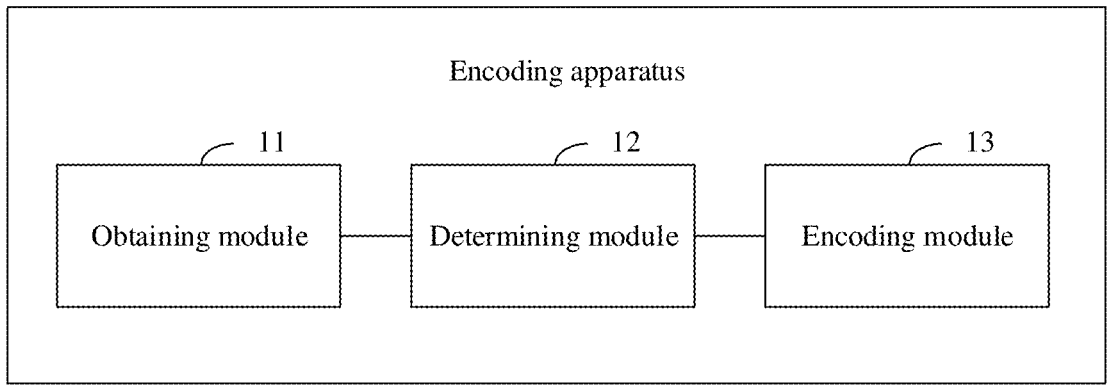
FIG. 11 is a schematic diagram of a structure of an embodiment of an encoding apparatus according to this application.

FIG. 11 is a schematic diagram of a structure of an embodiment of an encoding apparatus according to this application. As shown in FIG. 1$i$, the apparatus in this embodiment may include an obtaining module 11, a determining module 12, and an encoding module 13.

The obtaining module 11 is configured to obtain to-be-encoded information and a mother code length N, where the to-be-encoded information includes K information bits, and K and N are positive integers.

The determining module 12 is configured to determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1$, $K_2, \ldots$, and $K_m$, $K_1, K_2, \ldots$, and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0.

The encoding module 13 is configured to perform encoding based on I.

Optionally, I is determined based on a set $I_1$ corresponding to subchannels of an initial information bit, a set $F_1$ corresponding to subchannels of an initial frozen bit, LB, HB, B, $K_1, K_2, \ldots$, and $K_m$; and $I_1$ and $F_1$ are obtained based on K and N according to a reliability criterion.

Further, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB.

The apparatus in this embodiment may be configured to execute the technical solution in the method embodiment shown in FIG. 4. Implementation principles and technical effect thereof are similar. Details are not described herein again.

Figure 12:
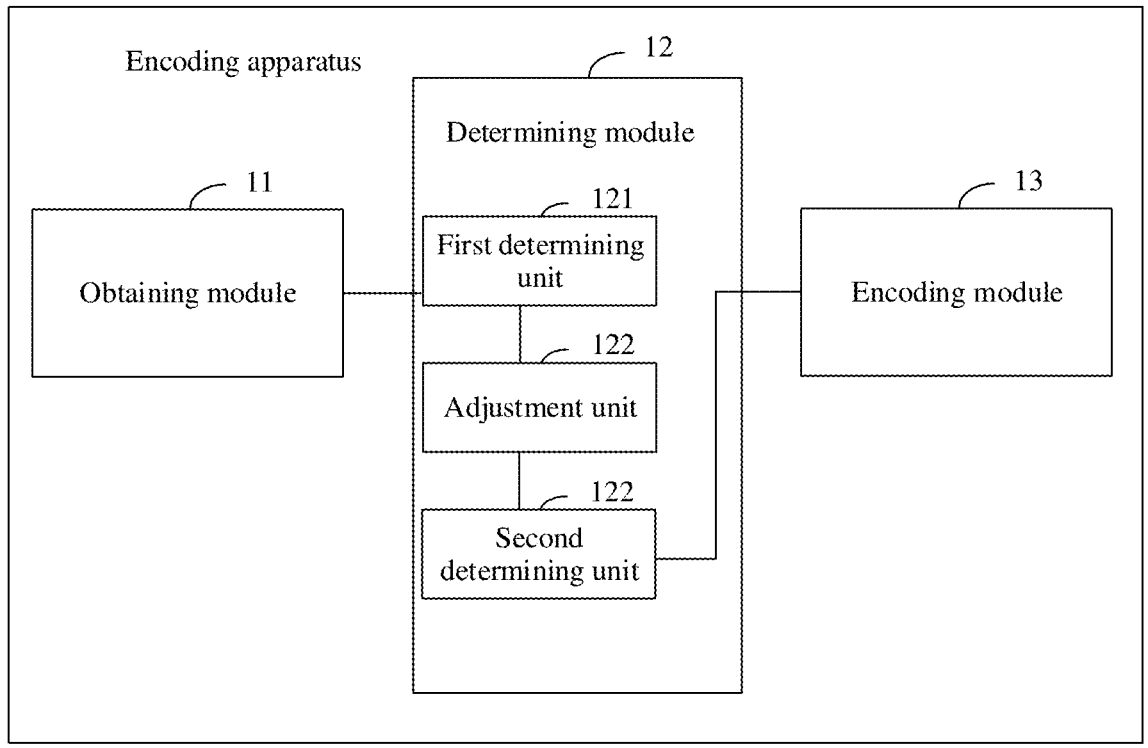
FIG. 12 is a schematic diagram of a structure of an embodiment of an encoding apparatus according to this application.

FIG. 12 is a schematic diagram of a structure of an embodiment of an encoding apparatus according to this application. As shown in FIG. 12, based on the apparatus shown in FIG. 11, in the apparatus in this embodiment, the determining module 12 further includes a first determining unit 121, an adjustment unit 122, and a second determining unit 123.

The first determining unit 121 is configured to: when I is determined based on $I_1$, $F_1$, LB, HB, B, $K_1, K_2, \ldots$, and $K_m$, determine a first outer-code subcode set and a second outer-code subcode set based on $_B/^N$ outer-code subcodes, where the first outer-code subcode set includes the first-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$.

The adjustment unit 122 is configured to adjust a fourth-type outer-code subcode in the second outer-code subcode set to the first-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to any one of $K_1, K_2, \ldots$, and $K_m$.

The second determining unit 123 is configured to determine I based on the first outer-code subcode set and the adjusted second outer-code subcode set.

Further, the adjustment unit 122 is configured to adjust a quantity of information bits in the fourth-type outer-code subcode to enable the quantity of information bits in the fourth-type outer-code subcode to be $K_1, K_2, \ldots$, and $K_m$.

Further, the adjustment unit 122 is configured to: when the quantity of information bits is adjusted for the $i^{th}$ fourth-type outer-code subcode, perform the following operation:

determining t and y, where t is a subchannel sequence number of an information bit with lowest reliability in the $i^{th}$ fourth-type outer-code subcode, y is a subchannel sequence number of a frozen bit with highest reliability in a first set, the first set is a set including subchannel sequence numbers of frozen bits in all fourth-type outer-code subcodes other than the $i^{th}$ fourth-type outer-code subcode;

determining whether a first condition is met, where the first condition is: a quantity n of information bits in an outer-code subcode in which a $y^{th}$ subchannel is located is greater than or equal to HB−1, or n is less than LB, or the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2);

if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is one of $K_1, K_2, \ldots$, and $K_m$.

In another implementation, the first determining unit 121 is configured to: when I is determined based on $I_1$, $F_1$, LB, HB, B, $K_1, K_2, \ldots$, and $K_m$, determine a first outer-code subcode set and a second outer-code subcode set based on $_B/^N$ outer-cone subcodes, where the first outer-code subcode set includes the first-type outer-code subcode, the second-type outer-code subcode, and/or the third-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$.

The adjustment unit 122 is configured to adjust a fourth-type outer-code subcode in the second outer-code subcode set to any one of the first-type outer-code subcode, the second-type outer-code subcode, or the third-type outer-code subcode, where a quantity of information bits in an $i^{th}$ fourth-type outer-code subcode is $Y_i$, i is greater than or equal to 1, Yi is greater than LB and less than HB, and Yi is not equal to any one of $K_1, K_2, \ldots$, and $K_m$.

The second determining unit 123 is configured to determine I based on the first outer-code subcode set and the adjusted second outer-code subcode set.

Further, the adjustment unit 122 is configured to: adjust a quantity of information bits in the fourth-type outer-code subcode to enable the quantity of information bits in the fourth-type outer-code subcode to be any one of the following: one of $K_1, K_2, \ldots$, and $K_m$, less than or equal to LB, or greater than or equal to HB.

Further, the adjustment unit 122 is configured to:

when the quantity of information bits is adjusted for the $i^{th}$ fourth-type outer-code subcode, perform the following operation:

determining t and y, where t is a subchannel sequence number of an information bit with lowest reliability in the $i^{th}$ fourth-type outer-code subcode, y is a subchannel sequence number of a frozen bit with highest reliability in a second set, the second set is a set including subchannel sequence numbers of frozen bits in all fourth-type outer-code subcodes other than the $i^{th}$ fourth-type outer-code subcode;

determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2);

if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following:

one of $K_1, K_2, \ldots,$ and $K_m$, less than or equal to LB, or greater than or equal to HB.

The apparatus in this embodiment may be configured to execute the technical solution in the method embodiment shown in FIG. 4. Implementation principles and technical effect thereof are similar. Details are not described herein again.

Optionally, the first-type outer-code subcode is an algebraic code, $K_1, K_2, \ldots,$ and $K_m$ are determined based on an error correction capability of the algebraic code, and m is determined based on construction of the algebraic code.

Optionally, a code length of the algebraic code is equal to the length B of the outer-code subcode.

Optionally, the algebraic code is obtained by using any one of the following methods based on an original algebraic code whose length is B−1: copying any bit in the original algebraic code whose length is B−1, and adding the copied bit to the original algebraic code to obtain the algebraic code; and performing parity check on any Z bits or all bits in the original algebraic code whose length is B−1, and adding a parity check value to the original algebraic code to obtain the algebraic code, where 1<Z<B−1.

Further, the encoding module is configured to: determine subchannels other than the subchannels in I as a set F corresponding to the subchannels of the frozen bits; and determine a value of a bit on each subchannel, perform algebraic code encoding on a bit corresponding to the first-type outer-code subcode, and perform polar encoding on a bit corresponding to an outer-code subcode other than the first-type outer-code subcode.

Figure 13:
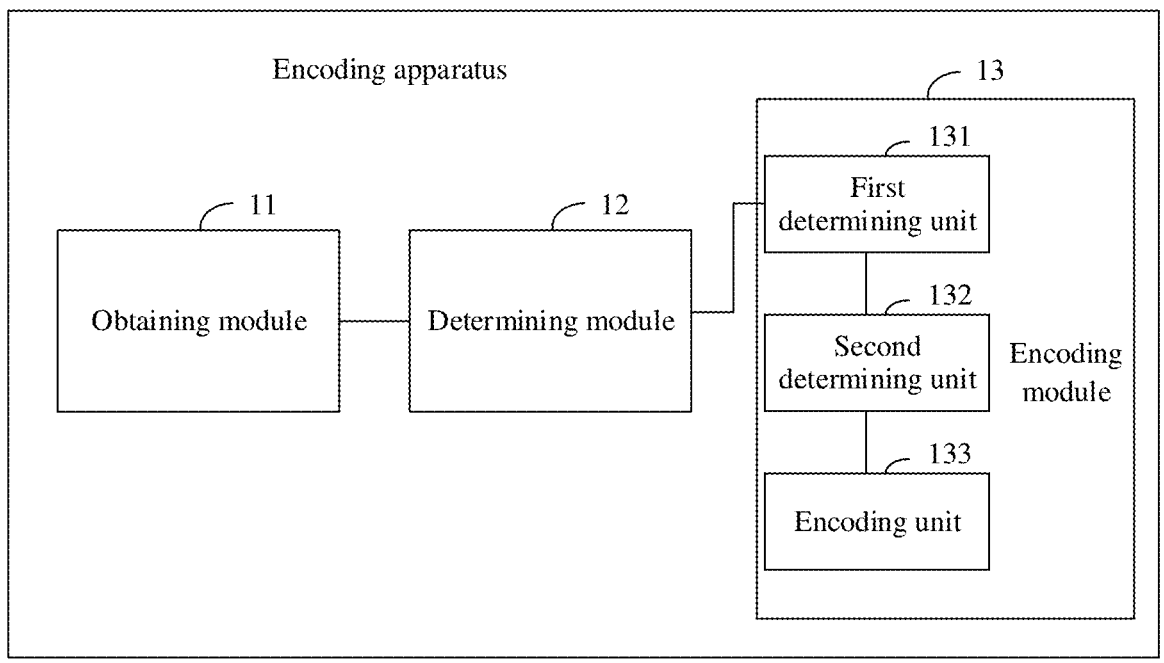
FIG. 13 is a schematic diagram of a structure of an embodiment of an encoding apparatus according to this application.

FIG. 13 is a schematic diagram of a structure of an embodiment of an encoding apparatus according to this application. As shown in FIG. 13, the apparatus in this embodiment is based on the apparatus shown in FIG. 10 or FIG. 11. Further, the encoding module 13 includes a first determining unit 131, a second determining unit 132, and an encoding unit 133.

The first determining unit 131 is configured to determine, based on I, a set A corresponding to subchannels of a local check bit, where local check bits corresponding to subchannel sequence numbers in A are distributed in the first-type outer-code subcodes, a location of a local check bit corresponding to a subchannel sequence number in A in the first-type outer-code subcode and a check relationship between the information bit and/or the frozen bit and the local check bit are indicated by using third indication information in a preset indication vector whose length is B, P corresponds to the preset indication vector, the check relationship is used to determine a value of the local check bit, the preset indication vector includes first indication information, second indication information, and the third indication information, the first indication information indicates that a corresponding location is the frozen bit, and the second indication information indicates that a corresponding location is the information bit.

The second determining unit 132 is configured to determine that subchannel sequence numbers other than the subchannel sequence numbers included in I and A are subchannel sequence numbers in the set F corresponding to the subchannels of the frozen bit.

The encoding unit 133 is configured to: determine a value of a bit on each subchannel, and perform polar encoding on all determined bits.

Optionally, the first determining unit 131 is configured to: determine, for each first-type outer-code subcode, the location of the local check bit in the first-type outer-code subcode based on the preset indication vector corresponding to P of the information bits in the first-type outer-code subcode; and determine A based on the determined location of the local check bit in each first-type outer-code subcode.

Optionally, the first determining unit 131 is configured to:

insert a frozen bit based on I to obtain a first indication vector whose length is N, where the first indication vector includes first indication information and second indication information;

group first indication vectors based on the length B of the outer-code subcode to obtain $_B/^N$ second indication vectors; and perform the following processing on the $_B/^N$ second indication vectors to obtain $_B/^N$ third indication vectors:

replacing a second indication vector whose quantity of information bits is P with the preset indication vector corresponding to P;

forming, by using the $_B/^N$ third indication vectors, a fourth indication vector whose length is N; and determining A based on the fourth indication vector.

Optionally, the encoding unit 133 is configured to: determine a value of a bit on a subchannel of each local check bit based on the check relationship; and separately determine a value of a bit on the subchannel of the information bit and a value of a bit on the subchannel of the frozen bit based on I and F.

The apparatus in this embodiment may be configured to execute the technical solution in the method embodiment shown in FIG. 4. Implementation principles and technical effect thereof are similar. Details are not described herein again.

Figure 14:
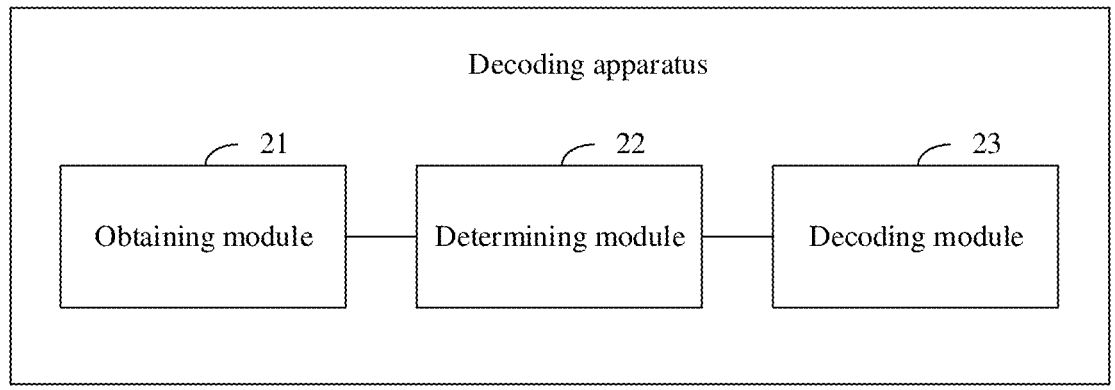
FIG. 14 is a schematic diagram of a structure of an embodiment of a decoding apparatus according to this application.

FIG. 14 is a schematic diagram of a structure of an embodiment of a decoding apparatus according to this application. As shown in FIG. 14, the apparatus in this embodiment may include an obtaining module 21, a determining module 22, and a decoding module 23.

The obtaining module 21 is configured to obtain to-be-decoded information, a length M of the to-be-decoded information, a mother code length N, and a quantity K of information bits.

The determining module 22 is configured to determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1$, $K_2, \ldots$, and $K_m$, $K_1, K_2, \ldots$, and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0.

The decoding module 23 is configured to decode the to-be-decoded information, where algebraic code decoding is performed on the first-type outer-code subcode.

Optionally, I is determined based on a set L corresponding to subchannels of an initial information bit, a set $F_1$ corresponding to subchannels of an initial frozen bit, LB, HB, B, $K_1, K_2, \ldots$, and $K_m$; and $I_1$ and $F_1$ are obtained based on K and N according to a reliability criterion.

Further, the X outer-code subcodes further include a second-type outer-code subcode and/or a third-type outer-code subcode, a quantity of information bits in the second-type outer-code subcode is less than or equal to LB, and a quantity of information bits in the third-type outer-code subcode is greater than or equal to HB.

The apparatus in this embodiment may be configured to execute the technical solution in the method embodiment shown in FIG. 10. Implementation principles and technical effect thereof are similar. Details are not described herein again.

Figure 15:
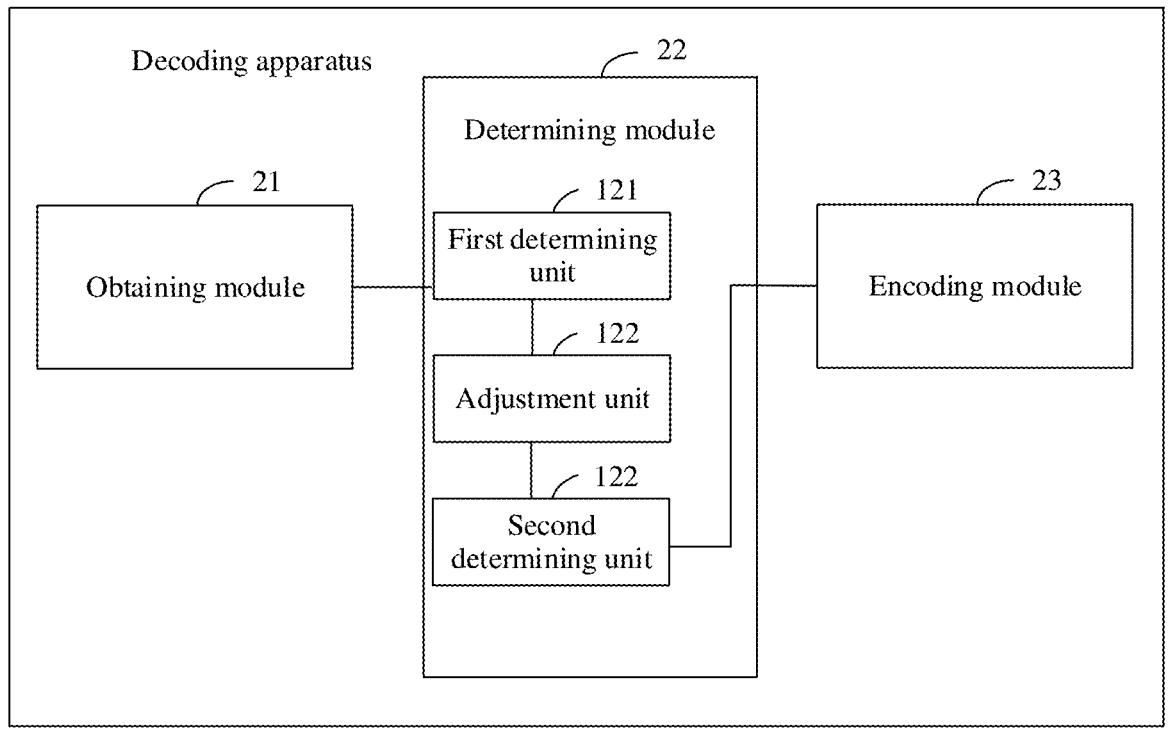
FIG. 15 is a schematic diagram of a structure of an embodiment of a decoding apparatus according to this application.

FIG. 15 is a schematic diagram of a structure of an embodiment of a decoding apparatus according to this application. As shown in FIG. 15, based on the apparatus shown in FIG. 14, in the apparatus in this embodiment, the determining module 22 further includes a first determining unit 221, an adjustment unit 222, and a second determining unit 223.

The first determining unit 221 is configured to: when I is determined based on $I_1$, $F_1$, LB, HB, B, $K_1, K_2, \ldots$, and $K_m$, determine a first outer-code subcode set and a second outer-code subcode set based on $_B/^N$ outer-code subcoded, where the first outer-code subcode set includes the first-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$.

The adjustment unit 222 is configured to adjust a fourth-type outer-code subcode in the second outer-code subcode set to the first-type outer-code subcode, where a quantity of information bits in an $i^{th}$ fourth-type outer-code subcode is $Y_i$, i is greater than or equal to 1, Yi is greater than LB and less than HB, and $Y_i$ is not equal to any one of $K_1, K_2, \ldots$, and $K_m$.

The second determining unit 223 is configured to determine I based on the first outer-code subcode set and the adjusted second outer-code subcode set.

Further, the adjustment unit 222 is configured to: adjust a quantity of information bits in the fourth-type outer-code subcode to enable the quantity of information bits in the fourth-type outer-code subcode to be one of $K_1, K_2, \ldots$, and $K_m$.

Further, the adjustment unit 222 is configured to:
when the quantity of information bits is adjusted for the $i^{th}$ fourth-type outer-code subcode, perform the following operation:
determining t and y, where t is a subchannel sequence number of an information bit with lowest reliability in the $i^{th}$ fourth-type outer-code subcode, y is a subchannel sequence number of a frozen bit with highest reliability in a first set, the first set is a set including subchannel sequence numbers of frozen bits in all fourth-type outer-code subcodes other than the $i^{th}$ fourth-type outer-code subcode;
determining whether a first condition is met, where the first condition is: a quantity n of information bits in an outer-code subcode in which a $y^{th}$ subchannel is located is greater than or equal to HB−1, or n is less than LB, or
the first condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2);
if the first condition is met, changing the $y^{th}$ subchannel to a subchannel of an information bit, and changing a $t^{th}$ subchannel to a subchannel of a frozen bit, or if the first condition is not met, removing the $y^{th}$ subchannel from the first set; and continuing to perform the foregoing operation until the quantity of information bits in the $i^{th}$ fourth-type outer-code subcode is one of $K_1, K_2, \ldots$, and $K_m$.

In another implementation, the first determining unit 221 is configured to: when I is determined based on $I_1$, $F_1$, LB, HB, B, $K_1, K_2, \ldots$, and $K_m$, determine a first outer-code subcode set and a second outer-code subcode set based on $_B/^N$ outer-code subcodes, where the outer-code subcode set includes the first-type outer-code subcode, the second-type outer-code subcode, and/or the third-type outer-code subcode, the second outer-code subcode set is a complementary set of the first outer-code subcode, a bit sequence of the $_B/^N$ outer-code subcodes is determined based on N, B, and a first bit sequence, and the first bit sequence is determined based on $I_1$ and $F_1$.

The adjustment unit 222 is configured to adjust a fourth-type outer-code subcode in the second outer-code subcode set to any one of the first-type outer-code subcode, the second-type outer-code subcode, or the third-type outer-code subcode, where a quantity of information bits in an $i^{th}$ fourth-type outer-code subcode is $Y_i$, i is greater than or equal to 1, $Y_i$ is greater than LB and less than HB, and $Y_i$ is not equal to any one of $K_1, K_2, \ldots$, and $K_m$.

The second determining unit 223 is configured to determine I based on the first outer-code subcode set and the adjusted second outer-code subcode set.

Further, the adjustment unit 222 is configured to: adjust a quantity of information bits in the fourth-type outer-code subcode to enable the quantity of information bits in the fourth-type outer-code subcode to be any one of the following: one of $K_1, K_2, \ldots$, and $K_m$, less than or equal to LB, or greater than or equal to HB.

Further, the adjustment unit 222 is configured to:
when the quantity of information bits is adjusted for the $i^{th}$ fourth-type outer-code subcode, perform the following operation:
determining t and y, where t is a subchannel sequence number of an information bit with lowest reliability in the $i^{th}$ fourth-type outer-code subcode, y is a subchannel sequence number of a frozen bit with highest reliability in a second set, the second set is a set including subchannel sequence numbers of frozen bits in all fourth-type outer-code subcodes other than the $i^{th}$ fourth-type outer-code subcode;
determining whether a second condition is met, where the second condition is: a quantity n of information bits in an outer-code subcode in which a $y^{th}$ subchannel is located is greater than or equal to HB−1, or n is less than LB, or the second condition is: a quantity n of information bits in an outer-code subcode in which a $y^{th}$ subchannel is located is less than LB, or when y is greater than t, the quantity n of information bits in the outer-code subcode in which the $y^{th}$ subchannel is located is greater than (HB−2);

if the second condition is met, changing the $y^{th}$ subchannel to a subchannel of an information bit, and changing a $t^{th}$ subchannel to a subchannel of a frozen bit, or if the second condition is not met, removing the $y^{th}$ subchannel from the second set; and continuing to perform the foregoing operation until the quantity of information bits in the $i^{th}$ fourth-type outer-code subcode is any one of the following:

one of $K_1, K_2, \ldots,$ and $K_m$, less than or equal to LB, or greater than or equal to HB.

Optionally, the first-type outer-code subcode is an algebraic code, P is determined based on an error correction capability of the algebraic code, and m is determined based on construction of the algebraic code.

Optionally, a code length of the algebraic code is equal to the length B of the outer-code subcode.

Optionally, the algebraic code is obtained by using any one of the following methods based on an original algebraic code whose length is B−1: copying any bit in the original algebraic code whose length is B−1, and adding the copied bit to the original algebraic code to obtain the algebraic code; and performing parity check on any Z bits or all bits in the original algebraic code whose length is B−1, and adding a parity check value to the original algebraic code to obtain the algebraic code, where 1<Z<B−1.

Further, the decoding module is configured to: perform parallel polar decoding on the second-type outer-code subcode or the third-type outer-code subcode.

Figure 16:
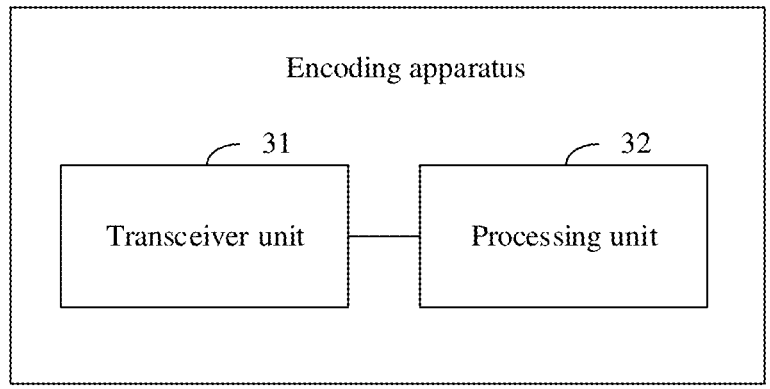
FIG. 16 is a schematic diagram of a structure of an encoding apparatus according to this application.

FIG. 16 is a schematic diagram of a structure of an encoding apparatus according to this application. As shown in FIG. 16, the encoding apparatus includes a transceiver unit 31 and a processing unit 32.

The transceiver unit 31 is configured to obtain to-be-encoded information and a mother code length where the to-be-encoded information includes K information bits.

Specifically, the processing unit 32 is configured to implement steps and/or procedures in the encoding method shown in FIG. 4. For details, refer to related description in the foregoing method embodiments.

For example, the processing unit 32 is configured to determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0.

The processing unit 32 is further configured to perform encoding based on I.

Optionally, the transceiver unit 31 is further configured to send an encoded bit sequence.

Figure 17:
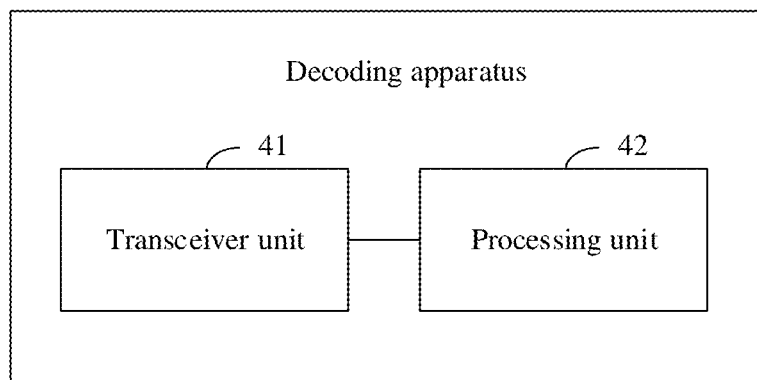
FIG. 17 is a schematic diagram of a structure of a decoding apparatus according to this application.

FIG. 17 is a schematic diagram of a structure of a decoding apparatus according to this application. As shown in FIG. 17, the decoding apparatus includes a transceiver unit 41 and a processing unit 42.

The transceiver unit 41 is configured to obtain to-be-decoded information, a length M of the to-be-decoded information, a mother code length N, and a quantity K of information bits.

The processing unit 42 is configured to implement steps and/or procedures in the decoding method shown in FIG. 10. For details, refer to related description in the foregoing method embodiments.

For example, the processing unit 42 is configured to determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0.

The processing unit 42 is further configured to decode the to-be-decoded information, where algebraic code decoding is performed on the first-type outer-code subcode.

Optionally, the transceiver unit 41 is further configured to send decoded information.

Figure 18:
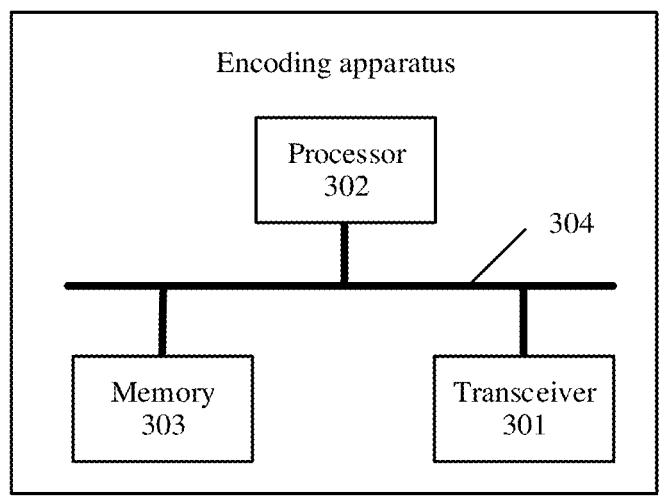
FIG. 18 is a schematic diagram of a structure of an encoding apparatus according to this application.

FIG. 18 is a schematic diagram of a structure of an encoding apparatus according to this application. The encoding apparatus includes:

a transceiver 301, configured to obtain to-be-encoded information; and at least one processor 302, configured to invoke and execute program instructions in a memory to implement the steps in the encoding method shown in FIG. 4. For details, refer to related description in the foregoing method embodiments.

Optionally, the encoding apparatus further includes a memory 303. The memory 303 is configured to store program instructions, and the memory may alternatively be a flash (flash memory).

Optionally, the memory 303 may be independent, or may be integrated with the processor 302.

When the memory 303 is a component independent of the processor 302, the encoding apparatus may further include: a bus 304, configured to connect the memory 303 and the processor 302. The bus is represented by a thick line in FIG. 18, and a connection manner between other components is merely described as an example, and is not limited thereto. The bus may be classified into an address bus, a data bus, a control bus, and the like. For ease of representation, only one thick line is used to represent the bus in FIG. 18, but this does not mean that there is only one bus or only one type of bus.

The encoding apparatus may be configured to perform the steps and/or procedures that correspond to the transmit device in the foregoing method embodiment. The encoding apparatus may be a terminal or a network device, an apparatus in a terminal or a network device, or an apparatus that can be used together with a terminal and a network device. The encoding apparatus may be a chip system. In this embodiment of this application, the chip system may include a chip, or may include a chip and another discrete component.

Figure 19:
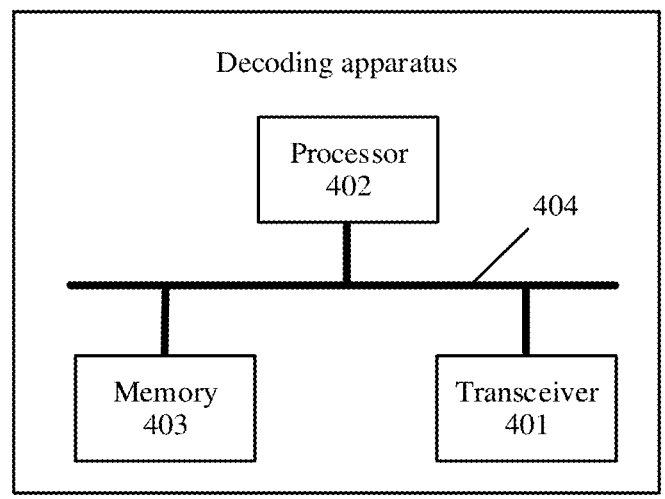
FIG. 19 is a schematic diagram of a structure of a decoding apparatus according to this application.

FIG. 19 is a schematic diagram of a structure of a decoding apparatus according to this application. The decoding apparatus includes:

a transceiver 401, configured to obtain to-be-decoded information; and at least one processor 402, configured to invoke and execute program instructions in a memory to implement the steps in the decoding method shown in FIG. 10. For details, refer to related description in the foregoing method embodiments.

Optionally, the decoding apparatus further includes a memory 403. The memory 403 is configured to store program instructions, and the memory may alternatively be a flash (flash memory).

Optionally, the memory 403 may be independent, or may be integrated with the processor 402.

When the memory 403 is a component independent of the processor 402, the decoding apparatus may further include: a bus 404, configured to connect the memory 403 and the processor 402. The bus is represented by a thick line in FIG. 19, and a connection manner between other components is merely described as an example, and is not limited thereto. The bus may be classified into an address bus, a data bus, a control bus, and the like. For ease of representation, only one thick line is used to represent the bus in FIG. 19, but this does not mean that there is only one bus or only one type of bus.

The decoding apparatus may be configured to perform the steps and/or procedures that correspond to the receive device in the foregoing method embodiment. The decoding apparatus may be a terminal or a network device, an apparatus in a terminal or a network device, or an apparatus that can be used together with a terminal and a network device. The decoding apparatus may be a chip system. In this embodiment of this application, the chip system may include a chip, or may include a chip and another discrete component.

The memory 303 in FIG. 18 or the memory 403 in FIG. 19 may include but is not limited to a non-volatile memory, for example, a hard disk drive (HDD) or a solid-state drive (SSD), a random access memory (RAM), an erasable programmable read-only memory (EPROM), a read-only memory (ROM), or a compact disc read-only memory (CD-ROM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

The processor 302 in FIG. 18 or the processor 402 in FIG. 19 may be one or more central processing units (CPU). When the processor 302 or the processor 402 is one CPU, the CPU may be a single-core CPU or a multi-core CPU. The processor 302 or the processor 402 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor or any conventional processor or the like. The steps of the method disclosed in embodiments of this application may be directly performed by a hardware processor, or may be performed by using a combination of hardware and software modules in the processor.

Figure 20:
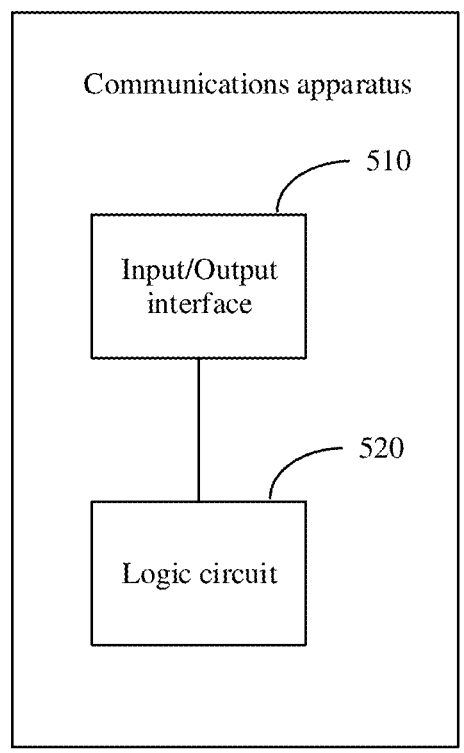
FIG. 20 is a schematic diagram of a structure of a communications apparatus according to this application.

FIG. 20 is a schematic diagram of a structure of a communications apparatus according to this application. Refer to FIG. 20. An embodiment of this application further provides a communications apparatus, which may be configured to implement a function of the transmit device or the receive device in the foregoing method. The communications apparatus may be a communications apparatus or a chip in the communications apparatus. The communications apparatus includes: at least one input/output interface 510 and a logic circuit 520. The input/output interface 510 may be an input/output circuit. The logic circuit 520 may be a signal processor, a chip, or another integrated circuit that can implement the methods in this application.

The at least one input/output interface 510 is configured to input or output a signal or data. For example, when the communications apparatus is a transmit device or is applied to a transmit device, the input/output interface 510 is configured to obtain to-be-encoded information, and the input/output interface 510 is further configured to output an encoded bit sequence.

For example, when the communications apparatus is a receive device or is applied to a receive device, the input/output interface 510 is configured to obtain to-be-decoded information, and the input/output interface 510 is further configured to output decoded information.

The logic circuit 520 is configured to perform a part or all of the steps in any one of the methods provided in embodiments of this application. The logic circuit may implement functions implemented by the processing unit 32 in the apparatus shown in FIG. 16, the processing unit 42 in the apparatus shown in FIG. 17, the processor 302 in the apparatus shown in FIG. 18, and the processor 402 in the apparatus shown in FIG. 19. For example, when the communications apparatus is the transmit device or is applied to the transmit device, the communications apparatus is configured to perform various steps in the foregoing encoding method embodiment. For example, the logic circuit 520 is configured to: determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0; and perform encoding based on I.

For example, when the communications apparatus is the receive device or is applied to the receive device, the communications apparatus is configured to perform various steps in the foregoing decoding method embodiment. For example, the logic circuit 520 is configured to: determine, based on K and N, a set I corresponding to subchannels of the information bits, where information bits corresponding to subchannel sequence numbers in I are distributed in X outer-code subcodes, the X outer-code subcodes include X1 first-type outer-code subcodes, a quantity of information bits in the X1 first-type outer-code subcodes is P, P is at least one of $K_1, K_2, \ldots,$ and $K_m$, $K_1, K_2, \ldots,$ and $K_m$ are greater than a first threshold LB and less than a second threshold HB, m is greater than or equal to 1 and less than (HB−LB−1), LB+1<HB, HB is less than or equal to a length B of an outer-code subcode, X, HB, and B are positive integers, and LB is an integer greater than or equal to 0; and decode to-be-decoded information, where algebraic code decoding is performed on the first-type outer-code subcode.

This application further provides a computer-readable storage medium. The computer-readable storage medium stores execution instructions. When the execution instructions are run on a computer, the encoding method provided in the foregoing implementations is enabled to be performed.

This application further provides a program product. The program product includes executable instructions, and the executable instructions are stored in a computer-readable storage medium. At least one processor of an encoding apparatus may read the executable instructions from the computer-readable storage medium, and the at least one processor executes the executable instructions, to enable the encoding apparatus to implement the encoding method provided in the foregoing implementations.

This application further provides a computer-readable storage medium. The computer-readable storage medium stores execution instructions. When the execution instructions are run on a computer, the decoding method provided in the foregoing implementations is enabled to be performed.

This application further provides a program product. The program product includes executable instructions, and the executable instructions are stored in a computer-readable storage medium. At least one processor of a decoding apparatus may read the executable instructions from the computer-readable storage medium, and the at least one processor executes the executable instructions, to enable the decoding apparatus to implement the decoding method provided in the foregoing implementations.

A person of ordinary skill in the art may understand that all or some of the steps of the method embodiments may be implemented by a program instructing relevant hardware. The program may be stored in a computer-readable storage medium. When the program is run, the steps of the method embodiments are performed. The foregoing storage medium includes: any medium that can store program code, such as a ROM, a RAM, a magnetic disk, or an optical disc.

What is claimed is:

1. A method comprising:
    obtaining to-be-encoded information and a mother code length N, wherein the to-be-encoded information comprises K information bits, and K and N are positive integers;
    determining, based on K and N, a set I corresponding to subchannels of the K information bits, wherein information bits corresponding to subchannel sequence numbers in I are distributed in X outer-code subcodes, the X outer-code subcodes comprise X1 first-type outer-code subcodes, quantities of information bits in the X1 first-type outer-code subcodes are $P_1, P_2, \ldots,$ and $P_{Xi}$, respectively, $P_i(i=1, 2, \ldots, X1)$ is one of $K_1, K_2, \ldots,$ and $K_m$, $K_1, K_2, \ldots,$ and $K_m$ are positive integers greater than a first threshold LB and less than a second threshold HB, m is an integer greater than or equal to 1 and less than (HB−LB−1), LB+1<HB, HB is less than or equal to a length B of an outer-code subcode, X, HB and B are positive integers, and LB is an integer greater than or equal to o; and
    performing encoding on the to-be-encoded information based on the set I.

2. The method according to claim 1, wherein the set I is determined based on a set $I_1$ corresponding to subchannels of an initial information bit, a set $F_1$ corresponding to subchannels of an initial frozen bit, LB, HB, B, $K_1$, $K_2, \ldots,$ and $K_m$; and
    $I_1$ and $F_1$ are obtained based on K and N according to a reliability criterion.

3. The method according to claim 2, further comprising:
    determining a first outer-code subcode set and a second outer-code subcode set based on $N/B$ outer-code subcodes of the X outer-code subcodes, wherein the first outer-code subcode set comprises first-type outer-code subcodes of the X1 first-type outer-code subcodes, the second outer-code subcode set is a complementary set of the first outer-code subcode set, a bit sequence of the outer-code subcodes is determined based on N, B and a first bit sequence, and the first bit sequence is determined based on $I_1$ and $F_1$; and
    adjusting each fourth-type outer-code subcode in the second outer-code subcode set to one of the first-type outer-code subcodes of the $X_1$ first-type outer-code subcodes, wherein a quantity of information bits in an $i^{th}$ fourth-type outer-code subcode is $Y_i$, $Y_i$ is greater than LB and less than HB, $Y_i$ is not equal to $K_1, K_2, \ldots,$ and $K_m$, and i is an integer greater than or equal to 1; and
    wherein I is determined based on the first outer-code subcode set and the adjusted second outer-code subcode set.

4. The method according to claim 1, wherein the X outer-code subcodes further comprise a second-type outer-code subcode or a third-type outer-code subcode, a quantity of information bits in the second-type outer-code subcode is less than or equal to LB, and a quantity of information bits in the third-type outer-code subcode is greater than or equal to HB.

5. The method according to claim 4, wherein I is determined based on a set $I_1$ corresponding to subchannels of an initial information bit, a set $F_1$ corresponding to subchannels of an initial frozen bit, LB, HB, B, $K_1, K_2, \ldots,$ and $K_m$, and the method further comprises:
    determining a first outer-code subcode set and a second outer-code subcode set based on $N/B$ outer-code subcodes of the X outer-code subcodes, wherein the first outer-code subcode set comprises a first-type outer-code subcode of the X1 first-type outer-code subcodes, the second-type outer-code subcode, or the third-type outer-code subcode, the second outer-code subcode set is a complementary set of the first outer-code subcode set, a bit sequence of the $N/B$ outer-code subcodes is determined based on N, B and a first bit sequence, and the first bit sequence is determined based on $I_1$ and $F_1$; and
    adjusting each fourth-type outer-code subcode in the second outer-code subcode set to one of the first-type outer-code subcode, the second-type outer-code subcode, or the third-type outer-code subcode, wherein a quantity of information bits in an $i^{th}$ fourth-type outer-code subcode is $Y_i$, $Y_i$ is greater than LB and less than HB, and $Y_i$ is not equal to $K_1, K_2, \ldots,$ and $K_m$; and
    wherein I is determined based on the first outer-code subcode set and the adjusted second outer-code subcode set.

6. The method according to claim 1, wherein a first-type outer-code subcode of the X1 first-type outer-code subcodes is an algebraic code, $K_1, K_2, \ldots,$ and $K_m$ are determined based on an error correction capability of the algebraic code, and m is determined based on construction of the algebraic code.

7. The method according to claim 1, wherein performing the encoding on the to-be-encoded information based on the set I comprises:
    determining, based on I, a set A corresponding to subchannels of local check bits, wherein the local check bits corresponding to subchannel sequence numbers in A are distributed in the X1 first-type outer-code subcodes, a location of a local check bit corresponding to a subchannel sequence number in A is in a first-type outer-code subcode, and a check relationship between an information bit or a frozen bit and the local check bit is indicated by third indication information in a preset indication vector whose length is B, the quantities $P_1$, $P_2$, ..., and $P_{Xi}$ of the information bits in the X1 first-type outer-code subcodes correspond to the preset indication vector, the check relationship is used to determine a value of the local check bit, the preset indication vector comprises first indication information, second indication information and the third indication information, the first indication information indicates that a corresponding location is the frozen bit, and the second indication information indicates that a corresponding location is the information bit;

determining that subchannel sequence numbers other than subchannel sequence numbers comprised in I and A are in a set F corresponding to subchannels of frozen bits; and determining a value of a bit on each subchannel of the K information bits, and performing polar encoding on bits with determined values.

8. An apparatus comprising:

a processor, coupled to a non-transitory memory storing a program, which when executed by the processor, causes the apparatus to:

obtain to-be-encoded information and a mother code length N, wherein the to-be-encoded information comprises K information bits, and K and N are positive integers;

determine, based on K and N, a set I corresponding to subchannels of the information bits, wherein information bits corresponding to subchannel sequence numbers in I are distributed in X outer-code subcodes, the X outer-code subcodes comprise X1 first-type outer-code subcodes, quantities of information bits in the X1 first-type outer-code subcodes are $P_1$, $P_2$, ..., and $P_{X1}$, respectively, $P_i(i=1, 2, ..., X1)$ is one of $K_1$, $K_2$, ..., and $K_m$, $K_1$, $K_2$, ..., and $K_m$ are positive integers greater than a first threshold LB and less than a second threshold HB, m is an integer greater than or equal to 1 and less than (HB−LB−1), LB+1<HB, HB is less than or equal to a length B of an outer-code subcode, X, HB and B are positive integers, and LB is an integer greater than or equal to o; and perform encoding on the to-be-encoded information based on the set I.

9. The apparatus according to claim 8, wherein the set I is determined based on a set $I_1$ corresponding to subchannels of an initial information bit, a set $F_1$ corresponding to subchannels of an initial frozen bit, LB, HB, B, $K_1$, $K_2$, ..., and $K_m$; and $I_1$ and $F_1$ are obtained based on K and N according to a reliability criterion.

10. The apparatus according to claim 9, wherein the program, when executed by the processor, causes the apparatus further to:

determine a first outer-code subcode set and a second outer-code subcode set based on $_B{}^{/N}$ outer-code subcodes of the X outer-code subcodes, wherein the first outer-code subcode set comprises first-type outer-code subcodes of the X1 first-type outer-code subcodes, the second outer-code subcode set is a complementary set of the first outer-code subcode set, a bit sequence of the $_b{}^{/N}$ outer-code subcodes is determined based on N, B and a first bit sequence, and the first bit sequence is determined based on $I_1$ and $F_1$; and adjust each fourth-type outer-code subcode in the second outer-code subcode set to one of the X1 first-type outer-code subcodes, wherein a quantity of information bits in an $i^{th}$ fourth-type outer-code subcode is $Y_i$, $Y_i$ is greater than LB and less than HB, $Y_i$ is not equal to $K_1$, $K_2$, ..., and $K_m$, and i is an integer greater than or equal to 1; and wherein I is determined based on the first outer-code subcode set and the adjusted second outer-code subcode set.

11. The apparatus according to claim 8, wherein the X outer-code subcodes further comprise a second-type outer-code subcode or a third-type outer-code subcode, a quantity of information bits in the second-type outer-code subcode is less than or equal to LB, and a quantity of information bits in the third-type outer-code subcode is greater than or equal to HB.

12. The apparatus according to claim 11, wherein I is determined based on a set $I_1$ corresponding to subchannels of an initial information bit, a set $F_1$ corresponding to subchannels of an initial frozen bit, LB, HB, B, $K_1$, $K_2$, ..., and $K_m$, and the program, when executed by the processor, causes the apparatus further to:

determine a first outer-code subcode set and a second outer-code subcode set based on $_B{}^{/N}$ outer-code subcodes of the X outer-code subcodes, wherein the first outer-code subcode set comprises a first-type outer-code subcode of the X1 first-type outer-code subcodes, the second-type outer-code subcode, or the third-type outer-code subcode, the second outer-code subcode set is a complementary set of the first outer-code subcode set, a bit sequence of the outer-code subcodes is determined based on N, B and a first bit sequence, and the first bit sequence is determined based on $I_1$ and $F_1$; and adjust each fourth-type outer-code subcode in the second outer-code subcode set to one of the first-type outer-code subcode, the second-type outer-code subcode, or the third-type outer-code subcode, wherein a quantity of information bits in an $i^{th}$ fourth-type outer-code subcode is $Y_i$, $Y_i$ is greater than LB and less than HB, and $Y_i$ is not equal to $K_1$, $K_2$, ..., and $K_m$; and wherein I is determined based on the first outer-code subcode set and the adjusted second outer-code subcode set.

13. The apparatus according to claim 8, wherein a first-type outer-code subcode of the X1 first-type outer-code subcodes is an algebraic code, $K_1$, $K_2$, ..., and $K_m$ are determined based on an error correction capability of the algebraic code, and m is determined based on construction of the algebraic code.

14. The apparatus according to claim 8, wherein the program, when executed by the processor, causes the apparatus further to:

determine, based on I, a set A corresponding to subchannels of local check bits, wherein the local check bits corresponding to subchannel sequence numbers in A are distributed in the X1 first-type outer-code subcodes, a location of a local check bit corresponding to a subchannel sequence number in A is in a first-type outer-code subcode, and a check relationship between an information bit or a frozen bit and the local check bit is indicated by third indication information in a preset indication vector whose length is B, the quantities $P_1$, $P_2$, ..., and $P_{X1}$ of the information bits in the X1 first-type outer-code subcodes correspond to the preset indication vector, the check relationship is used to determine a value of the local check bit, the preset indication vector comprises first indication information, second indication information, and the third indication information, the first indication information indicates that a corresponding location is the frozen bit, and the second indication information indicates that a corresponding location is the information bit;

determine that subchannel sequence numbers other than subchannel sequence numbers comprised in I and A are in a set F corresponding to subchannels of frozen bits; and determine a value of a bit on each subchannel of the K information bits, and perform polar encoding on bits with determined values.

15. A non-transitory computer-readable storage medium, wherein the computer-readable storage medium stores executable instructions, which, when run on a computer, cause an apparatus to:

obtain to-be-encoded information and a mother code length N, wherein the to-be-encoded information comprises K information bits, and K and N are positive integers;

determine, based on K and N, a set I corresponding to subchannels of the information bits, wherein information bits corresponding to subchannel sequence numbers in I are distributed in X outer-code subcodes, the X outer-code subcodes comprise X1 first-type outer-code subcodes, quantities of information bits in the X1 first-type outer-code subcodes are $P_1, P_2, \ldots,$ and $P_{X1}$, respectively, $P_i(i=1, 2, \ldots, X1)$ is one of $K_1, K_2, \ldots,$ and $K_m$, $K_1, K_2, \ldots,$ and $K_m$ are positive integers greater than a first threshold LB and less than a second threshold HB, m is an integer greater than or equal to 1 and less than (HB−LB−1), LB+1<HB, HB is less than or equal to a length B of an outer-code subcode, X, HB, and B are positive integers, and LB is an integer greater than or equal to o; and perform encoding on the to-be-encoded information based on the set I.

16. The computer-readable storage medium according to claim 15, wherein the set I is determined based on a set $I_1$ corresponding to subchannels of an initial information bit, a set $F_1$ corresponding to subchannels of an initial frozen bit, LB, HB, B, $K_1, K_2, \ldots,$ and $K_m$; and $I_1$ and $F_1$ are obtained based on K and N according to a reliability criterion.

17. The computer-readable storage medium according to claim 16, wherein the instructions cause the apparatus further to:

determine a first outer-code subcode set and a second outer-code subcode set based on $_B/^N$ outer-code subcodes of the X outer-code subcodes, wherein the first outer-code subcode set B comprises first-type outer-code subcodes of the X1 first-type outer-code subcodes, the second outer-code subcode set is a complementary set of the first outer-code subcode set, a bit sequence of the $_B/^N$ outer-code subcodes is determined based on N, B and a first bit sequence, and the first bit sequence is determined based on $I_1$ and $F_1$; and adjust each fourth-type outer-code subcode in the second outer-code subcode set to one of the X1 first-type outer-code subcodes, wherein a quantity of information bits in an $i^{th}$ fourth-type outer-code subcode is $Y_i$, $Y_i$ is greater than LB and less than HB, $Y_i$ is not equal to $K_1, K_2, \ldots,$ and $K_m$, and i is an integer greater than or equal to 1; and wherein I is determined based on the first outer-code subcode set and the adjusted second outer-code subcode set.

18. The computer-readable storage medium according to claim 15, wherein the X outer-code subcodes further comprise a second-type outer-code subcode or a third-type outer-code subcode, a quantity of information bits in the second-type outer-code subcode is less than or equal to LB, and a quantity of information bits in the third-type outer-code subcode is greater than or equal to HB.

19. The computer-readable storage medium according to claim 18, wherein I is determined based on a set $I_1$ corresponding to subchannels of an initial information bit, a set $F_1$ corresponding to subchannels of an initial frozen bit, LB, HB, B, $K_1, K_2, \ldots,$ and $K_m$, and the instructions cause the apparatus further to:

determine a first outer-code subcode set and a second outer-code subcode set based on $_B/^N$ outer-code subcodes of the X outer-code subcodes, wherein the first outer-code subcode set B comprises a first-type outer-code subcode of the X1 first-type outer-code subcodes, the second-type outer-code subcode, or the third-type outer-code subcode, the second outer-code subcode set is a complementary set of the first outer-code subcode set, a bit sequence of the $_B/^N$ outer-code subcodes is determined based on N, B and a first bit sequence, and the first bit sequence is determined based on $I_1$ and $F_1$; and adjust each fourth-type outer-code subcode in the second outer-code subcode set according to one of the first-type outer-code subcode, the second-type outer-code subcode, or the third-type outer-code subcode, wherein a quantity of information bits in an $i^{th}$ fourth-type outer-code subcode is $Y_i$, $Y_i$ is greater than LB and less than HB, and $Y_i$ is not equal to $K_1, K_2, \ldots,$ and $K_m$; and wherein I is determined based on the first outer-code subcode set and the adjusted second outer-code subcode set.

20. The computer-readable storage medium according to claim 15, wherein the instructions cause the apparatus further to:

determine, based on I, a set A corresponding to subchannels of local check bits, wherein the local check bits corresponding to subchannel sequence numbers in A are distributed in the X1 first-type outer-code subcodes, a location of a local check bit corresponding to a subchannel sequence number in A is in a first-type outer-code subcode, and a check relationship between an information bit or a frozen bit and the local check bit is indicated by third indication information in a preset indication vector whose length is B, the quantities $P_1$, $P_2, \ldots,$ and $P_{Xi}$ of the information bits in the X1 first-type outer-code subcodes correspond to the preset indication vector, the check relationship is used to determine a value of the local check bit, the preset indication vector comprises first indication information, second indication information and the third indication information, the first indication information indicates that a corresponding location is the frozen bit, and the second indication information indicates that a corresponding location is the information bit;

determine that subchannel sequence numbers other than subchannel sequence numbers comprised in I and A are in a set F corresponding to subchannels of frozen bits; and determine a value of a bit on each subchannel of the K information bits, and perform polar encoding on bits with determined values.

* * * * *

UNITED STATES PATENT AND TRADEMARK OFFICE
CERTIFICATE OF CORRECTION

PATENT NO. : 12,463,746 B2  
APPLICATION NO. : 18/170980  
DATED : November 4, 2025  
INVENTOR(S) : Wang et al.

Page 1 of 2

It is certified that error appears in the above-identified patent and that said Letters Patent is hereby corrected as shown below:

In the Claims

In Column 57, in Claim 1, Line 46, delete "$P_{Xi}$," and insert -- $P_{X1}$, --.

In Column 57, in Claim 1, Line 53, delete "o;" and insert -- 0; --.

In Column 57, in Claim 3, Line 65, delete "$^N/_B$" and insert -- N/B --.

In Column 58, in Claim 3, Line 4, before "outer-code" insert -- N/B --.

In Column 58, in Claim 3, Line 9, delete "$X_1$" and insert -- X1 --.

In Column 58, in Claim 5, Line 31, delete "$^N/_B$" and insert -- N/B --.

In Column 58, in Claim 5, Line 38, delete "$^N/_B$" and insert -- N/B --.

In Column 59, in Claim 7, Line 4, delete "$P_{Xi}$" and insert -- $P_{X1}$ --.

In Column 59, in Claim 8, Line 43, delete "o;" and insert -- 0; --.

In Column 59, in Claim 10, Line 57, delete "$_B/^N$" and insert -- N/B --.

In Column 59, in Claim 10, Line 63, delete "$_b/^N$" and insert -- N/B --.

In Column 60, in Claim 12, Line 23, delete "$_B/^N$" and insert -- N/B --.

In Column 60, in Claim 12, Line 30, before "outer-code" insert -- N/B --.

Signed and Sealed this  
Thirteenth Day of January, 2026

John A. Squires  
*Director of the United States Patent and Trademark Office*

CERTIFICATE OF CORRECTION (continued)
U.S. Pat. No. 12,463,746 B2

In Column 61, in Claim 15, Line 34, delete "o;" and insert -- 0; --.

In Column 61, in Claim 17, Line 48, delete "$_B/^N$" and insert -- N/B --.

In Column 61, in Claim 17, Line 50, after "set" delete "B".

In Column 61, in Claim 17, Line 54, delete "$_B/^N$" and insert -- N/B --.

In Column 62, in Claim 19, Line 15, delete "$_B/^N$" and insert -- N/B --.

In Column 62, in Claim 19, Line 17, after "set" delete "B".

In Column 62, in Claim 19, Line 22, delete "$_B/^N$" and insert -- N/B --.

In Column 62, in Claim 20, Line 50, delete "$P_{Xi}$" and insert -- $P_{X1}$ --.